United States Patent
Hshieh et al.

(10) Patent No.: US 11,620,033 B2
(45) Date of Patent: Apr. 4, 2023

(54) SYSTEMS AND METHODS FOR PROACTIVELY IDENTIFYING AND PROVIDING AN INTERNET LINK ON AN ELECTRONIC DEVICE

(71) Applicant: Apple Inc., Cupertino, CA (US)

(72) Inventors: Alan S. Hshieh, Cupertino, CA (US); Conrad A. Shultz, San Jose, CA (US); Karl Christian Kohlschuetter, Monte Sereno, CA (US); Mateusz K. Rajca, Menlo Park, CA (US); Oluwatomiwa Alabi, Oakland, CA (US); Raymond S. Sepulveda, Campbell, CA (US); Shawn D. Moon, San Mateo, CA (US); Zachary G. King, Santa Clara, CA (US); Garrett M. Davidson, West Lafayette, IN (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/584,797

(22) Filed: Sep. 26, 2019

(65) Prior Publication Data
US 2020/0379616 A1 Dec. 3, 2020

Related U.S. Application Data

(60) Provisional application No. 62/855,848, filed on May 31, 2019.

(51) Int. Cl.
*G06F 3/0483* (2013.01)
*G06F 3/0482* (2013.01)
(Continued)

(52) U.S. Cl.
CPC .......... *G06F 3/0483* (2013.01); *G06F 3/0482* (2013.01); *G06F 3/04883* (2013.01);
(Continued)

(58) Field of Classification Search
CPC .. G06F 3/0483; G06F 3/0482; G06F 3/04883; G06F 16/24578; G06F 16/9535; G06F 16/9538
See application file for complete search history.

(56) References Cited

U.S. PATENT DOCUMENTS 8,458,656 B1 * 6/2013 Liang .................. H04L 67/1085
717/118
9,608,870 B1 * 3/2017 Hendriks ............ G06F 16/9558
(Continued)

OTHER PUBLICATIONS

"Microsoft Internet Explorer 4.0 Now Available; Delivers 'The Web the Way You Want It' to Users Worldwide", Oct. 1, 1997, Microsoft Corp., accessed on Aug. 19, 2021 from <https://news.microsoft.com/1997/10/01/microsoft-internet-explorer-4-0-now-available-delivers-the-web-the-way-you-want-it-to-users-worldwide/>.*

*Primary Examiner* — Nicholas Klicos
(74) *Attorney, Agent, or Firm* — Morgan, Lewis & Bockius LLP

(57) ABSTRACT

Systems and methods for proactively identifying user interface objects (e.g., internet links) directed to information of interest to the user and displaying the identified user interface objects in a user interface on an electronic device are disclosed herein. In one aspect, the method includes receive, via a user input device, a user input within a user interface of an internet browser application and displayed on the display of the electronic device; and in response to the user input, display, within the user interface, a first set of one or more user interface objects, each providing a suggested internet link obtained from one or more data sources, different than the internet browser application, on the electronic device.

60 Claims, 22 Drawing Sheets

(51) Int. Cl.
*G06F 16/9538* (2019.01)
*G06F 16/9535* (2019.01)
*G06F 16/2457* (2019.01)
*G06F 3/04883* (2022.01)

(52) U.S. Cl.
CPC .... *G06F 16/24578* (2019.01); *G06F 16/9535* (2019.01); *G06F 16/9538* (2019.01)

(56) References Cited

U.S. PATENT DOCUMENTS

| | | | | |
|---|---|---|---|---|
| 10,535,005 B1* | 1/2020 | Badr | ................ | G06F 9/54 |
| 2002/0107946 A1* | 8/2002 | Albers | ................ | G06F 16/9562 |
| | | | | 709/223 |
| 2003/0101216 A1* | 5/2003 | Gupta | ................ | G06F 16/9562 |
| | | | | 707/E17.114 |
| 2004/0122848 A1* | 6/2004 | Toivonen | ............ | G06F 16/958 |
| | | | | 707/999.102 |
| 2008/0214153 A1* | 9/2008 | Ramer | ............... | G06F 16/9577 |
| | | | | 455/414.1 |
| 2011/0119593 A1* | 5/2011 | Jacobson | ............ | G06Q 30/02 |
| | | | | 715/736 |
| 2011/0252329 A1* | 10/2011 | Broman | ............ | G06F 16/9535 |
| | | | | 715/738 |
| 2011/0320307 A1* | 12/2011 | Mehta | ............... | G06Q 30/0641 |
| | | | | 705/26.7 |
| 2012/0066584 A1* | 3/2012 | Jung | ................ | G06F 16/9574 |
| | | | | 715/234 |
| 2012/0216102 A1* | 8/2012 | Malla | ................ | G06F 16/9562 |
| | | | | 715/206 |
| 2012/0240019 A1* | 9/2012 | Nuzzi | ................ | H04L 67/327 |
| | | | | 715/205 |
| 2013/0061160 A1* | 3/2013 | Tseng | ................ | G06F 3/0483 |
| | | | | 715/760 |
| 2013/0124606 A1* | 5/2013 | Carpenter | ............ | H04L 67/06 |
| | | | | 709/203 |
| 2015/0067074 A1* | 3/2015 | Ghosh Dastidar | ...... | H04L 51/38 |
| | | | | 709/206 |
| 2015/0156061 A1* | 6/2015 | Saxena | ............ | G06F 17/30864 |
| | | | | 715/733 |
| 2015/0207854 A1* | 7/2015 | Aiello | ................ | G06F 16/951 |
| | | | | 709/203 |
| 2015/0339274 A1* | 11/2015 | Pappu | ............... | H04N 21/4122 |
| | | | | 715/205 |
| 2015/0347358 A1* | 12/2015 | Shultz | ................ | H04L 67/02 |
| | | | | 715/234 |
| 2016/0094654 A1* | 3/2016 | Raman | ................ | H04W 4/60 |
| | | | | 715/733 |
| 2016/0357755 A1* | 12/2016 | Douglas | ............ | G06F 16/9535 |
| 2017/0116161 A1* | 4/2017 | Stein | ................ | G06F 3/04842 |
| 2017/0173461 A1* | 6/2017 | Pack | .................. | A63F 13/35 |
| 2017/0177171 A1* | 6/2017 | Won | ................ | H04L 67/02 |
| 2018/0300421 A1* | 10/2018 | Andreica | ............ | G06F 16/9566 |

* cited by examiner

| | | |
|---|---|---|
| Header 714-0 | Prereqs ID and/or Ranking Score | Suggested UI Object |
| Record 714-1 | Prereqs 1 and/or Ranking Score | Suggested UI object 4 |
| Record 714-2 | Prereqs 2 and/or Ranking Score | Suggested UI object 2 |
| | ⋮ | |
| Record 714-z | Prereqs z and/or Ranking Score | Suggested UI object Z |

Application UI Object Suggestions 702-1

SYSTEMS AND METHODS FOR PROACTIVELY IDENTIFYING AND PROVIDING AN INTERNET LINK ON AN ELECTRONIC DEVICE

RELATED APPLICATIONS

This application claims priority to U.S. Provisional Application No. 62/855,848, filed May 31, 2019, which is incorporated by reference herein in its entirety.

TECHNICAL FIELD

The embodiments disclosed herein generally relate to electronic devices having a network browser application, and, more specifically, to systems and methods for proactively identifying and providing an internet link in a network browser application on the electronic device.

BACKGROUND

Modern electronic devices and communication systems allow users to be more connected than ever before to people, information, entertainment, and shopping. A substantial amount of information is available to users utilizing the Internet, and this information is typically accessed through a web browser application such as the SAFARI® web browser application of Apple Inc. of Cupertino, Calif. The enormous amount of information that is available on the Internet, however, can make it difficult to locate specific information on a given topic.

To help users quickly and easily access a website that is of interest, conventional network browser applications allow the users to create a readily-accessible link to the website during the visit by saving a hyperlink ("bookmark") to a website or webpage to a bookmarks or favorites list. While the bookmark or favorite may reduce the users' search time for accessing a website, its benefit is limited as the user may not search for additional websites other than those that they have previously visited and added to their favorite list or may not be diligent about adding websites that they become aware of to their favorites list. As a result, the users may remain unaware of other similar or newly created websites that may be of interest to them. In addition, as the list grows, it becomes harder to find particular websites saved to the list.

In addition, electronic devices are now capable of running numerous software applications to perform various tasks and provide different types of information. The applications may inundate users with internet links that cannot be thoroughly reviewed, and if of interest, added to the user's favorites list. As such, users often wish to return at a later point in time to review the internet links that they were previously made aware of in these applications. Oftentimes, however, users are unable to locate the links.

As such, it is desirable to provide an intuitive and easy-to-use system and method for proactively identifying and providing internet links to a user of an electronic device.

SUMMARY

Accordingly, there is a need for electronic devices to proactively identify user interface objects (e.g., internet links) directed to information presumed to be of interest to the user, and display the identified links in a user interface (e.g., suggestion in SAFARI) on the electronic device. In various embodiments, the suggested internet links are identified based on data in one or more data sources (e.g., a calendar application, a reminder application, a communications application, a text-message application, an e-mail application, and/or a social media application) that are different from a network browser application (e.g., an internet browser application such as Safari, GOOGLE CHROME, FIREFOX or INTERNET EXPLORER). For example, an internet link in an email sent from an airline company for confirming booking of the ticket may automatically be identified and displayed as a suggested internet link at the check-in time of the flight without the user's request. Additionally or alternatively, the data source may include the network browser application. For example, an internet link related to a common-ancestor topic of some webpages that the user has recently searched may be provided as a suggested internet link. As used herein, a "common-ancestor topic" of two or more topics refers to a relatively more general topic (e.g., root topic) relevant to and shared by the two or more topics. Such methods and systems may optionally complement or replace conventional methods for invoking and executing the network browser application. Such methods and systems may advantageously reduce the cognitive burden on a user and produce a more efficient human-machine interface. For example, the user can review the suggested internet link obtained from one or more applications different from the network browser application without invoking the application(s) first and/or searching for the relevant links, and then returning back to the network browser application. For battery-operated devices (e.g., laptop computers), such methods and systems conserve power and increase the time between battery charges. Moreover, such methods and systems help to extend the life of the touch-sensitive display by requiring a fewer number of touch inputs (e.g., instead of having to continuously tap on a touch-sensitive display to navigate and to locate the internet links in various applications and/or continuously tapping on the touch-sensitive display to search for a relevant topic) by proactively providing the internet links without human intervention (e.g., user's searching inputs).

The above deficiencies and other problems associated with network browser applications on electronic devices are addressed by the disclosed devices. In some embodiments, the device is a desktop computer. In some embodiments, the device is a portable or mobile device (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, fitness support, digital photography, digital video recording, web browsing, digital music playing, and/or digital video playing. Executable instructions for performing these functions are, optionally, included in a non-transitory computer-readable storage medium or other computer program product configured for execution by one or more processors.

(A1) In accordance with some embodiments, a method is performed at an electronic device including a processor, memory, a display and a user input device (such as a keyboard, a mouse and/or a touch-sensitive display). The method includes: receiving, via the user input device, a user input within a user interface of an internet browser application and displayed on the display of the electronic device; and in response to the user input, displaying, within the user interface, a first set of one or more user interface objects, each providing a suggested internet link obtained from one or more data sources on the electronic device, and each of the one or more data sources is different than the internet browser application. Providing suggested internet links that are obtained from one or more data sources other than the internet browser application ensures that users do not have to waste time recalling or locating links that they may have encountered previously in a number of different applications. Ensuring that users do not have to waste this time by entering numerous inputs and searching aimlessly for various links enhances operability of the device and makes the human-machine interface more efficient (e.g., by providing such links in the browser application directly, and thereby ensuring that users do not have to look for them elsewhere). Because less time is wasted on searching aimlessly on the device, these techniques also help to conserve power, increase the time between battery charges, and help to extend the life of the touch-sensitive display by requiring a fewer number of touch inputs.

(A2) In some embodiments of the method of A1, the method further includes, in response to the user input, also displaying, within the user interface, a second set of one or more user interface objects, each providing a suggested internet link obtained from the internet browser application. Providing additional suggested internet links that are obtained from the internet browser application (in addition to the one or more data sources) ensures that users avoid wasting time to search further in the internet browser application to locate such internet links. Ensuring that users do not have to waste this time by entering numerous inputs and searching aimlessly in the internet browser application enhances operability of the device and makes the human-machine interface more efficient (e.g., by providing such suggested links in the browser application directly, and thereby ensuring that users do not have to look for them aimlessly). Because less time is wasted on searching aimlessly in the internet browser application, these techniques also help to conserve power, increase the time between battery charges, and help to extend the life of the touch-sensitive display by requiring a fewer number of touch inputs.

(A3) In some embodiments of the method of A2, the method further includes, in response to the user input, also displaying, within the user interface, a third set of one or more user interface objects, distinct from the first and second one or more user interface objects, for an internet link previously designated to be a favorite internet link of a user. Providing an additional suggested internet link that is previously designated to be a favorite internet link ensures that users can obtain the link that is of interest to them without wasting time. Ensuring that users do not have to waste this time enhances operability of the device and makes the human-machine interface more efficient (e.g., by providing such a suggested link in the browser application directly, and thereby ensuring that users do not have to click on the list of favorite link and look for it). Because less time is wasted, these techniques also help to conserve power, increase the time between battery charges, and help to extend the life of the touch-sensitive display by requiring a fewer number of touch inputs.

(A4) In some embodiments of the method of A3, the first and second sets of one or more user interface objects are displayed in a first portion of the user interface and the third set of one or more user interface objects are displayed in a second portion of the user interface distinct and different from the first portion of the user interface. Displaying the different sets of user interface objects obtained from different sources in different regions ensures that users can easily and quickly recognize whether groups of links are of interest to them without wasting time looking through links that might be listed in a random order. Ensuring that users are able to easily and quickly recognize whether groups of links are of interest enhances operability of the device and makes the human-machine interface more efficient (e.g., by providing such suggested links in different predefined portions of the user interface, and thereby ensuring that users do not have to waste time looking through links that might be displayed in a random order). Because users are able to efficiently locate a group of links that is of interest, these techniques also help to conserve power, increase the time between battery charges, and help to extend the life of the touch-sensitive display by requiring a fewer number of touch inputs.

(A5) In some embodiments of the method of A4, the method further includes, in response to the user input, also displaying, within the user interface, a fourth set of one or more user interface objects, distinct from the first, second, and third one or more user interface objects, for a recently accessed internet link. Providing an additional suggested internet link that is a recently accessed internet link ensures that users are also able to access such links quickly and without wasting time locating such links. Ensuring that users do not have to waste this time enhances operability of the device and makes the human-machine interface more efficient (e.g., by providing such a suggested link in the browser application directly, and thereby ensuring that users do not have to look for it). Because less time is wasted on searching, these techniques also help to conserve power, increase the time between battery charges, and help to extend the life of the touch-sensitive display by requiring a fewer number of touch inputs.

(A6) In some embodiments of the method of A5, the fourth set of one or more user interface objects are displayed in a fourth portion of the user interface distinct and different from the first and second portions of the user interface. Displaying the different sets of user interface objects obtained from different sources in different regions ensures that users can easily and quickly recognize whether groups of links are of interest to them without wasting time looking through links that might be listed in a random order. Ensuring that users are able to easily and quickly recognize whether groups of links are of interest enhances operability of the device and makes the human-machine interface more efficient (e.g., by providing such suggested links in different predefined portions of the user interface, and thereby ensuring that users do not have to waste time looking through links that might be displayed in a random order). Because users are able to efficiently locate a group of links that is of interest, these techniques also help to conserve power, increase the time between battery charges, and help to extend the life of the touch-sensitive display by requiring a fewer number of touch inputs.

(A7) In some embodiments of the method of any one of A1-A6, the one or more data sources are selected from a group consisting of: a calendar application, a reminder application, a communications application, a text-message application, an e-mail application, and a social media application. Providing the suggested internet links that are obtained from the calendar application, reminder application, communications application, text-message application, e-mail application, and/or social media application ensures that users do not have to waste time recalling or locating links that they may have encountered previously in one or more of these applications. Ensuring that users do not have to waste this time by entering numerous inputs and searching aimlessly for various links in one or more of these applications enhances operability of the device and makes the human-machine interface more efficient (e.g., by providing such links obtained for one or more of these application in the browser application directly, and thereby ensuring that users do not have to invoking one or more of these applications first and/or searching for the relevant links therein, and then returning back to the internet browser application). Because less time is wasted on invoking one or more of these applications, searching aimlessly on the device and then returning to the internet browser application, these techniques also help to conserve power, increase the time between battery charges, and help to extend the life of the touch-sensitive display by requiring a fewer number of touch inputs.

(A8) In some embodiments of the method of any one of A1-A7, the user input includes (i) a request to invoke the internet browser application, (ii) a request to display a new webpage tab in the user interface of the internet browser application, and/or (iii) an input into a search or internet address field of the user interface of the internet browser application. Providing the suggested internet links after receiving the user input for invoking the internet browser application, displaying a new webpage tab in the user interface of the internet browser application, and/or entering an input into a search or internet address field of the user interface of the internet browser application ensures that users can receive the suggested internet links at the correct timing, i.e., when they are about to look for something in the internet browser application. Ensuring that users receive the suggested internet links right after providing one or more of these inputs allows the users to decide whether they would like to access the suggested internet links without having to waste the time to enter any inputs and search aimlessly for various links enhances operability of the device and makes the human-machine interface more efficient (e.g., by providing such links right after receiving the user input for invoking the internet browser application, displaying a new webpage tab in the user interface of the internet browser application, and/or entering an input into a search or internet address field of the user interface of the internet browser application, and thereby ensuring that users do not have to actively search for them in the application(s). Because the suggested links are provided after receiving the user input indicate of users' intent for searching for something, limited time is wasted for the users to search the internet links of interest on the device; these techniques also help to conserve power, increase the time between battery charges, and help to extend the life of the touch-sensitive display by requiring a fewer number of touch inputs.

(A9) In some embodiments of the method of any one of A1-A8, the method further includes: determining, prior to displaying the one or more user interface objects, a topic associated with the user input; searching, using the topic, for internet links obtained from the one or more data sources; and in response to the search, locating at least one internet link related to the topic for display as a respective suggested internet link. Searching using a topic that is determined to be associated with the user input helps to ensure that the most relevant internet links are offered to the user at an appropriate point in time (e.g., when those links will be most useful). Ensuring that the most relevant internet links are offered to the user at an appropriate point in time enhances operability of the device and improves the human-machine interface, because users are able to avoid wasting time looking for desired internet links (and are able to avoid providing unnecessary inputs to locate those desired internet links). Such features also help to ensure sustained interactions with the device, as users do not need to interrupt their interactions with the internet browser application to then go looking for a desired link; instead the desired links are automatically, without human intervention, provided to the user while they are continuing to sustain an interaction with the internet browser application.

(A10) In some embodiments of the method of any one of A1-A9, the method further includes: determining, prior to displaying the one or more user interface objects, a topic associated with a device context; searching, using the topic, for internet links obtained from the one or more data sources; and locating, in response to the search, at least one internet link related to the topic for display as a respective suggested internet link. Searching using a topic that is determined to be associated with the user input helps to ensure that the most relevant internet links are offered to the user at an appropriate point in time (e.g., when those links will be most useful). Ensuring that the most relevant internet links are offered to the user at an appropriate point in time enhances operability of the device and improves the human-machine interface, because users are able to avoid wasting time looking for desired internet links (and are able to avoid providing unnecessary inputs to locate those desired internet links). Such features also help to ensure sustained interactions with the device, as users do not need to interrupt their interactions with the internet browser application to then go looking for a desired link; instead the desired links are automatically, without human intervention, provided to the user while they are continuing to sustain an interaction with the internet browser application.

(A11) In some embodiments of the method of any one of A1-A10, the data sources include entries associated with one or more applications, other than the internet browser application, on the electronic device. Using entries associated with one or more applications as the data sources ensures that users receive suggested internet links from applications other than the internet browser application. Ensuring that users receive suggested internet links from such other applications enhances operability of the device and improves the human-machine interface by providing the suggested links directly in the internet browser application, and without the user having to leave that internet browser application to search separately within the one or more applications. In this ways, unnecessary inputs are also avoided, thereby extending life of the touch-sensitive display and preserving battery life.

(A12) In some embodiments of the method of A11, the method further includes: acquiring, for each of at least some of the entries, at least one of a usage history, a second topic or a time associated therewith; and displaying the one or more user interface objects based at least in part on said at least one of the acquired usage history, second topic or time. Acquiring usage history, second topic, or a time for at least some of the entries helps to further ensure that the most relevant internet links are offered to the user at an appropriate point in time (e.g., when those links will be most useful). Ensuring that the most relevant internet links are offered to the user at an appropriate point in time enhances operability of the device and improves the human-machine interface, because users are able to avoid wasting time looking for desired internet links (and are able to avoid providing unnecessary inputs to locate those desired internet links). Such features also help to ensure sustained interactions with the device, as users do not need to interrupt their interactions with the internet browser application to then go looking for a desired link; instead the desired links are automatically, without human intervention, provided to the user while they are continuing to sustain an interaction with the internet browser application.

(A13) In some embodiments of the method of A9, the method further includes causing the electronic device to determine, prior to receiving the user input, a common-ancestor topic for each of the entries and the user input. In one embodiment, at least one of the displayed one or more user interface objects are relevant to the determined common-ancestor topic. Determining a common-ancestor topic for each of the entries and the user input helps to further ensure that the most relevant internet links are offered to the user at an appropriate point in time (e.g., when those links will be most useful). Ensuring that the most relevant internet links are offered to the user at an appropriate point in time enhances operability of the device and improves the human-machine interface, because users are able to avoid wasting time looking for desired internet links (and are able to avoid providing unnecessary inputs to locate those desired internet links). Such features also help to ensure sustained interactions with the device, as users do not need to interrupt their interactions with the internet browser application to then go looking for a desired link; instead the desired links are automatically, without human intervention, provided to the user while they are continuing to sustain an interaction with the internet browser application.

(A14) In some embodiments of the method of A9, the method further includes assigning, for each of the entries, a ranking score based at least in part on the time associated therewith. In one embodiment, the entry with a time closer to a time of receiving the user input is assigned a higher ranking score, and the one or more user interface objects are displayed in an order based at least in part on the ranking scores assigned to the entries. Assigning a ranking score that is time-based and using that ranking score to order user interface objects associated with the suggested internet links ensures that users can easily and quickly locate those suggested internet links that will be of most interest to them without wasting time looking through links that might be listed in a random order. Ensuring that users are able to easily and quickly recognize a suggested internet link of highest interest enhances operability of the device and makes the human-machine interface more efficient (e.g., the user avoids wasting time and avoids providing extra inputs to locate a suggested internet link that is of highest interest). Because users are able to efficiently locate a highest interest link, these techniques also help to conserve power, increase the time between battery charges, and help to extend the life of the touch-sensitive display by requiring a fewer number of touch inputs.

(A15) In some embodiments of the method of A12, the entries include a webpage that a user has previously visited and/or a calendar event stored in a calendar application. Acquiring the usage history, topic and/or time associated with webpage that the user has previously visited and/or a calendar event, and, based thereon, displaying the user interface objects ensures that the displayed user interface objects are more likely to be of interest to the users (since they are based on the webpage that the user has previously visited and/or a calendar event that the user stored in the calendar application). Ensuring that the displayed suggested internet links are of interest to the users increases the likelihood for the users to select the suggested links, thereby enhancing operability of the device and making the human-machine interface more efficient (e.g., by providing the links that more relevant to the usage history, topic and/or time associated with the previously visited webpage and/or stored calendar event, and likely to be selected by the users without wasting the users' time to click on links that are irrelevant). Because less time is wasted on clicking the irrelevant links, these techniques also help to conserve power, increase the time between battery charges, and help to extend the life of the touch-sensitive display by requiring a fewer number of touch inputs.

(A16) In some embodiments of the method of A9, the method further includes: identifying a first topic associated with the user input or device context; determining a first q-identifier, which is also known as a "Wikidata Identifier," for the first topic; for each entry of the plurality of entries, identifying a second topic associated with the respective entry; and determining a second q-identifier for the second topic; and assigning a ranking score for each entry based at least in part on a correlation of the first q-identifier with each of the second q-identifiers. In one embodiment, the one or more user interface objects are displayed in an order based at least in part on the ranking scores assigned to the entries. Assigning a ranking score that is based on multiple q-identifiers for different topics, and using that ranking score to order user interface objects associated with the suggested internet links ensures that users can easily and quickly locate those suggested internet links that will be of most interest to them without wasting time looking through links that might be listed in a random order. Ensuring that users are able to easily and quickly recognize a suggested internet link of highest interest enhances operability of the device and makes the human-machine interface more efficient (e.g., the user avoids wasting time and avoids providing extra inputs to locate a suggested internet link that is of highest interest). Because users are able to efficiently locate a highest interest link, these techniques also help to conserve power, increase the time between battery charges, and help to extend the life of the touch-sensitive display by requiring a fewer number of touch inputs.

(A17) In some embodiments of the method of A9, the method further includes: identifying a first topic associated with the user input; determining a first string for the first topic; for each entry of the plurality of entries, identifying a second topic associated with the respective entry; and determining a second string for the second topic; and assigning a ranking score for each entry based at least in part on a correlation of the first string with each of the second strings. In one embodiment, the one or more user interface objects are displayed in an order based at least in part on the ranking scores assigned to the entries. Assigning a ranking score that is based on multiple strings determined from different topics, and using that ranking score to order user interface objects associated with the suggested internet links ensures that users can easily and quickly locate those suggested internet links that will be of most interest to them without wasting time looking through links that might be listed in a random order. Ensuring that users are able to easily and quickly recognize a suggested internet link of highest interest enhances operability of the device and makes the human-machine interface more efficient (e.g., the user avoids wasting time and avoids providing extra inputs to locate a suggested internet link that is of highest interest). Because users are able to efficiently locate a highest interest link, these techniques also help to conserve power, increase the time between battery charges, and help to extend the life of the touch-sensitive display by requiring a fewer number of touch inputs.

(A18) In some embodiments of the method of A9, the method further includes: detecting a new entry associated with at least one of the one or more applications; and updating the one or more user interface objects based at least in part on the detected new entry. Ensuring that new entries are detected and used to update presentation of the one or more user interface objects enables users to have access to the most current suggested internet links. Enabling users to have access to the most current suggest internet links ensures that the suggested internet link that is of interest to them will be part of the links that are made available within the internet browser application, which enhances operability of the device and makes the human-machine interface more efficient (e.g., if new entries could not be detected and used to update UI objects, then users may still have to waste time going and searching for the links that might be of interest to them, as the ones presented may be outdated or no longer of any interest).

(A19) In some embodiments of the method of A1, the method further includes: detecting a second user input of a particular user interface object of the user interface objects; and in response to detecting the second user input, displaying a webpage or an application associated with the particular user interface object. Detecting the input of a particular user interface object and displaying a webpage or an application associated with the particular user interface object ensures that the selected webpage/application of interest can be timely and accurately displayed. Ensuring that the selected webpage/application of interest can be timely and accurately provided enhances operability of the device and makes the human-machine interface more efficient (e.g., so that the users can review the webpage/application right away). Because the webpage/application is timely provided to the users without requiring the user to aimless search for it later, these techniques also help to conserve power, increase the time between battery charges, and help to extend the life of the touch-sensitive display by requiring a fewer number of touch inputs.

(A20) In some embodiments of the method of A1, the method further includes: detecting a second user input of a particular user interface object of the user interface objects; and in response to detecting the second user input, causing a webpage or an application associated with the particular user interface object to be displayed again only after a predetermined time has lapsed. Detecting the input of a particular user interface object and causing the displayed webpage or application associated with the particular user interface object to be displayed again only after a predetermined time (e.g., 8 hours) has lapsed ensures that the selected webpage/application of interest will not be displayed again soon since the users may be less interested in visiting the webpage/application they just visited. Ensuring that the selected webpage/application of interest will be displayed after the predetermined time has lapsed enhances operability of the device and makes the human-machine interface more efficient (e.g., the users do not have to waste time on reviewing the links that they just visited and are not interested in visiting again soon). Because the device does not have to waste power to search for or display the webpage/application that is unlikely to be of interest to the users, these techniques also help to conserve power, increase the time between battery charges, and help to extend the life of the touch-sensitive display by requiring a fewer number of touch inputs.

(A21) In some embodiments of the method of A1, the method further includes: detecting a second user input on a particular user interface object of the one or more user interface objects; and in response to detecting the second user input, ceasing displaying the particular user interface object in the user interface of the internet browser application. Ceasing to display the particular user interface object after it has been selected ensures that only the most interesting links remain for presentation to the user. In this way, operability of the device is enhanced, and the human-machine interface is made to operate more efficient (e.g., if the object still remained, then the user would be wasting time reviewing that object again as it was already selected, so ceasing to display that object ensures that other objects can be located more quickly and with fewer user inputs).

(A22) In some embodiments of the method of A1, the method further includes: detecting a user swipe gesture on a particular user interface object of the user interface objects; and in response to detecting the user swipe gesture, displaying a set of affordances. Displaying a set of affordances in response to a user swipe gesture across one of the UI objects ensures that users are provided with additional controls that allow for sharing or performing other actions associated with the UI object (and its associated suggested internet link). By providing such additional controls directly within the internet browser application (e.g., without having to open some other page or another application entirely), users are able to perform actions associated with such controls as quickly as possible. In this way, operability of the device is enhanced, the human-machine interface is made to operate more efficiently, and sustained interactions with the device are made possible.

(A23) In some embodiments of the method of A22, the set of affordances includes a first affordance configured to allow the user to share the particular user interface object with another user. Displaying a set of affordances in response to a user swipe gesture across one of the UI objects ensures that users are provided with additional controls that allow for sharing or performing other actions associated with the UI object (and its associated suggested internet link). By providing such additional controls directly within the internet browser application (e.g., without having to open some other page or another application entirely), users are able to perform actions associated with such controls as quickly as possible. In this way, operability of the device is enhanced, the human-machine interface is made to operate more efficiently, and sustained interactions with the device are made possible.

(A24) In some embodiments of the method of A22, the set of affordances includes a second affordance configured to allow the user to (i) open a webpage associated with the particular user interface object in focus or in background or (ii) remove the particular user interface object from the user interface. Displaying a set of affordances in response to a user swipe gesture across one of the UI objects ensures that users are provided with additional controls that allow for sharing or performing other actions associated with the UI object (and its associated suggested internet link), and such other actions include opening a webpage or removing a particular UI object. By providing such additional controls directly within the internet browser application (e.g., without having to open some other page or another application entirely), users are able to perform actions associated with such controls as quickly as possible. In this way, operability of the device is enhanced, the human-machine interface is made to operate more efficiently, and sustained interactions with the device are made possible.

(A25) In some embodiments of the method of A1, the method further includes extracting, for each of the one or more user interface objects, an image from a webpage associated therewith. In one embodiment, the one or more user interface objects are displayed in the user interface with the corresponding one or more images. Extracting an image from a webpage and presenting it along with a particular UI object helps to ensure that users are able to located suggested internet links that are of most interest as quickly as possible. Having the visual image can allow the user to find the UI object of interest quickly, which enhances operability of the device and makes the human-machine interface more efficient (e.g., because users avoid having to waste time providing unnecessary inputs to search for UI objects of interest, as the presentation of an image helps them to locate desired UI objects more quickly and with fewer inputs).

(A26) In some embodiments of the method of A1, the suggested network link comprises a uniform resource locator (URL).

(A27) In some embodiments of the method of A1, the method further includes causing the user interface objects to be automatically displayed within the user interface, without human intervention.

(A28) In some embodiments of the method of A1, the method further includes, in response to the user input, displaying, within the user interface, an additional user interface object, distinct from the one or more user interface objects, for providing an additional suggested internet link obtained from the one or more data sources, different than the internet browser application, on a second electronic device distinct from the electronic device. Providing the additional suggested internet link on another device (e.g., the second electronic device) ensures that users have the ability to access such links on multiple device (e.g., on a smartphone, as well as on a tablet device or a personal computing device). This enhances operability of the device, makes the human-machine interface more efficient, and also enables sustained interactions with the devices as users avoid wasting time going back-and-forth between the two devices to located links that may not be on both devices.

(A29) In some embodiments of the method of A26, the electronic device and the second electronic device are logged into a common user account. Ensuring that the two devices are logged into a common user account before sharing the suggested internet links enhances security for such features by limiting unauthorized access to user data.

(A30) In another aspect, a non-transitory computer-readable storage medium is provided. The non-transitory computer-readable storage medium stores executable instructions that, when executed by an electronic device including a processor, memory, a display and a user input device (such as a keyboard, a mouse and/or a touch-sensitive display), cause the electronic device to perform the method described in any one of A1-A29.

(A31) In one additional aspect, an electronic device is provided that includes a user input device (e.g., a keyboard 206, FIG. 2, a mouse 208, FIG. 2, and/or a touch-sensitive display 412, FIG. 4A); a display (e.g., primary display 102, FIG. 1, display system 312, FIG. 3A, or a touch-sensitive display 412, FIG. 4A); one or more processors (e.g., processing units (CPU(s)) 322, FIG. 3A); memory storing one or more programs (e.g., memory 302, FIG. 3A). The one or more processors are configured to execute the program(s) stored in the memory; while executing the program(s), receive, via the user input device, a user input within a user interface of an internet browser application and displayed on the display of the electronic device; and in response to the user input, display, within the user interface, one or more user interface objects, each providing a suggested internet link obtained from one or more data sources on the electronic device, and each of the one or more data sources is different than the internet browser application. The device implemented with such components can advantageously reduce the cognitive burden on a user and produce a more efficient human-machine interface. For example, the user can review the suggested internet link obtained from one or more applications different from the network browser application without invoking the application(s) first and/or searching for the relevant links, and then returning back to the network browser application. If the device is battery-operated (e.g., laptop computers, tablet computers or handheld devices), implementation with such components can conserve power and increase the time between battery charges. Moreover, implementation with such components helps to extend the life of the touch-sensitive display by requiring a fewer number of touch inputs.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments section below, in conjunction with the following drawings in which like reference numerals refer to corresponding parts throughout the drawings.

DESCRIPTION OF EMBODIMENTS

As discussed above and in more detail below, there is a need for electronic devices proactively identifying user interface objects (e.g., internet links) directed to information of interest to the user and displaying the identified links in a user interface (e.g., suggestion in SAFARI) on the electronic device. In particular, there is a need for devices that help users to avoid repetitive tasks (e.g., searching for webpages related to particular topics on the internet) and provide proactive assistance by identifying and displaying suggested internet links before a user explicitly requests it. Additionally, there is a need for automatically (i.e., without human intervention) providing the internet link in the network browser application to the user at a particular period time (e.g., check-in time of a flight) by obtaining data from one or more applications, different from the network browser application, thereby obviating the need for the user to search for the information. Disclosed herein are novel methods and systems to address these needs and provide users with ways to quickly identify and receive information of interest. Such methods and systems optionally complement or replace conventional methods for invoking and executing the network browser application. Such methods and systems reduce the cognitive burden on a user and produce a more efficient human-machine interface. For example, the user can review the suggested internet link obtained from one or more applications different from the network browser application without invoking the application(s) first and/or searching from the relevant links, and then returning back to the network browser application. For battery-operated devices, such methods and systems conserve power and increase the time between battery charges. Moreover, such methods and systems help to extend the life of the touch-sensitive display by requiring a fewer number of touch inputs (e.g., instead of having to continuously tap on a touch-sensitive display to navigate and to locate the internet links in various applications and/or continuously taping on the touch-sensitive display to search for a topic of interest) by proactively providing suggested internet links without requiring the user's inputs.

Figure 8:
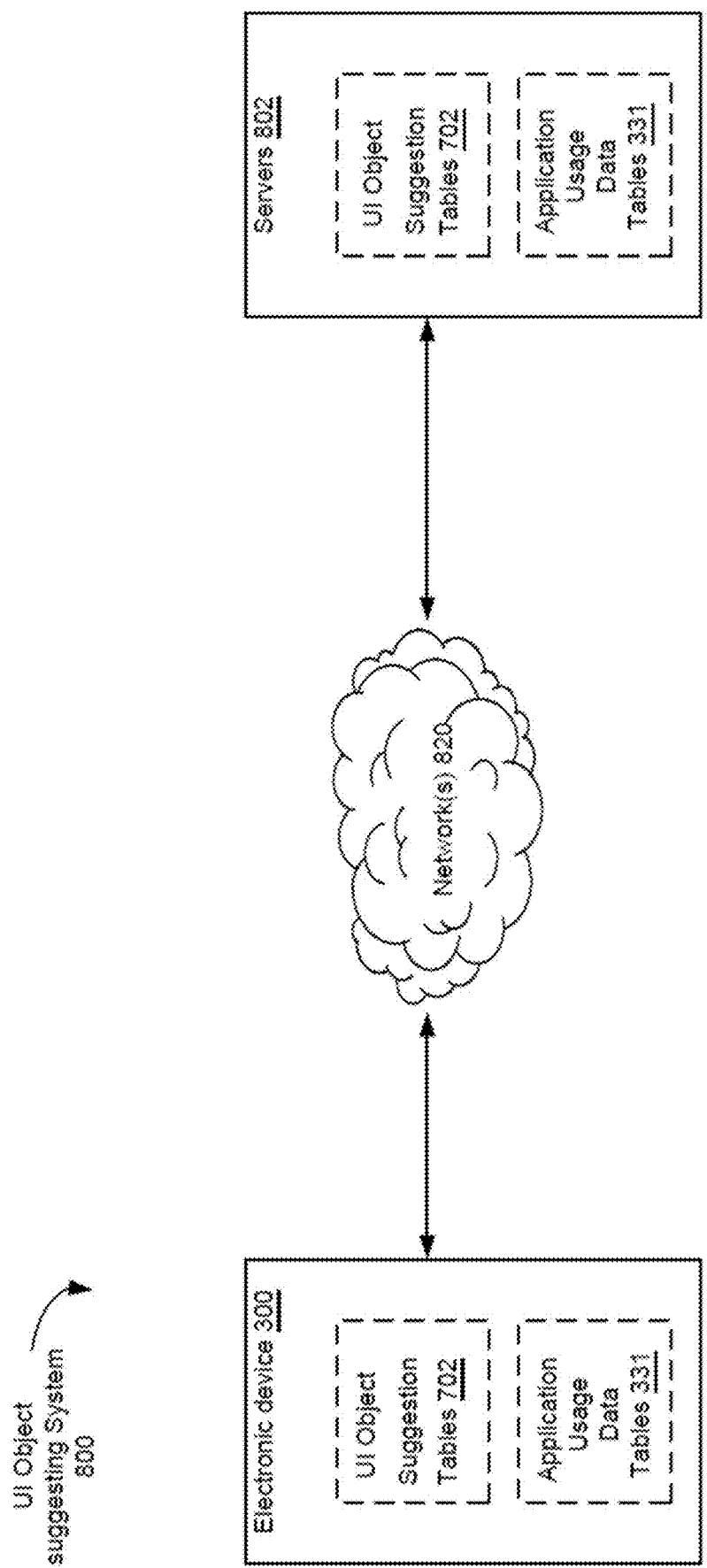
FIG. 8 is a block diagram illustrating an exemplary user interface object suggesting system, in accordance with some embodiments.
Figure 9:
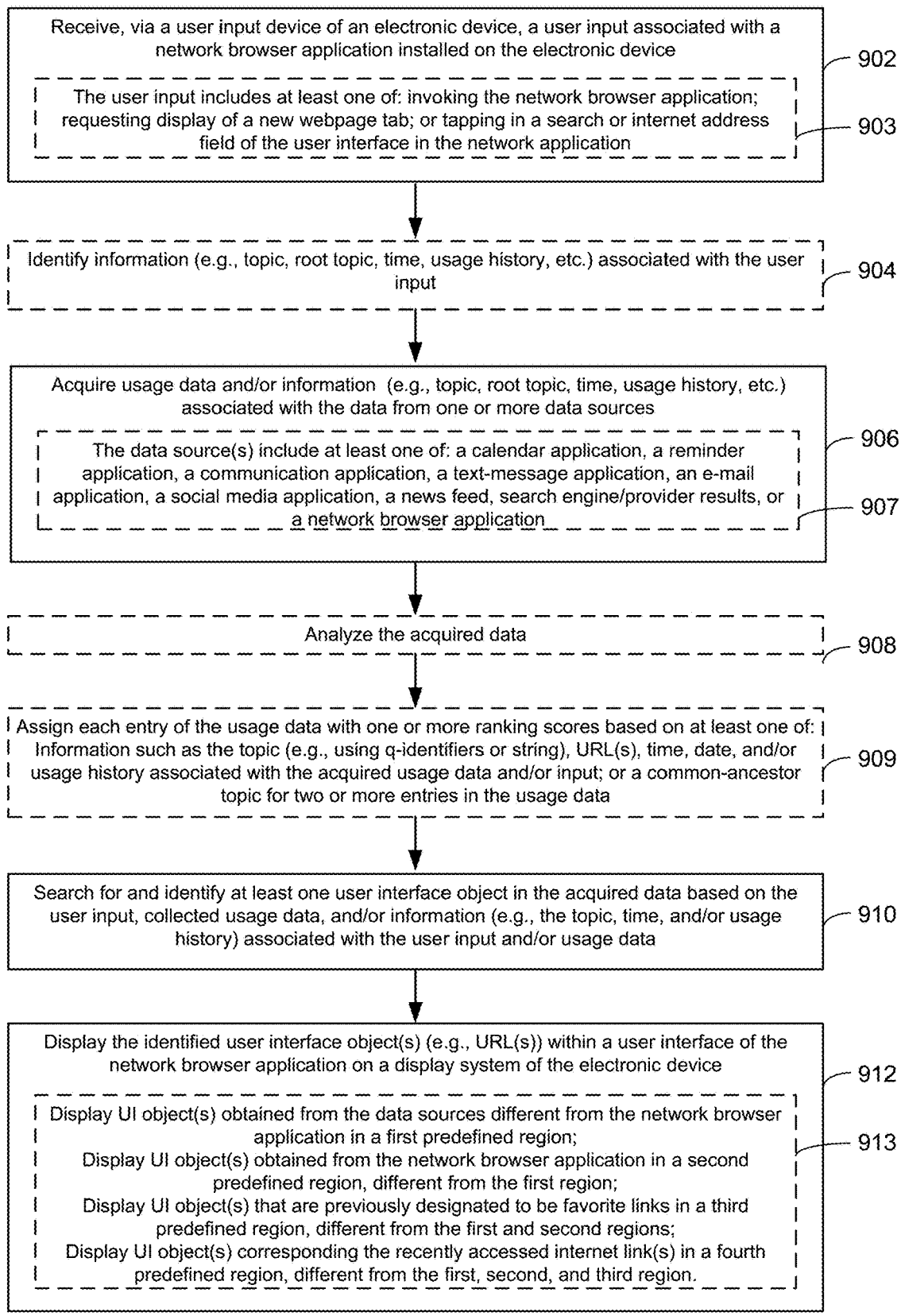
FIG. 9 is a flowchart representation of a method of proactively identifying user interface objects (e.g., internet links) directed to information of interest to the user and displaying the user interface objects in a user interface on the electronic device, in accordance with some embodiments.
Figure 10:
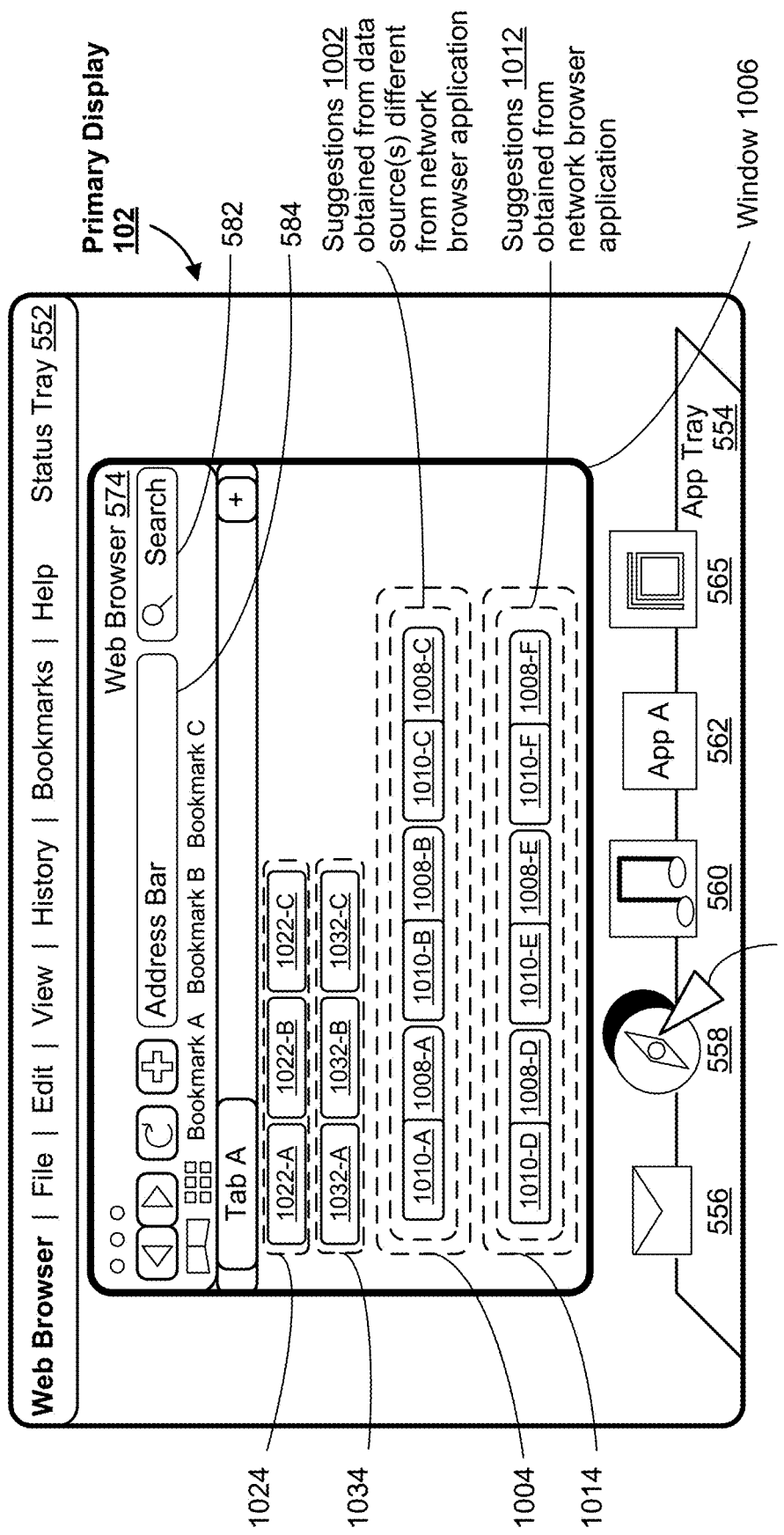
FIG. 10 depicts exemplary suggested user interface objects displayed on a user interface for a network browser application on an electronic device, in accordance with some embodiments.
Figure 14:
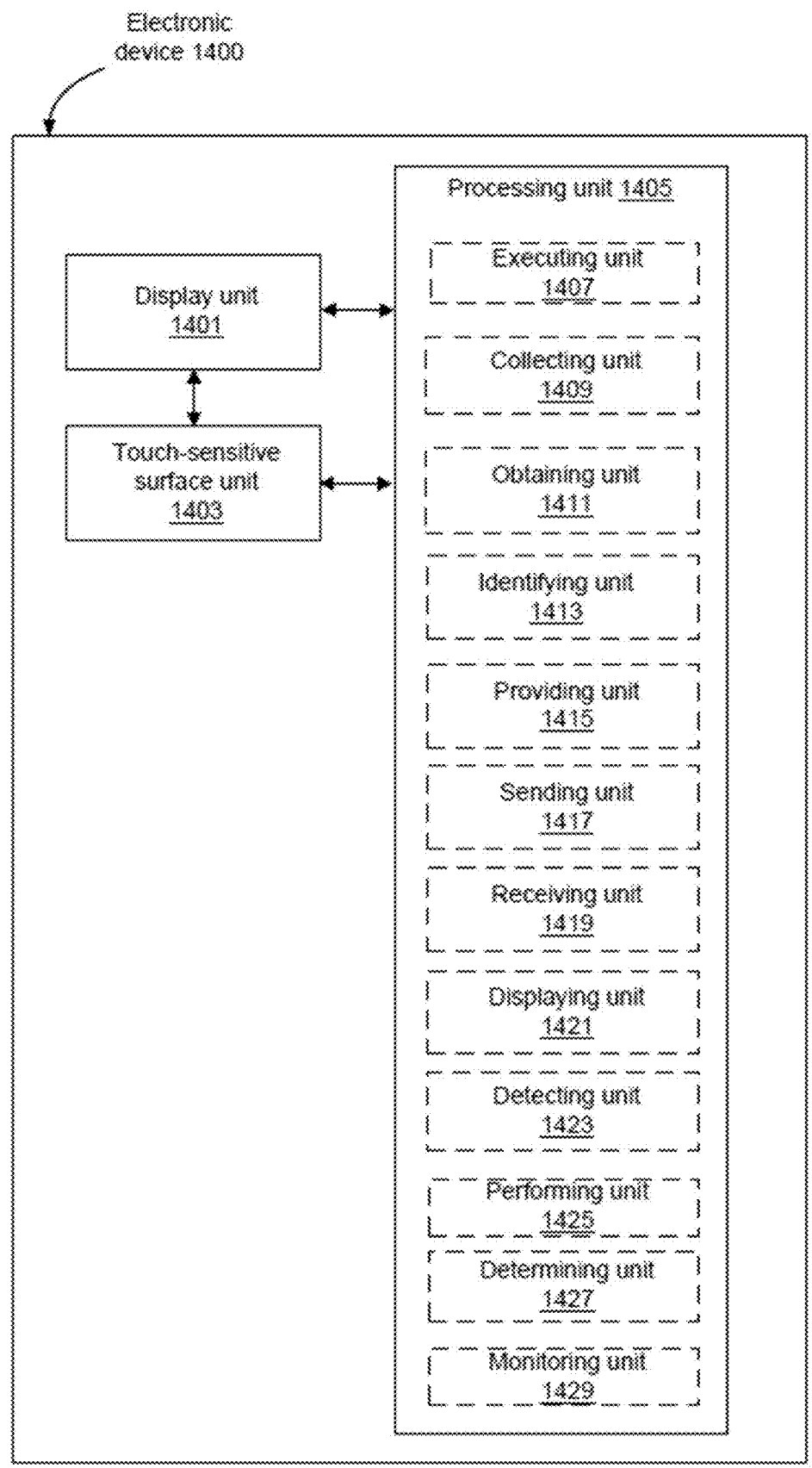
FIGS. 14 and 15 are functional block diagrams of an electronic device, in accordance with some embodiments.
Figure 15:
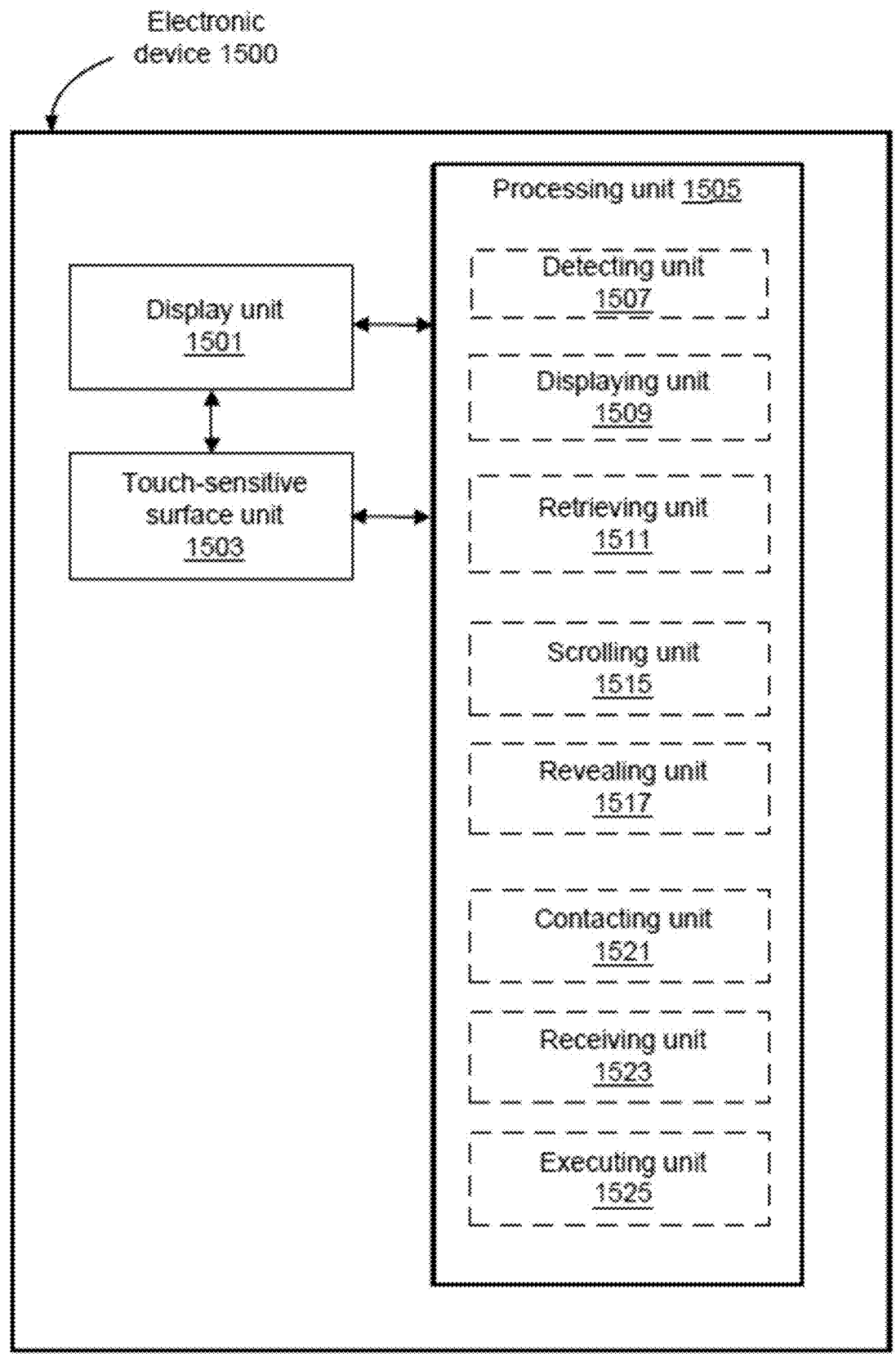

Below, the description of FIGS. 1, 2, 3A-3B, 4A-4B, 5, provides details of exemplary devices. FIGS. 14 and 15 show functional block diagrams of exemplary electronic devices. FIGS. 6A-6B and FIGS. 7A-7B are block diagrams of exemplary data structures that are used to proactively identify user interface objects (e.g., internet links) directed to information of interest to the user and displaying the identified links in a user interface (e.g., suggestion in SAFARI) on the electronic device (these data structures are used in the method described in reference to FIG. 9 and in the method described with reference to FIGS. 13A-13D). FIG. 8 is a block diagram illustrating an exemplary system for proactively identifying and displaying suggested user interface objects (the exemplary system is used in the method described in reference to FIG. 9 and in the method described with reference to FIGS. 13A-13D). FIG. 9 is a flowchart depicting a method of proactively identifying user interface objects (e.g., internet links) directed to information of interest to the user and displaying the user interface objects in a user interface on the electronic device. FIG. 10 depicts exemplary suggested user interface objects displayed on a user interface for a network browser application on an electronic device. FIGS. 11A-11D depict a webpage or an application displayed on a user interface in response to a user input on a suggested user interface. FIG. 12 depicts display of a set of affordances on a user interface in response to a user gesture over a suggested user interface. FIGS. 13A-13D are a flowchart representation of a method of proactively providing and displaying user interface objects (e.g., internet links) on a user interface (e.g., suggestion in SAFARI) of an electronic device. FIGS. 6A-6B, 7A-7B, 8, and 10 are used to illustrate the method and/or processes of FIG. 9. FIGS. 11A-11D and 12 are used to illustrate the method and/or processes of FIGS. 13A-13D.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The disclosure herein interchangeably refers to detecting a touch input on, at, over, on top of, or substantially within a particular user interface element or a particular portion of a touch-sensitive display. As used herein, a touch input that is detected "at" a particular user interface element could also be detected "on," "over," "on top of," or "substantially within" that same user interface element, depending on the context. In some embodiments and as discussed in more detail below, desired sensitivity levels for detecting touch inputs are configured by a user of an electronic device (e.g., the user could decide (and configure the electronic device to operate) that a touch input should only be detected when the touch input is completely within a user interface element).

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the IPHONE®, IPOD TOUCH®, and IPAD® devices from APPLE Inc. of Cupertino, Calif. Other portable electronic devices, such as laptops or tablet computers with touch-sensitive surfaces (e.g., touch-sensitive displays and/or touch pads), are, optionally, used. It should also be understood that, in some embodiments, the device is not a portable communications device, but is a desktop computer with a touch-sensitive surface (e.g., a touch-sensitive display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a health/fitness application, a photo management application, a digital camera application, a digital video camera application, a network browser application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

FIG. 1A is an illustrative diagram of a portable computing system 100, in accordance with some embodiments. Portable computing system 100 may be, for example, a laptop computer, such as a MACBOOK® device, or any other portable computing device. Portable computing system 100 includes: (A) a display portion 110 with a primary display 102; and (B) a body portion 120 with a dynamic function row 104, a set of physical (i.e., movably actuated) keys 106, and a touch pad 108 partially contained within a same housing. Display portion 110 is typically mechanically, electrically, and communicatively coupled with body portion 120 of portable computing system 100. For example, portable computing system 100 may include a hinge, allowing display portion 110 to be rotated relative to body portion 120. Portable computing system 100 includes one or more processors and memory storing one or more programs for execution by the one or more processors to perform any of the embodiments described herein. In some embodiments, dynamic function row 104 is a touch screen display using resistive sensing, acoustic sensing, capacitive sensing, optical sensing, infrared sensing, or the like to detect user touch inputs and selections. In some embodiments, primary display 102 of display portion 110 is also a touch screen display.

Figure 1:
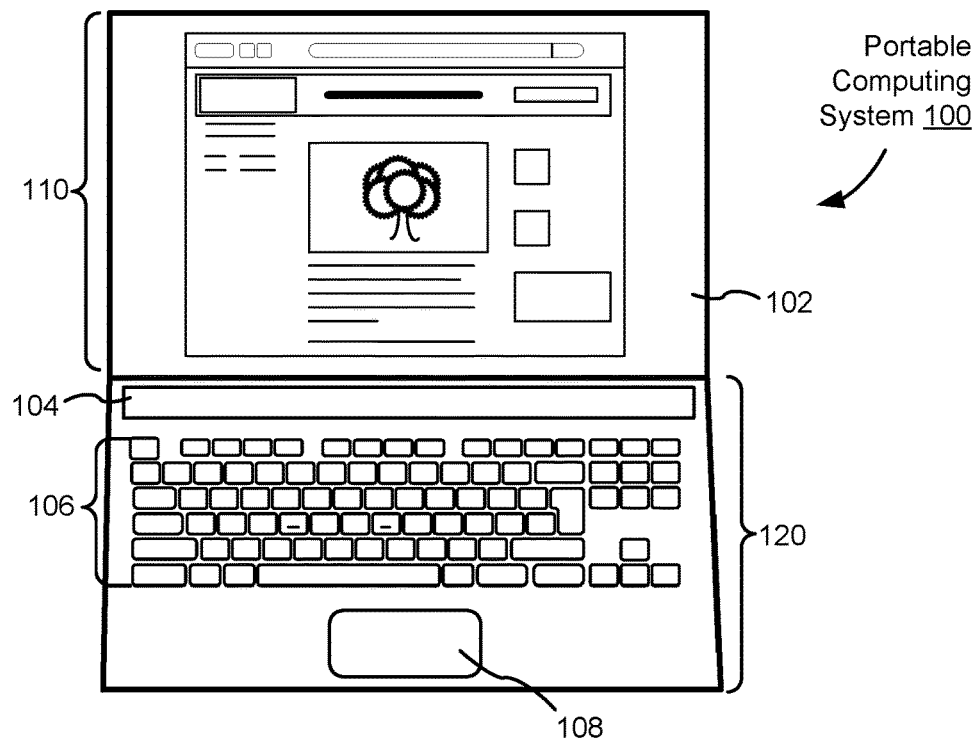
FIG. 1 is an illustrative diagram of a portable computing system (e.g., a laptop computer), in accordance with some embodiments.

In some embodiments, body portion 120 includes a set of physical keys 106, a dynamic function row 104, and a touch pad 108 partially contained within a same housing. The dynamic function row 104 may be a set of physical keys. In some embodiments, dynamic function row 104 is a touch screen and replaces a function row of the set of physical keys 106 allowing the space consumed by the set of physical keys 106 to be reduced, allowing for a smaller overall body portion 120 or allowing other portions, such as touch pad 108, to be larger. In some embodiments, dynamic function row 104 is approximately 18 inches in length relative to a major dimension of the set of physical keys 106. Although called a "row" for ease of explanation, in some other embodiments, the touch screen comprising dynamic function row 104 in FIG. 1 may take any other form such as a square, circle, a plurality of rows, column, a plurality of columns, a plurality of separate sectors, or the like. Although FIG. 1 shows dynamic function row 104 replacing the function row of the set of physical keys 106, in some other embodiments, dynamic function row 104 may additionally and/or alternatively replace a numpad section, editing/function section, or the like of the set of physical keys 106.

Each physical key of the set of physical keys 106 has at least one associated input. The input may be a printable character, non-printable character, function, or other input. The input associated with a physical key may be shown by a letter, word, symbol, or other indicia shown (e.g., printed) on the surface of the key in Latin script, Arabic characters, Chinese characters, or any other script. For example, the particular physical key indicated at 138 is associated with alphabetic character "z" as indicated by the letter z shown on the key. In another example, a physical key labeled with the word "command" may be associated with a command function. For example, the set of physical keys 106 is associated with a QWERTY, Dvorak, or other keyboard layouts with alphanumeric, numeric, and/or editing/function sections (e.g., standard, extended, or compact) according to ISO/IEC 9995, ANSI-INCITS 154-1988, JIS X 6002-1980, or other similar standards.

A signal corresponding to an input associated with a physical key may be received by the processor of portable computing system 100 (or computing device 202 or peripheral keyboard 206 in FIG. 2) when a key has been activated by a user. In an illustrative example, each key of the set of physical keys 106 includes two plates and a spring. A user may activate a key by pressing down on the key, which compresses the spring. When the spring is compressed, the two plates may come into contact, allowing electric current to flow through the connected plates. An input corresponding to the key may be provided to a processor in response to the flow of the current through the connected plates. For example, in response to activation of one of the set of keys 106 of peripheral keyboard 206 in FIG. 2, an input corresponding to the activated key is provided to computing device 202. It will be recognized that other systems for movably actuated keys could be used.

Figure 2:
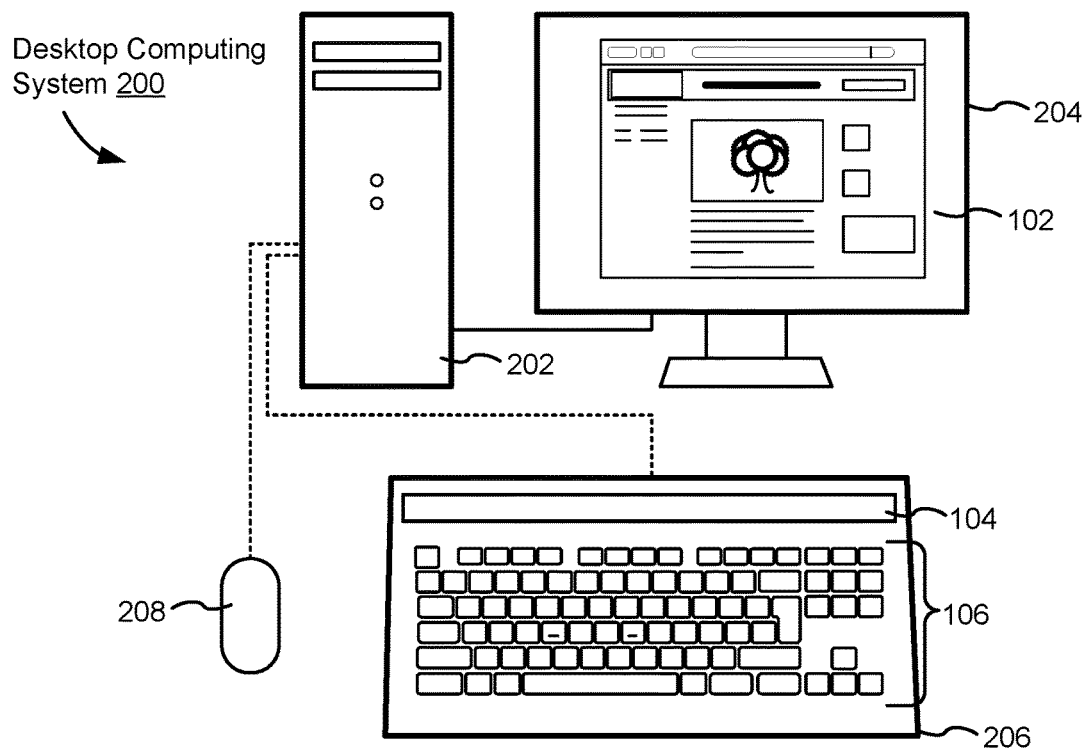
FIG. 2 is an illustrative diagram of an implementation of a desktop computing system, in accordance with some embodiments.

FIG. 2 is an illustrative diagram of an implementation of desktop computing system 200 in accordance with some embodiments. Desktop computing system 200 includes a computing device 202, a peripheral display device 204 with primary display 102, a peripheral keyboard 206, and a peripheral mouse 208. Computing device 202 includes one or more processors and memory storing one or more programs for execution by the one or more processors. In some embodiments, peripheral display device 204 may be integrated with computing device 202 such as an iMAC® device. In some embodiments, primary display 102 of peripheral display device 204 is a touch screen display. Touch-sensitive display is sometimes called a "touch screen" for convenience, and is sometimes known as or called a touch-sensitive display system. In FIG. 2, peripheral display device 204, peripheral keyboard 206, and peripheral mouse 208 are communicatively coupled to computing device 202 via a wired connection, such as USB or PS/2, or via a wireless communication link, using a communication protocol such as Bluetooth, Wi-Fi, or the like. For example, peripheral keyboard 206 is not more than fifteen feet from computing device 202 (e.g. approximately three feet away). In FIG. 2, peripheral keyboard 206 includes dynamic function row 104 and a set of physical keys 106 at least partially contained within a same housing. In some embodiments, dynamic function row 104 is a touch screen display. In some embodiments, peripheral keyboard 206 includes one or more processors and memory storing one or more programs that may be executed by the one or more processors of peripheral keyboard 206 to perform any of the embodiments described herein. In some embodiments, peripheral keyboard 206 relays signals indicating user inputs (e.g., key strokes and selections of user-selectable symbols/affordances displayed by dynamic function row 104) to computing device 202.

Figure 3A:
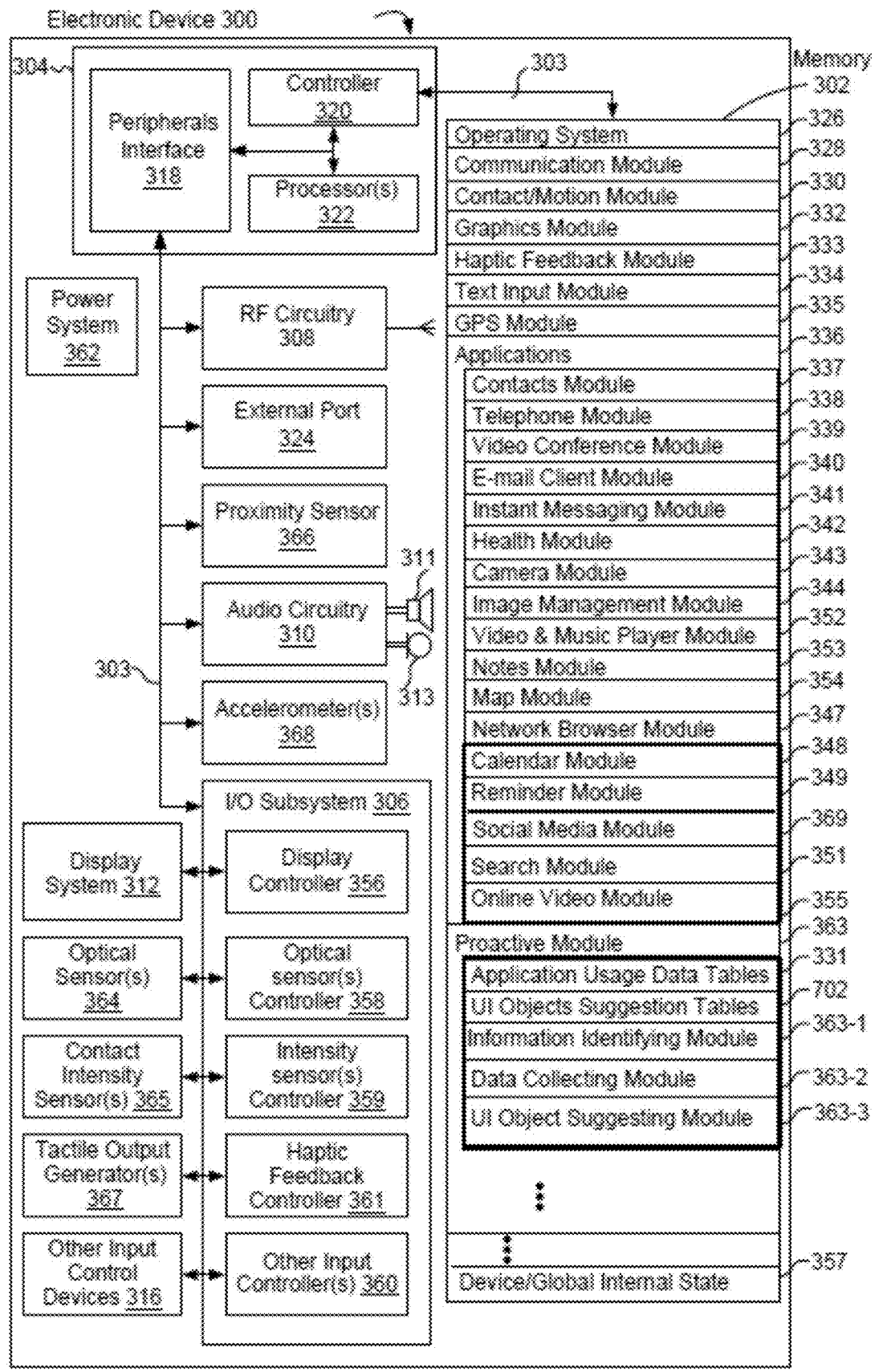
FIG. 3A is a high-level block diagram of an electronic device, in accordance with some embodiments.

FIG. 3A is a high-level block diagram of an electronic device 300, in accordance with some embodiments. In some embodiments, electronic device 300 is a portable electronic device, such as a laptop (e.g., portable computing system 100, FIG. 1), a tablet computer or a handheld device. In some embodiments, the electronic device 300 is not a portable device, but is a desktop computer (e.g., computing device 202 of desktop computing system 200, FIG. 2), which is communicatively coupled with a peripheral display system (e.g., peripheral display device 204, FIG. 2) and optionally a peripheral touch-sensitive surface (e.g., a touch pad 108, FIG. 2 and/or a touch-sensitive display, such as peripheral display device 204, FIG. 2 and/or dynamic function row 104, FIG. 2).

Electronic device 300 typically supports a variety of applications, such as one or more of the following: a drawing application, a presentation application, a word processing application, a website creation application, a disk authoring application, a spreadsheet application, a gaming application, a video conferencing application, an e-mail application, an instant messaging application, an image management application, a digital camera application, a digital video camera application, a network browser application, and/or a media player application.

The various applications that are executed on electronic device 300 optionally use at least one common physical user-interface device, such as the touch-sensitive surface. One or more functions of the touch-sensitive surface as well as corresponding information displayed by electronic device 300 are, optionally, adjusted and/or varied from one application to the next and/or within an application. In this way, a common physical architecture (such as the touch-sensitive surface) of electronic device 300 optionally supports the variety of applications with user interfaces that are intuitive and transparent to the user.

Electronic device 300 includes memory 302 (which optionally includes one or more computer readable storage mediums), memory controller 320, one or more processing units (CPU(s)) 322, peripherals interface 318, RF circuitry 308, audio circuitry 310, speaker 311, microphone 313, input/output (I/O) subsystem 306, other input or control devices 316, and external port(s) 324. Electronic device 300 optionally includes a display system 312 (e.g., primary display 102 of display portion 110, FIG. 1, dynamic function row 104, FIG. 1 and/or touch-sensitive display, such as peripheral display device 204, FIG. 2), which may be a touch-sensitive display (sometimes also herein called a "touch screen" or a "touch screen display"). Electronic device 300 optionally includes one or more optical sensors 364. Electronic device 300 optionally includes one or more contact intensity sensors 365 for detecting intensity of contacts on a touch-sensitive surface such as touch-sensitive display or a touch pad. Electronic device 300 optionally includes one or more tactile output generators 367 for generating tactile outputs on a touch-sensitive surface such as touch-sensitive display or a touch pad (e.g., touch pad 108, FIG. 1). These components optionally communicate over one or more communication buses or signal lines 303.

As used in the specification, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or touch/track pad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that electronic device 300 is only an example and that electronic device 300 optionally has more or fewer components than shown, optionally combines two or more components, or optionally has a different configuration or arrangement of the components. The various components shown in FIG. 3A are implemented in hardware, software, firmware, or a combination thereof, including one or more signal processing and/or application specific integrated circuits.

Memory 302 optionally includes high-speed random access memory (e.g., DRAM, SRAM, DDR RAM or other random access solid state memory devices) and optionally also includes non-volatile memory, such as one or more magnetic disk storage devices, flash memory devices, or other non-volatile solid-state memory devices. Memory 302 optionally includes one or more storage devices remotely located from processor(s) 122. Access to memory 302 by other components of electronic device 300, such as CPU(s) 322 and peripherals interface 318, is, optionally, controlled by memory controller 320. Peripherals interface 318 can be used to couple input and output peripherals to CPU(s) 322 and memory 302. The one or more processing units 322 run or execute various software programs and/or sets of instructions stored in memory 302 to perform various functions for electronic device 300 and to process data. In some embodiments, peripherals interface 318, CPU(s) 322, and memory controller 320 are, optionally, implemented on a single chip, such as chip 304. In some other embodiments, they are, optionally, implemented on separate chips.

Radio frequency (RF) circuitry 308 receives and sends RF signals, also called electromagnetic signals. RF circuitry 308 converts electrical signals to/from electromagnetic signals and communicates with communications networks and other communications devices via the electromagnetic signals. RF circuitry 308 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 308 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g, and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 310, speaker 311, and microphone 313 provide an audio interface between a user and electronic device 300. Audio circuitry 310 receives audio data from peripherals interface 318, converts the audio data to an electrical signal, and transmits the electrical signal to speaker 311. Speaker 311 converts the electrical signal to human-audible sound waves. Audio circuitry 310 also receives electrical signals converted by microphone 313 from sound waves. Audio circuitry 310 converts the electrical signals to audio data and transmits the audio data to peripherals interface 318 for processing. Audio data is, optionally, retrieved from and/or transmitted to memory 302 and/or RF circuitry 308 by peripherals interface 318. In some embodiments, audio circuitry 310 also includes a headset jack. The headset jack provides an interface between audio circuitry 310 and removable audio input/output peripherals, such as output-only headphones or a headset with both output (e.g., a headphone for one or both ears) and input (e.g., a microphone).

I/O subsystem 306 couples the input/output peripherals of electronic device 300, such as display system 312 and other input or control devices 316, to peripherals interface 318. I/O subsystem 306 optionally includes display controller 356, optical sensor controller 358, intensity sensor controller 359, haptic feedback controller 361, and one or more other input controllers 360 for other input or control devices. The one or more other input controllers 360 receive/send electrical signals from/to other input or control devices 316. The other input or control devices 316 optionally include physical buttons (e.g., push buttons, rocker buttons, etc.), dials, slider switches, joysticks, click wheels, and so forth. In some alternate embodiments, other input controller(s) 360 are, optionally, coupled with any (or none) of the following: a keyboard, infrared port, USB port, and a pointer device such as a mouse. The one or more physical buttons optionally include an up/down button for volume control of speaker 311 and/or microphone 313. The one or more buttons optionally include a push button.

Display system 312 (e.g., primary display 102 of display portion 110, FIG. 1, dynamic function row 104, FIG. 1 and/or touch-sensitive display, such as peripheral display device 204, FIG. 2) provides an output interface (and, optionally, an input interface when it is a touch-sensitive display) between electronic device 300 and a user. Display controller 356 receives and/or sends electrical signals from/to display system 312. Display system 312 displays visual output to the user. The visual output optionally includes graphics, text, icons, video, and any combination thereof (collectively termed "graphics"). In some embodiments, some or all of the visual output corresponds to user-interface objects/elements.

In some embodiments, display system 312 (e.g., primary display 102 of display portion 110, FIG. 1, dynamic function row 104, FIG. 1 and/or peripheral display device 204, FIG. 2) is a touch-sensitive display with a touch-sensitive surface, sensor, or set of sensors that accepts input from the user based on haptic and/or tactile contact. As such, display system 312 and display controller 356 (along with any associated modules and/or sets of instructions in memory 302) detect contact (and any movement or breaking of the contact) on display system 312 and convert the detected contact into interaction with user-interface objects (e.g., one or more soft keys, icons, web pages, or images) that are displayed on display system 312. In one example embodiment, a point of contact between display system 312 and the user corresponds to an area under a finger of the user.

Display system 312 (e.g., primary display 102 of display portion 110, FIG. 1, dynamic function row 104, FIG. 1 and/or touch-sensitive display, such as peripheral display device 204, FIG. 2) optionally uses LCD (liquid crystal display) technology, LPD (light emitting polymer display) technology, LED (light emitting diode) technology, or OLED (organic light emitting diode) technology, although other display technologies are used in other embodiments. In some embodiments, when display system 312 is a touch-sensitive display, display system 312 and display controller 356 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with display system 312. In one example embodiment, projected mutual capacitance sensing technology is used, such as that found in the iPHONE®, iPODTOUCH®, and iPAD® from Apple Inc. of Cupertino, Calif.

Display system 312 (e.g., primary display 102 of display portion 110, FIG. 1, dynamic function row 104, FIG. 1 and/or touch-sensitive display, such as peripheral display device 204, FIG. 2) optionally has a video resolution in excess of 400 dpi (e.g., 500 dpi, 800 dpi, or greater). In some embodiments, display system 312 has a video resolution of at least 600 dpi. In other embodiments, display system 312 has a video resolution of at least 100 dpi. The display system 312 may be a touch-sensitive display with which the user optionally makes contact using any suitable object or digit, such as a stylus, a finger, and so forth. In some embodiments, the user interface is designed to work primarily with finger-based contacts and gestures. In some embodiments, electronic device 300 translates the rough finger-based input into a precise pointer/cursor position or command for performing the actions desired by the user.

In some embodiments, in addition to display system 312, electronic device 300 optionally includes a touch pad (e.g., touch pad 108, FIG. 1) for activating or deactivating particular functions. In some embodiments, the touch pad is a touch-sensitive area of electronic device 300 that, unlike display system 312, does not display visual output. In some embodiments, when display system 312 is a touch-sensitive display, the touch pad is, optionally, a touch-sensitive surface that is separate from display system 312, or an extension of the touch-sensitive surface formed by display system 312.

Electronic device 300 also includes power system 362 for powering the various components. Power system 362 optionally includes a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in portable devices.

Electronic device 300 optionally also includes one or more optical sensors 364 coupled to optical sensor controller 358 in I/O subsystem 306. Optical sensor(s) 364 optionally includes charge-coupled device (CCD) or complementary metal-oxide semiconductor (CMOS) phototransistors. Optical sensor(s) 364 receive light from the environment, projected through one or more lenses, and converts the light to data representing an image. In conjunction with imaging module (also called a camera module) 343, optical sensor(s) 364 optionally capture still images or video. In some embodiments, an optical sensor is located on the back of device 300, opposite touch surface on the front of electronic device 300, so that the display system 312 is enabled for use as viewfinder for still and/or video image acquisition. In some embodiments, another optical sensor is located on the front of the device 300 so that the user's image is, optionally, obtained for videoconferencing while the user views the other video conference participants on display system 312.

Electronic device 300 optionally also includes one or more contact intensity sensor(s) 365 coupled with intensity sensor controller 359 in I/O subsystem 306. Contact intensity sensor(s) 365 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 365 receives contact intensity information (e.g., pressure information or a proxy for pressure information) from the environment. In some embodiments, at least one contact intensity sensor is collocated with, or proximate to, a touch-sensitive surface (e.g., touch pad 108, FIG. 1 or display system 312 when it is a touch-sensitive display). In some embodiments, at least one contact intensity sensor 365 is located on the back of device 300, opposite touch surface which is located on the front of device 300.

Electronic device 300 optionally also includes one or more tactile output generators 367 coupled to haptic feedback controller 361 in I/O subsystem 306. Tactile output generator(s) 367 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor(s) 365 receives tactile feedback generation instructions from haptic feedback module 333 and generates tactile outputs that are capable of being sensed by a user of electronic device 300. In some embodiments, at least one tactile output generator is collocated with, or proximate to, a touch-sensitive surface (e.g., touch pad 108, FIG. 1 or display system 312 when it is a touch-sensitive display) and, optionally, generates a tactile output by moving the touch-sensitive surface vertically (e.g., in/out of a surface of electronic device 300) or laterally (e.g., back and forth in the same plane as a surface of electronic device 300).

Electronic device 300 optionally also includes one or more proximity sensors 366 coupled with peripherals interface 318. Alternately, proximity sensor(s) 366 are coupled with other input controller(s) 360 in I/O subsystem 306. Electronic device 300 optionally also includes one or more accelerometers 368 coupled with peripherals interface 318. Alternately, accelerometer(s) 368 are coupled with other input controller(s) 360 in I/O subsystem 306. In some embodiments, the proximity sensor turns off and disables display system 312 when the electronic device 300 is placed near the user's ear (e.g., when the user is making a phone call).

In some embodiments, the software components stored in memory 302 include operating system 326, communication module 328 (or set of instructions), contact/motion module 330 (or set of instructions), graphics module 332 (or set of instructions), applications 336 (or sets of instructions), text input module (or set of instructions) 334, Global Positioning System (GPS) module 335, dynamic function row module 350 (or sets of instructions), and proactive module 363 (optionally including one or more of application usage data tables 331, user interface (UI) object suggestion tables 702, information identifying module 363-1, usage data collecting module 363-2, and UI object suggesting module 363-3). Furthermore, in some embodiments, memory 302 stores device/global internal state 357 (or sets of instructions), as shown in FIG. 3A. Device/global internal state 357 includes one or more of: active application state, indicating which applications, if any, are currently active and/or in focus; display state, indicating what applications, views or other information occupy various regions of display system 312 (e.g., primary display 102 of display portion 110, FIG. 1 and/or dynamic function row 104, FIG. 1) and/or a peripheral display system (e.g., primary display 102 of peripheral display device 204, FIG. 2 and/or dynamic function row 104, FIG. 2); sensor state, including information obtained from various sensors and input or control devices 316 of electronic device 300; and location information concerning the location and/or attitude of electronic device 300.

Operating system 326 (e.g., DARWIN, RTXC, LINUX, UNIX, MACOS, WINDOWS, or an embedded operating system such as VXWorks) includes various software components and/or drivers for controlling and managing general system tasks (e.g., memory management, storage device control, power management, etc.) and facilitates communication between various hardware and software components.

Communication module 328 facilitates communication with other devices (e.g., peripheral display 204, FIG. 2; peripheral mouse 208, FIG. 2 and/or peripheral keyboard 206, FIG. 2) over one or more external ports 324 and/or RF circuitry 308 and also includes various software components for sending/receiving data via RF circuitry 308 and/or external port 324. External port(s) 324 (e.g., Universal Serial Bus (USB), FIREWIRE, etc.) is adapted for coupling directly to other devices or indirectly over a network (e.g., the Internet, wireless LAN, etc.). In some embodiments, external port 324 is a multi-pin (e.g., 30-pin) connector that is the same as, or similar to and/or compatible with the 30-pin connector used on iPod® devices from APPLE Inc. In other embodiments, the external port is a multi-pin (e.g., 8-pin) connector that is the same as, or similar to and/or compatible with the 8-pin connector used in LIGHTNING connectors from APPLE Inc.

Contact/motion module 330 optionally detects contact with display system 312 when it is a touch-sensitive display (in conjunction with display controller 356) and other touch sensitive devices (e.g., a touch pad or physical click wheel). Contact/motion module 330 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 330 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 330 also detects contact on a touch pad (e.g., touch pad 108, FIG. 1).

In some embodiments, contact/motion module 330 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of electronic device 300). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 330 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap contact includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and in some embodiments, subsequently followed by detecting a finger-up (lift off) event.

Graphics module 332 includes various known software components for rendering and causing display of graphics on primary display 102 (e.g., primary display 102 of display portion 110, FIG. 1 or primary display 102 of peripheral display device 204, FIG. 2) or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like. In some embodiments, graphics module 332 stores data representing graphics to be used. Each graphic is, optionally, assigned a corresponding code. Graphics module 332 receives, from applications etc., one or more codes specifying graphics to be displayed along with, if necessary, coordinate data and other graphic property data, and then generates screen image data to output to display controller 356.

Haptic feedback module 333 includes various software components for generating instructions used by tactile output generator(s) 367 to produce tactile outputs at one or more locations on electronic device 300 in response to user interactions with electronic device 300.

Text input module 334, which is, optionally, a component of graphics module 332, provides soft keyboards for entering text in various applications (e.g., contacts module 337, e-mail client module 340, IM module 341, network browser module 347, and any other application that needs text input).

GPS module 335 determines the location of the device and provides this information for use in various applications (e.g., to telephone module 338 for use in location-based dialing, to camera 343 as picture/video metadata, and to applications that provide location-based services such as weather widgets, local yellow page widgets, and map/navigation widgets).

Applications ("apps") 336 optionally include the following modules (or sets of instructions), or a subset or superset thereof:

contacts module 337 (sometimes called an address book or contact list);
    telephone module 338;
    video conferencing module 339;
    e-mail client module 340;
    instant messaging (IM) module 341;
    health module 342;
    camera module 343 for still and/or video images;
    image management module 344;
    network browser module 347
    calendar module 348;
    reminder module 349;
    search module 351;
    video and music player module 352, which is, optionally, made up of a video player module and a music player module;
    notes module 353;
    map module 354;
    online video module 355; and/or
    social media module 369.

Examples of other applications 336 that are, optionally, stored in memory 302 include other messaging and communications applications, social media applications, other word processing applications, other image editing applications, drawing applications, presentation applications, website creation applications, disk authoring applications, spreadsheet applications, JAVA-enabled applications, encryption, digital rights management, voice recognition, widget creator module for making user-created widgets 349-6, and voice replication.

In conjunction with display system 312, input or control devices 316, contact/motion module 330, graphics module 332, and text input module 334, contacts module 337 is, optionally, used to manage an address book or contact list (e.g., stored in contacts module 337 in memory 302), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 338, video conferencing module 339, e-mail client module 340, or IM module 341; and so forth.

In conjunction with RF circuitry 308, audio circuitry 310, speaker 311, microphone 313, display system 312, input or control devices 316, contact module 330, graphics module 332, and text input module 334, telephone module 338 is, optionally, used to enter a sequence of characters corresponding to a telephone number, access one or more telephone numbers in contacts module 337, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 308, audio circuitry 310, speaker 311, microphone 313, display system 312, input or control devices 316, optical sensor 364, optical sensor controller 358, contact module 330, graphics module 332, text input module 334, contact module 337, and telephone module 338, video conferencing module 339 includes executable instructions to initiate, conduct, and terminate a video conference between a user and one or more other participants in accordance with user instructions.

In conjunction with RF circuitry 308, display system 312, input or control devices 316, contact module 330, graphics module 332, and text input module 334, e-mail client module 340 includes executable instructions to create, send, receive, and manage e-mail in response to user instructions. In conjunction with image management module 344, e-mail client module 340 makes it very easy to create and send e-mails with still or video images taken with camera module 343. Additionally, in conjunction with network browser module 347, e-mail client module 340 may create and send e-mails with internet links (e.g., uniform resource locators (URLs)).

In conjunction with RF circuitry 308, network browser module 347, contact module 330, graphics module 332, and text input module 334, the instant messaging module 341 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 308, display system 312, input or control devices 316, contact module 330, graphics module 332, text input module 334, GPS module 335, map module 354, and video and music player module 346, health module 342 includes executable instructions to create workouts (e.g., with time, distance, and/or calorie burning goals), communicate with workout sensors (sports devices such as a watch or a pedometer), receive workout sensor data, calibrate sensors used to monitor a workout, select and play music for a workout, and display, store and transmit workout data.

In conjunction with display system 312, input or control devices 316, optical sensor(s) 364, optical sensor controller 358, contact module 330, graphics module 332, and image management module 344, camera module 343 includes executable instructions to capture still images or video (including a video stream) and store them into memory 302, modify characteristics of a still image or video, or delete a still image or video from memory 302.

In conjunction with display system 312, input or control devices 316, contact module 330, graphics module 332, text input module 334, and camera module 343, image management module 344 includes executable instructions to arrange, modify (e.g., edit), or otherwise manipulate, label, delete, present (e.g., in a digital slide show or album), and store still and/or video images.

In conjunction with RF circuitry 308, display system 312, input or control devices 316, contact module 330, graphics module 332, and text input module 334, network browser module 347 includes executable instructions to browse the Internet in accordance with user instructions, including searching, linking to, receiving, and displaying web pages or portions thereof, as well as attachments and other files linked to web pages.

In conjunction with RF circuitry 308, display system 312, input or control devices 316, contact module 330, graphics module 332, text input module 334, e-mail client module 340, IM module 341, network browser module 347, note module 353, and reminder module 349, calendar module 348 includes executable instructions to create, display, modify, and store calendars and data associated with calendars (e.g., calendar entries, to do lists, etc.) in accordance with user instructions.

In conjunction with RF circuitry 308, display system 312, input or control devices 316, contact module 330, graphics module 332, text input module 334, and network browser module 347, a widget creator module (not pictured) is, optionally, used by a user to create widgets (e.g., turning a user-specified portion of a web page into a widget).

In conjunction with display system 312, input or control devices 316, contact module 330, graphics module 332, and text input module 334, search module 351 includes executable instructions to search for user interface objects (e.g., internet links such as URLs) in the device contextual data associated with one or more applications (e.g., text message, calendar, reminder, notes, e-mail, social medial communication, etc.) in memory 302 that match one or more criteria (e.g., a topic related to the user's input, time of the user's input or usage history).

In conjunction with display system 312, input or control devices 316, contact module 330, graphics module 332, audio circuitry 310, speaker 311, RF circuitry 308, and network browser module 347, video and music player module 352 includes executable instructions that allow the user to download and play back recorded music and other sound files stored in one or more file formats, such as MP3 or AAC files, and executable instructions to display, present or otherwise play back videos (e.g., on display system 312 or on an external, connected display via external port 324). In some embodiments, device 300 optionally includes the functionality of an MP3 player, such as an IPOD from APPLE Inc.

In conjunction with display system 312, input or control devices 316, contact module 330, graphics module 332, text input module 334, and reminder module 349, notes module 353 includes executable instructions to create and manage notes, to do lists, and the like in accordance with user instructions.

In conjunction with RF circuitry 308, display system 312, input or control devices 316, contact module 330, graphics module 332, text input module 334, GPS module 335, and network browser module 347, map module 354 is, optionally, used to receive, display, modify, and store maps and data associated with maps (e.g., driving directions; data on stores and other points of interest at or near a particular location; and other location-based data) in accordance with user instructions.

In conjunction with display system 312, input or control devices 316, contact module 330, graphics module 332, audio circuitry 310, speaker 311, radio frequency (RF) circuitry 308, text input module 334, e-mail client module 340, and internet browser module 147, online video module 355 includes instructions that allow the user to access, browse, receive (e.g., by streaming and/or download), play back (e.g., on the touch screen or on an external, connected display via external port 324), send an e-mail with a link to a particular online video, and otherwise manage online videos in one or more file formats, such as H.264. In some embodiments, rather than e-mail client module 340, instant messaging module 341, calendar module 348, note module 353, and/or reminder module 349 is used to send a link to a particular online video.

As pictured in FIG. 3A, electronic device 300 also includes a proactive module 363 for proactively identifying user interface objects (e.g., internet links) directed to information of interest to the user and displaying the identified links in a user interface (e.g., suggestion in SAFARI) on the electronic device. Proactive module 363 optionally includes the following modules (or sets of instructions), or a subset or superset thereof:

application usage tables 331;
UI object suggestion tables 702;
information identifying module 363-1;
data collecting module 363-2; and
UI object suggestion module 363-3.

Figure 3B:
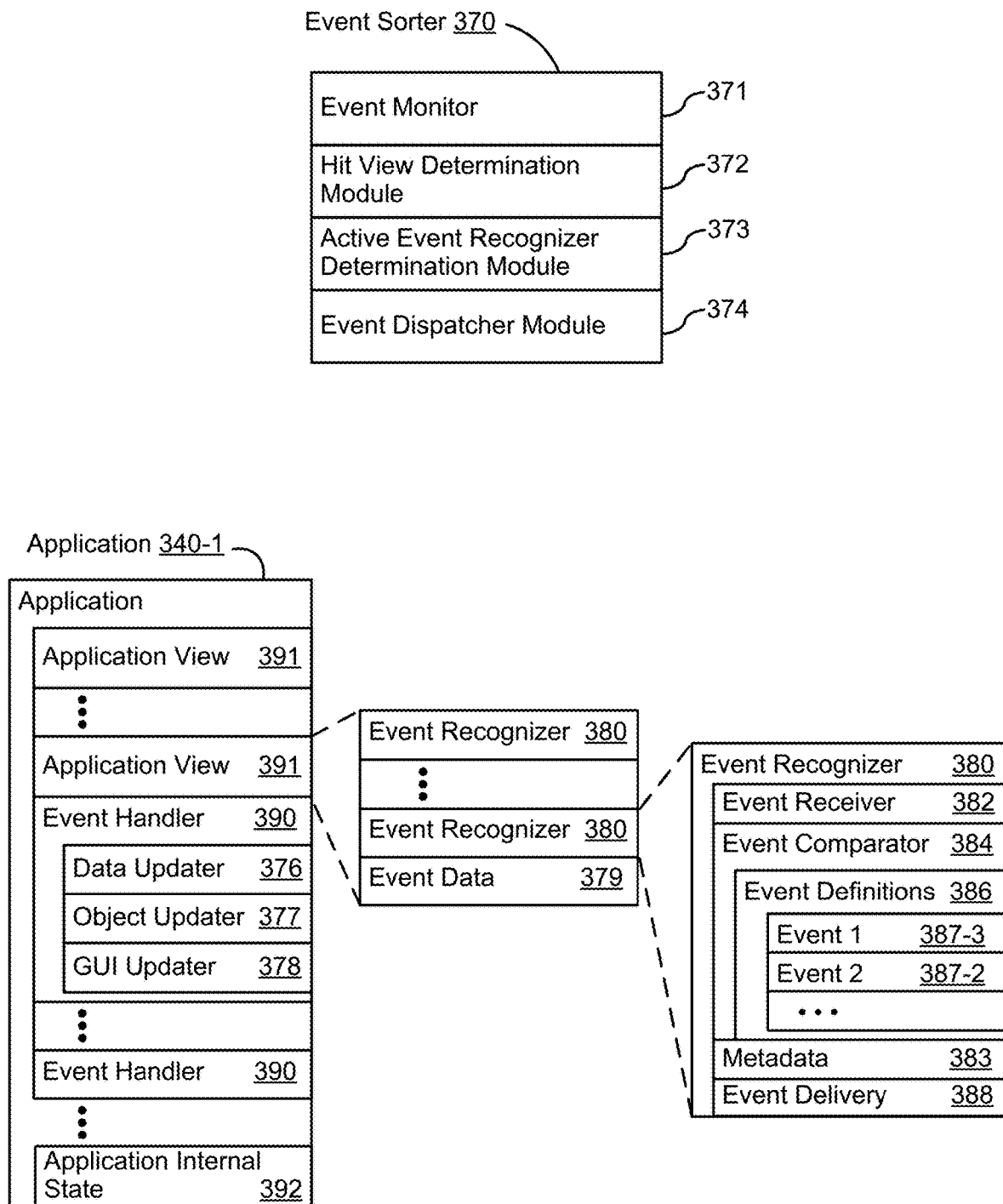
FIG. 3B is a block diagram of components for event handling of FIG. 3A, in accordance with some embodiments.

In conjunction with applications 336, GPS module 335, operating system 326, I/O subsystem 306, RF circuitry 308, external port(s) 324, proximity sensor 366, audio circuitry 310, accelerometers 368, speaker 311, microphone 313, and peripherals interface 318, the application usage tables 331 and data collecting module 363-2 receive (e.g., from the components of device 300 identified above, FIG. 3A) and/or store application usage data. In some embodiments, the application usage is reported to the data collecting module 363-2 and then stored in the application usage tables 331. In some embodiments, application usage data includes all (or the most important, relevant, or predictive) contextual information corresponding to a user's use of the device 300 or a particular application 336 and information received in the particular application 336. In some embodiments, each particular application stores the data while the user is interacting with the application and/or the application(s) on the electronic device is receiving the data; the data is then reported to the application usage data tables 331 for storage (e.g., as shown in FIG. 3B, usage data 393 for a particular application 336-1, including all sensor readings, in-application actions performed, device coupling information, data received in an application different from the particular application, etc., and this usage data 193 gets sent to the application usage table 331 for storage as a record within the table). For example, while the user interacts with network browser module 347, data collection module 363-2 collects application usage data received from the user and/or received from a different electronic device; all contextual usage information is then stored in the application usage tables 331, including current GPS coordinates of the system 100 (e.g., as determined by GPS module 335), motion data (e.g., as determined by accelerometers 368), ambient light data (e.g., as determined by optical sensor 364), calendar events, instant messages, posts on the social media application, and in-application actions performed by the user within the network browser module 347 (e.g., URLs visited, amount of time spent visiting each page) among other sensor data and other contextual usage information received and stored by the application usage tables 331. In some embodiments, information identifying module 363-1 then mines and analyzes the usage data stored in application usage tables 331 to identify relevant information, such as the time and/or amount of time the user spent visiting a webpage, the internet link (e.g., URL) contained in a received message, the receiving time of the message, the topic associated with the data, etc. The identified information, again, may be received by and stored in application usage tables 331 with its corresponding usage data. Additional information regarding application usage tables 331 is provided below in reference to FIGS. 6A-6B. As discussed below in reference to FIG. 8, the application usage data, in some embodiments, is stored remotely (e.g., at one or more servers 802, FIG. 8).

In some embodiments, UI object suggestion tables 702 and UI object suggesting module 363-3 receive and/or store suggested UI objects (e.g., internet links) that are established based on the usage data stored in application usage tables 331. In some embodiments, UI object suggesting module 363-3 mines and analyzes the data stored in the application usage tables 331 in order to identify patterns and/or information relating to internet links (e.g., URLs). For example, if the application usage data indicates that the user has searched for news about Prince William and Prince Harry using the network browser application, then the UI object suggesting module 363-3 creates and stores a suggested UI object (e.g., URL) in the UI object suggestion tables 702 that, when the user uses the network browser application (e.g., invoking the network browser application, requesting display of a new webpage tab in the network browser application, or entering an input into a search or internet address field of the user interface of the network browser application), causes the network browser application to display a suggested user interface object (e.g., a URL) directed to the British royal family to allow the user to easily access the webpage he may be of interest. Additional information regarding UI object suggestion tables 702 are provided below in reference to FIGS. 7A-7B. As discussed below in reference to FIG. 8, in some embodiments, suggestion of UI objects (e.g., internet links) based on the information of the usage data is performed at a remote server (e.g., at one or more servers 802, FIG. 8).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 302 optionally stores a subset of the modules and data structures identified above. Furthermore, memory 302 optionally stores additional modules and data structures not described above.

In some embodiments, device 300 is a device where operation of a predefined set of functions on the device is performed exclusively through a touch screen and/or a touchpad. By using a touch screen and/or a touchpad as the primary input control device for operation of device 300, the number of physical input control devices (such as push buttons, dials, and the like) on device 300 is, optionally, reduced. The predefined set of functions that are performed exclusively through a touch screen and/or a touchpad optionally include navigation between user interfaces. In some embodiments, the touchpad, when touched by the user, navigates device 300 to a main, home, or root menu from any user interface that is displayed on device 300. In such embodiments, a "menu button" is implemented using a touchpad. In some other embodiments, the menu button is a physical push button or other physical input control device instead of a touchpad.

FIG. 3B is a block diagram illustrating exemplary components for event handling in accordance with some embodiments. In some embodiments, memory 302 (in FIG. 3A) includes event sorter 370 (e.g., in operating system 326) and a respective application 336-1 selected from among the applications 336 of electronic device 300 (FIG. 3A) (e.g., any of the aforementioned applications stored in memory 302 with applications 336).

Event sorter 370 receives event information and determines the application 336-1 and application view 391 of application 336-1 to which to deliver the event information. Event sorter 370 includes event monitor 371 and event dispatcher module 374. In some embodiments, application 336-1 includes application internal state 392, which indicates the current application view(s) displayed on touch sensitive display 312 when the application is active or executing. In some embodiments, device/global internal state 357 is used by event sorter 370 to determine which application(s) is (are) currently active, and application internal state 392 is used by event sorter 370 to determine application views 391 to which to deliver event information.

In some embodiments, application internal state 392 includes additional information, such as one or more of: resume information to be used when application 336-1 resumes execution, user interface state information that indicates information being displayed or that is ready for display by application 336-1, a state queue for enabling the user to go back to a prior state or view of application 336-1, and a redo/undo queue of previous actions taken by the user.

Event monitor 371 receives event information from peripherals interface 318. Event information includes information about a sub-event (e.g., a user touch on display system 312, as part of a multi-touch gesture). Peripherals interface 318 transmits information it receives from I/O subsystem 306 or a sensor, such as proximity sensor 366, accelerometer(s) 368, and/or microphone 313 (through audio circuitry 310). Information that peripherals interface 318 receives from I/O subsystem 306 includes information from display system 312 or a touch-sensitive surface.

In some embodiments, event monitor 371 sends requests to the peripherals interface 318 at predetermined intervals. In response, peripherals interface 318 transmits event information. In other embodiments, peripherals interface 318 transmits event information only when there is a significant event (e.g., receiving an input above a predetermined noise threshold and/or for more than a predetermined duration).

In some embodiments, event sorter 370 also includes a hit view determination module 372 and/or an active event recognizer determination module 373. Hit view determination module 372 provides software procedures for determining where a sub-event has taken place within one or more views, when display system 312 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 372 receives information related to sub-events of a touch-based gesture. When an application has multiple views organized in a hierarchy, hit view determination module 372 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 373 determines which view or views within a view hierarchy should receive a particular sequence of sub-events. In some embodiments, active event recognizer determination module 373 determines that only the hit view should receive a particular sequence of sub-events. In other embodiments, active event recognizer determination module 373 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 374 dispatches the event information to an event recognizer (e.g., event recognizer 380). In embodiments including active event recognizer determination module 373, event dispatcher module 374 delivers the event information to an event recognizer determined by active event recognizer determination module 373. In some embodiments, event dispatcher module 374 stores in an event queue the event information, which is retrieved by a respective event receiver 382.

In some embodiments, operating system 326 includes event sorter 370. Alternatively, application 336-1 includes event sorter 370. In yet other embodiments, event sorter 370 is a stand-alone module, or a part of another module stored in memory 302, such as contact/motion module 330.

In some embodiments, application 336-1 includes a plurality of event handlers 390 and one or more application views 391, each of which includes instructions for handling input (e.g., touch) events that occur within a respective view of the application's user interface. Each application view 391 of the application 336-1 includes one or more event recognizers 380. Typically, a respective application view 391 includes a plurality of event recognizers 380. In other embodiments, one or more of event recognizers 380 are part of a separate module, such as a user interface kit (not shown) or a higher level object from which application 336-1 inherits methods and other properties. In some embodiments, a respective event handler 390 includes one or more of: data updater 376, object updater 377, GUI updater 378, and/or event data 379 received from event sorter 370. Event handler 390 optionally utilizes or calls data updater 376, object updater 377 or GUI updater 378 to update the application internal state 392. Alternatively, one or more of the application views 391 includes one or more respective event handlers 390. Also, in some embodiments, one or more of data updater 376, object updater 377, and GUI updater 378 are included in a respective application view 391.

A respective event recognizer 380 receives event information (e.g., event data 379) from event sorter 370, and identifies an event from the event information. Event recognizer 380 includes event receiver 382 and event comparator 384. In some embodiments, event recognizer 380 also includes at least a subset of: metadata 383, and event delivery instructions 388 (which optionally include sub-event delivery instructions).

Event receiver 382 receives event information from event sorter 370. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from portrait to landscape, or vice versa), and the event information includes corresponding information about the current orientation (also called device attitude) of the device.

Event comparator 384 compares the event information to predefined event or sub-event definitions and, based on the comparison, determines an event or sub-event, or determines or updates the state of an event or sub-event. In some embodiments, event comparator 384 includes event definitions 386. Event definitions 386 contain definitions of events (e.g., predefined sequences of sub-events), for example, event 1 (387-1), event 2 (387-2), and others. In some embodiments, sub-events in an event 387 include, for example, touch begin, touch end, touch movement, touch cancellation, and multiple touching. In one example, the definition for event 1 (387-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (387-2) is a dragging on a displayed object. The dragging, for example, comprises a touch (or contact) on the displayed object for a predetermined phase, a movement of the touch across touch-sensitive display 312, and lift-off of the touch (touch end). In some embodiments, the event also includes information for one or more associated event handlers 390.

In some embodiments, event definition 386 includes a definition of an event for a respective user-interface object. In some embodiments, event comparator 384 performs a hit test to determine which user-interface object is associated with a sub-event. For example, in an application view in which three user-interface objects are displayed on display system 312, when a user input (e.g., touch) is detected on the display system (e.g., touch-sensitive display) 312, event comparator 384 performs a hit test to determine which of the three user-interface objects is associated with the user input (e.g., touch) (sub-event). If each displayed object is associated with a respective event handler 390, the event comparator uses the result of the hit test to determine which event handler 390 should be activated. For example, event comparator 384 selects an event handler associated with the sub-event and the object triggering the hit test.

In some embodiments, the definition for a respective event 387 also includes delayed actions that delay delivery of the event information until after it has been determined whether the sequence of sub-events does or does not correspond to the event recognizer's event type.

When a respective event recognizer 380 determines that the series of sub-events do not match any of the events in event definitions 386, the respective event recognizer 380 enters an event impossible, event failed, or event ended state, after which it disregards subsequent sub-events of the touch-based gesture. In this situation, other event recognizers, if any remain active for the hit view, continue to track and process sub-events of an ongoing touch-based gesture.

In some embodiments, a respective event recognizer 380 includes metadata 383 with configurable properties, flags, and/or lists that indicate how the event delivery system should perform sub-event delivery to actively involved event recognizers. In some embodiments, metadata 383 includes configurable properties, flags, and/or lists that indicate how event recognizers interact, or are enabled to interact, with one another. In some embodiments, metadata 383 includes configurable properties, flags, and/or lists that indicate whether sub-events are delivered to varying levels in the view or programmatic hierarchy.

In some embodiments, a respective event recognizer 380 activates event handler 390 associated with an event when one or more particular sub-events of an event are recognized. In some embodiments, a respective event recognizer 380 delivers event information associated with the event to event handler 390. Activating an event handler 390 is distinct from sending (and deferred sending) sub-events to a respective hit view. In some embodiments, event recognizer 380 throws a flag associated with the recognized event, and event handler 390 associated with the flag catches the flag and performs a predefined process.

In some embodiments, event delivery instructions 388 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 376 creates and updates data used in application 336-1. For example, data updater 376 updates the telephone number used in contacts module 337, or stores a video file used in video and music player module 345. In some embodiments, object updater 377 creates and updates objects used in application 336-1. For example, data updater 376 creates a new user-interface object or updates the position of a user-interface object. GUI updater 378 updates the GUI. For example, GUI updater 378 prepares display information and sends it to graphics module 332 for display on the display system 312.

In some embodiments, event handler(s) 390 includes or has access to data updater 376, object updater 377, and GUI updater 378. In some embodiments, data updater 376, object updater 377, and GUI updater 378 are included in a single module of a respective application 336-1 or application view 391. In other embodiments, they are included in two or more software modules.

In some embodiments, each particular application 336-1 stores usage data while the user is interacting with the application and/or the application(s) on the electronic device is receiving the data; the data is then reported to the application usage data tables 331 for storage (e.g., usage data 393 for a particular application 336-1, FIG. 3A, includes all sensor readings, in-application actions performed, device coupling info, data received in an application different from the particular application, etc., and this usage data 393 gets sent to a respective application usage table 331 for the particular application for storage as a record within the table). In some embodiments, usage data 393 stores data as reported by usage data collecting module 363-2 while the particular application 336-1 is in use (or in focus) (i.e., the user is actively interactive with the particular application 336-1) or in the background (i.e., the application is invoked but the user is not actively interactive with the particular application 336-1).

It shall be understood that the foregoing discussion regarding event handling of user touches on touch-sensitive displays also applies to other forms of user inputs to operate multifunction devices 300 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof is optionally utilized as inputs corresponding to sub-events which define an event to be recognized.

Figure 4A:
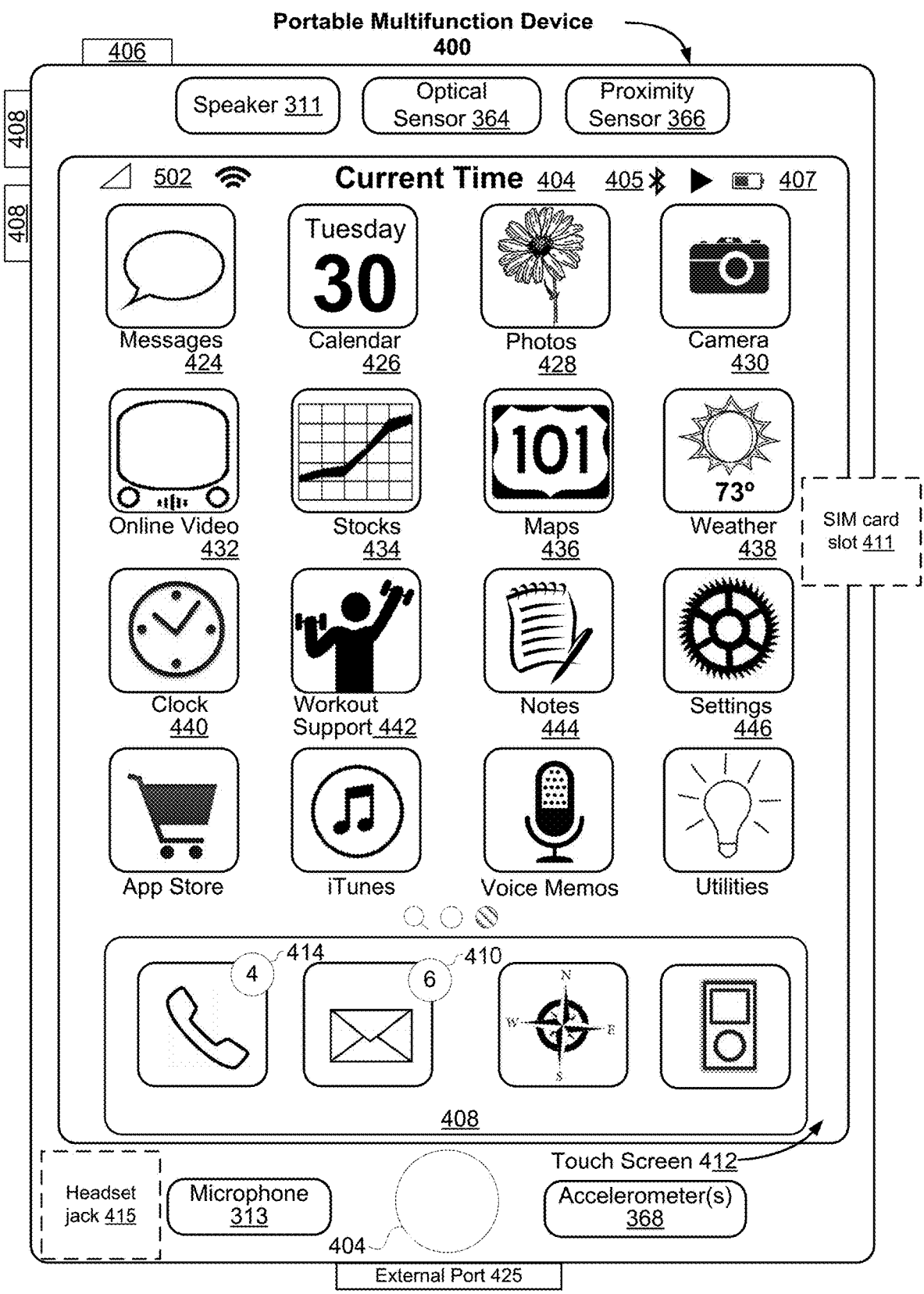
FIG. 4A is a schematic of a portable multifunction device having a touch-sensitive display for displaying a menu of applications, in accordance with some embodiments.

FIG. 4A is a schematic of an exemplary portable multifunction device (e.g., portable multifunction device) 400 having a touch-sensitive display (e.g., touch screen 412) in accordance with some embodiments. In this embodiment, as well as others described below, a user can select one or more of the graphics by making a gesture on the screen, for example, with one or more fingers or one or more styluses. In some embodiments, selection of one or more graphics occurs when the user breaks contact with the one or more graphics (e.g., by lifting a finger off of the screen). In some embodiments, the gesture optionally includes one or more tap gestures (e.g., a sequence of touches on the screen followed by liftoffs), one or more swipe gestures (continuous contact during the gesture along the surface of the screen, e.g., from left to right, right to left, upward and/or downward), and/or a rolling of a finger (e.g., from right to left, left to right, upward and/or downward) that has made contact with system 100. In some implementations or circumstances, inadvertent contact with a graphic does not select the graphic. For example, a swipe gesture that sweeps over an application affordance (e.g., an icon) optionally does not launch (e.g., open) the corresponding application when the gesture for launching the application is a tap gesture.

Device 400 optionally also includes one or more physical buttons, such as a "home" or menu button 404. As described previously, menu button 404 is, optionally, used to navigate to any application 336 in a set of applications that are, optionally executed on device 400. Alternatively, in some embodiments, the menu button is implemented as a soft key in a GUI displayed on touch screen 412.

In one embodiment, device 400 includes touch screen 412, menu button 404, push button 406 for powering the device on/off and locking the device, volume adjustment button(s) 408, Subscriber Identity Module (SIM) card slot 411, head set jack 415, and docking/charging external port 425. Push button 406 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 400 also accepts verbal input for activation or deactivation of some functions through microphone 313. Device 400 also, optionally, includes one or more contact intensity sensors 365 for detecting intensity of contacts on touch screen 412 and/or one or more tactile output generators 367 for generating tactile outputs for a user of device 400. In various embodiments, the device 400 includes the same modules depicted with respect to device 300 in FIG. 3A.

Figure 4B:
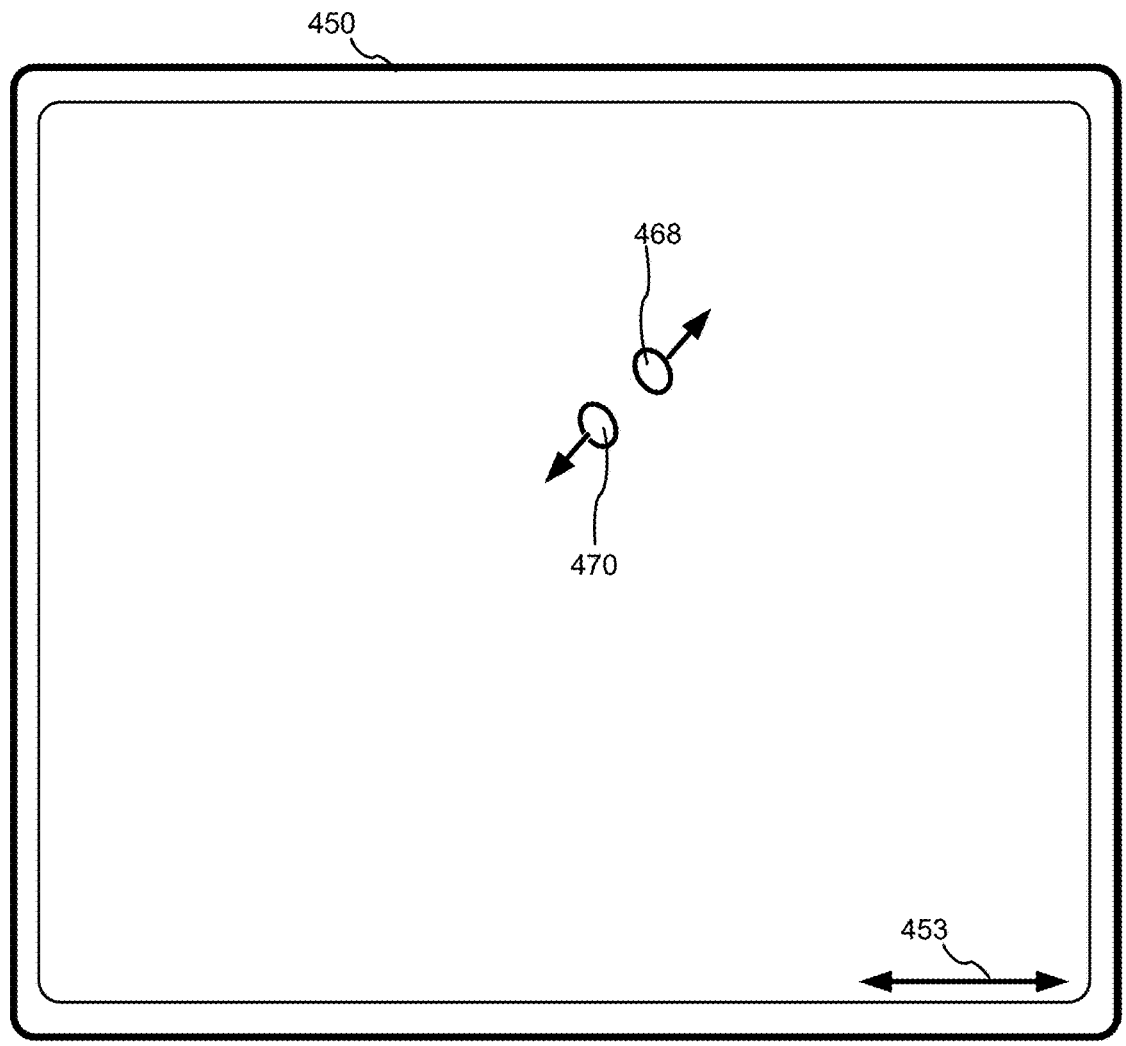
FIG. 4B is a schematic used to illustrate a computing device with a touch-sensitive surface that is separate from the display, in accordance with some embodiments.
Figure 4B:
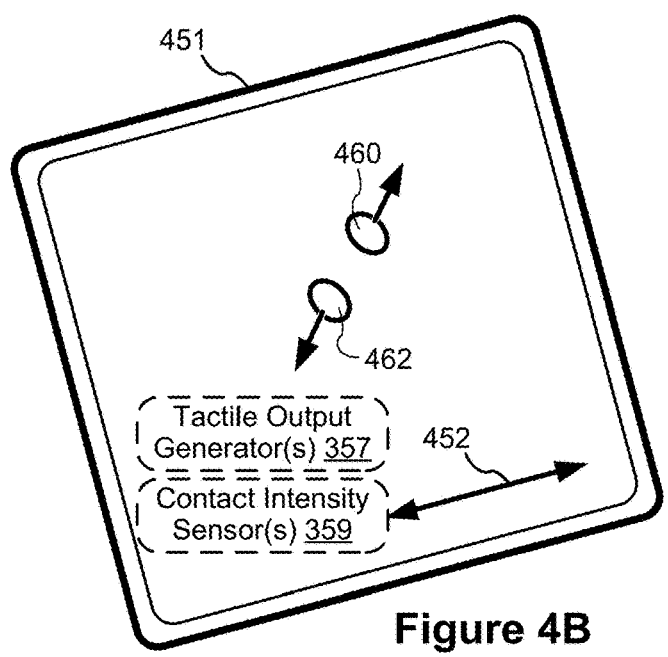

FIG. 4B is a schematic used to illustrate a user interface on a device (e.g., device 400, FIG. 4A) with a touch-sensitive surface 475 (e.g., a tablet or touchpad) that is separate from the display 474 (e.g., touch screen 412). In some embodiments, touch-sensitive surface 495 includes one or more contact intensity sensors (e.g., one or more of contact intensity sensor(s) 365) for detecting intensity of contacts on touch-sensitive surface 475 and/or one or more tactile output generator(s) 367 for generating tactile outputs for a user of touch-sensitive surface 475.

Although some of the examples which follow will be given with reference to inputs on touch screen 412 (where the touch sensitive surface and the display are combined), in some embodiments, the device detects inputs on a touch-sensitive surface that is separate from the display, as shown in FIG. 4B. In some embodiments the touch sensitive surface (e.g., 475 in FIG. 4B) has a primary axis (e.g., 479 in FIG. 4B) that corresponds to a primary axis (e.g., 478 in FIG. 4B) on the display (e.g., 474). In accordance with these embodiments, the device detects contacts (e.g., 477-1 and 477-2 in FIG. 4B) with the touch-sensitive surface 475 at locations that correspond to respective locations on the display (e.g., in FIG. 4B, 477-1 corresponds to 476-1 and 477-2 corresponds to 476-2). In this way, user inputs (e.g., contacts 477-1 and 477-2, and movements thereof) detected by the device on the touch-sensitive surface (e.g., 475 in FIG. 4B) are used by the device to manipulate the user interface on the display (e.g., 474 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touch-sensitive surface 475 in FIG. 4B (touch-sensitive surface 475, in some embodiments, is a touchpad)) while the cursor is over a particular user interface element (e.g., a button, window, slider or other user interface element), the particular user interface element is adjusted in accordance with the detected input. In some implementations that include a touch-screen display (e.g., touch screen 412) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch-sensitive display) will indicate that the user is intending to activate the respective button (as opposed to other user interface elements shown on a display of the device).

Attention is now directed towards user interface ("UI") embodiments and associated processes that may be implemented on an electronic device with a display and, in some embodiments, a touch-sensitive surface, such as device 400.

Referring again to FIG. 4A, in some embodiments, the user interface displayed on the touch screen 412 includes the following elements, or a subset or superset thereof:

- Signal strength indicator(s) 402 for wireless communication(s), such as cellular and Wi-Fi signals;
- Time 403;
- Bluetooth indicator 405;
- Battery status indicator 407;
- Tray 409 with icons for frequently used applications, such as:
  - Icon 416 for telephone module 338, labeled "Phone," which optionally includes an indicator 414 of the number of missed calls or voicemail messages;
  - Icon 418 for e-mail client module 340, labeled "Mail," which optionally includes an indicator 410 of the number of unread e-mails;
  - Icon 420 for network browser module 347, labeled "Browser;" and
  - Icon 422 for video and music player module 352, also referred to as IPOD (trademark of APPLE Inc.) module 352, labeled "iPod;" and
- Icons for other applications, such as:
  - Icon 424 for IM module 341, labeled "Messages;"
  - Icon 426 for calendar module 348, labeled "Calendar;"
  - Icon 428 for image management module 344, labeled "Photos;"
  - Icon 430 for camera module 343, labeled "Camera;"
  - Icon 432 for online video module 355, labeled "Online Video"
  - Icon 434 for stocks widget, labeled "Stocks;"
  - Icon 436 for map module 354, labeled "Maps;"
  - Icon 438 for weather widget 349-1, labeled "Weather;"
  - Icon 440 for alarm clock widget 349-4, labeled "Clock;"
  - Icon 442 for health module 342, labeled "Health;"
  - Icon 444 for notes module 353, labeled "Notes;"
  - Icon 446 for a settings application or module, which provides access to settings for device 500 and its various applications; and
  - Other icons for additional applications, such as App Store, iTunes, Voice Memos, and Utilities.

It should be noted that the icon labels illustrated in FIG. 4A are merely exemplary. Other labels are, optionally, used for various application icons. For example, icon 442 for health module 342 is alternatively labeled "Fitness Support," "Workout," "Workout Support," "Exercise," "Exercise Support," or "Fitness." In some embodiments, a label for a respective application icon includes a name of an application corresponding to the respective application icon. In some embodiments, a label for a particular application icon is distinct from a name of an application corresponding to the particular application icon.

Figure 5:
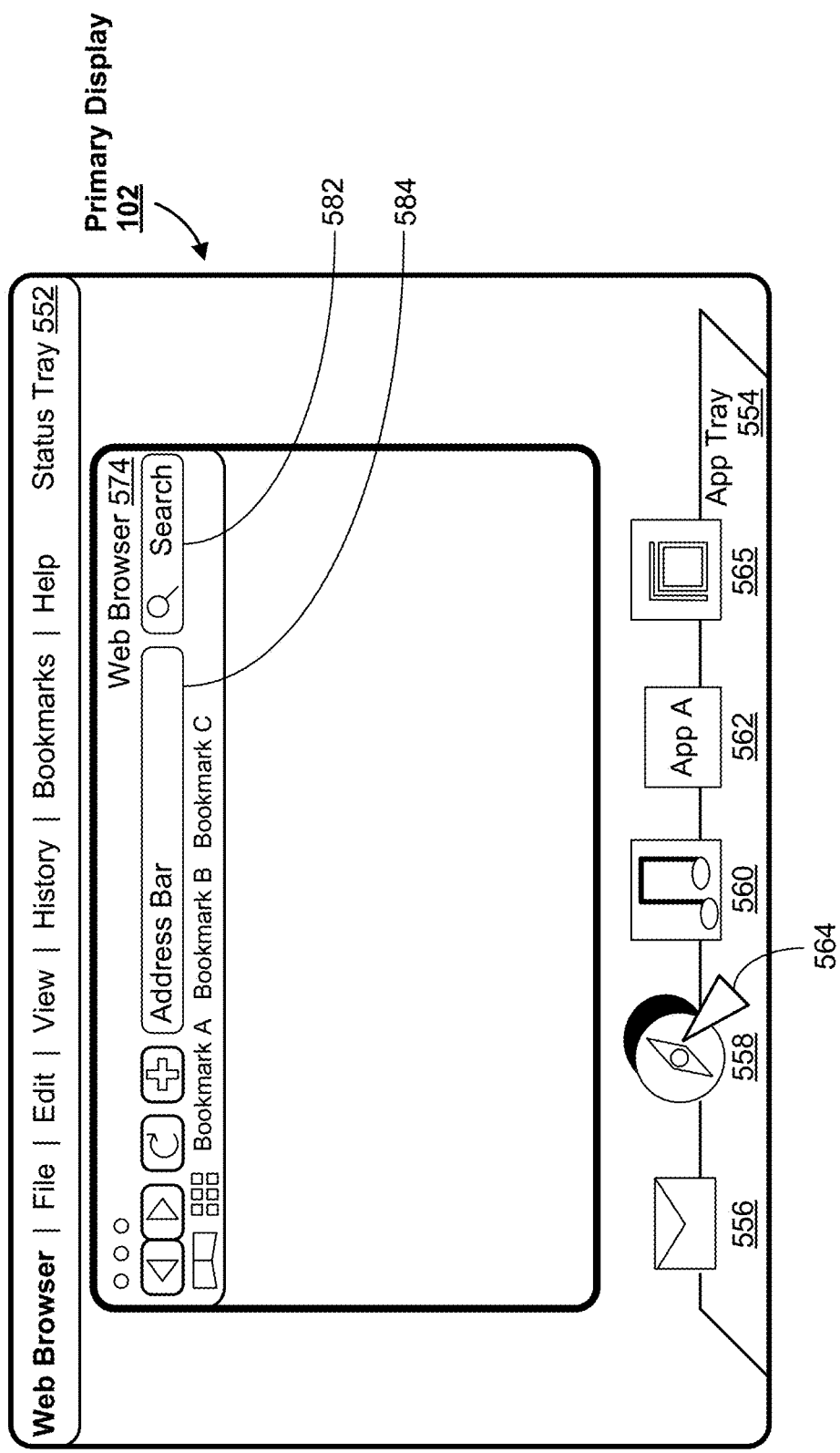
FIG. 5 illustrates an exemplary user interface displayed on an output device, in accordance with some embodiments.

FIG. 5 illustrates another schematic of a display (e.g., primary display 102, FIG. 1) used to illustrate a user interface for a menu of applications, in accordance with some embodiments. In some embodiments, the user interface displayed on the primary display 1-2 includes the following elements, or a subset or superset thereof: a status tray 552 indicating which application (i.e., the network browser application in this case) is currently in focus, and an application (app) tray or dock 554 with a plurality of executable/selectable application icons including, for example, a mail application icon 556 (e.g., corresponding to e-mail client module 340, FIG. 3A), an internet browser application icon 558 (e.g., corresponding to network browser module 347, FIG. 3A), a media player application icon 560 (e.g., corresponding to media player module 352, FIG. 3A), an application A icon 562 (e.g., corresponding to a game), a photo application icon 565 (e.g., corresponding to image management module 344, FIG. 3A), etc. In some embodiments, status tray 552 indicates the application that is currently running in the foreground and also includes a plurality of menus (e.g., the file, edit, view, history, favorites, and help menus in FIG. 5) each including a set of corresponding controls for the application. FIG. 5 also illustrates primary display 102 displaying cursor 564 at a location corresponding to internet browser application icon 558. In some embodiments, cursor 564 is controlled by touch pad 108 of portable computing system 100 (FIG. 1), peripheral mouse 208 of desktop computing system 200 (FIG. 2), or the like. In some embodiments, the user interface for the network browser application also includes a search field 582 and/or an internet address field 584 for the user to search a webpage of interest. In some embodiments, the search field 582 and internet address field 584 are the same and correspond to the same region.

In response to detecting selection of internet browser application icon 558 with cursor 564, the network browser module 347 and graphics module 332 may cooperatively cause the primary display 102 to display a window 574 for the network browser application (e.g., internet browser application). The window 574 includes controls for the network browser application including browsing controls (e.g., last web page, next web page, refresh, and add to favorites), an address bar, a search bar, a show-all favorites affordance (e.g., resembling an open book), a show-all open tabs affordance (e.g., a grid of six squares), and affordances for particular favorites A, B, and C.

Figure 6A:
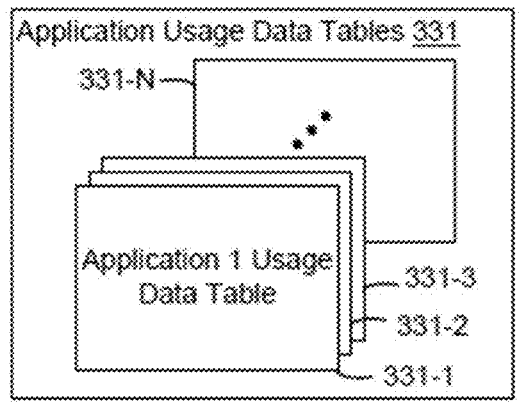
FIGS. 6A-6B are block diagrams illustrating data structures for storing application usage data, in accordance with some embodiments.
Figure 6B:
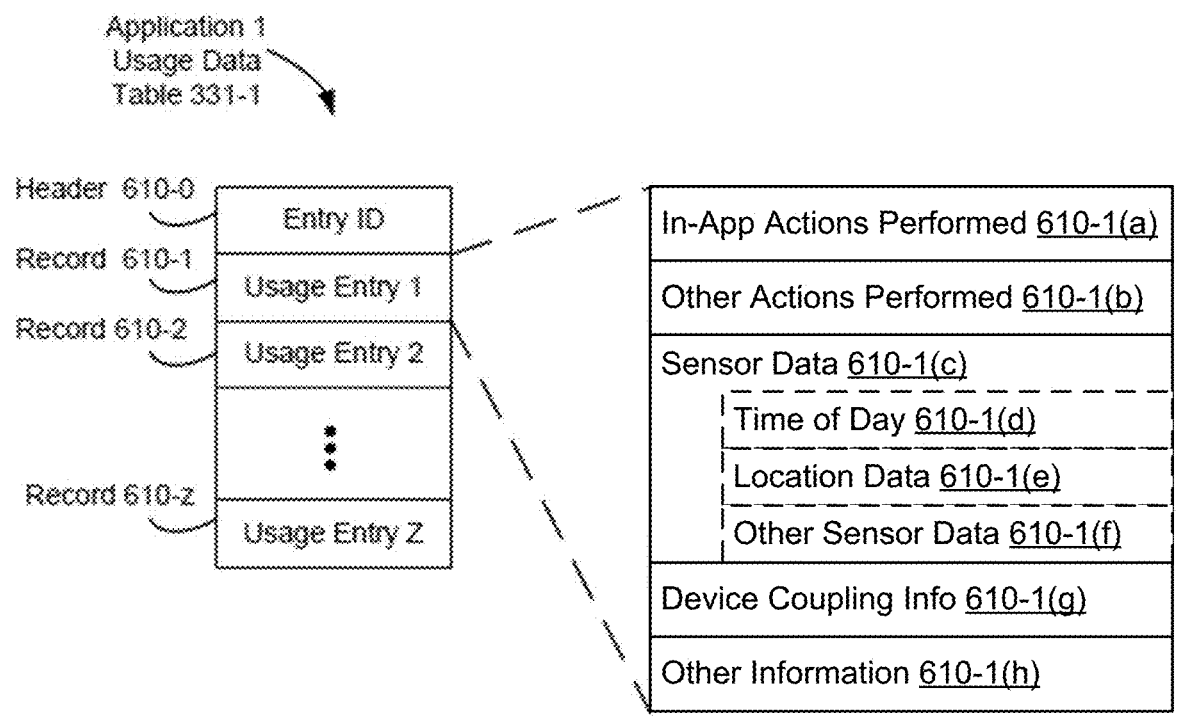

FIGS. 6A-6B are block diagrams illustrating data structures for storing application usage data, in accordance with some embodiments. As shown in FIG. 6A, application usage data tables 331 include a collection of application usage tables 331, optionally implemented as a collection of tables for each application installed on the device 300, that each store usage data associated with a corresponding respective application installed on the electronic device (e.g., application 1 usage data table 331-1 stores usage data for application 1 and application usage data table 331-2 stores usage data for application 2). In some embodiments, each table (e.g., table 331-1, 331-2, 331-3 . . . 331-N) in the collection of application usage data tables stores usage data for more than one application installed on the electronic device (e.g. table 331-1 stores usage data for related applications that are each provided by a common application developer or application vendor, for efficient storage of potentially related data).

In some embodiments, one or more application usage data tables 331 (e.g., application 1 usage data table 331-1) are used for storing usage data associated with applications installed on the device 300. As illustrated in FIG. 6B, application 1 usage data table 331-1 contains a number of usage entries. In some embodiments, the usage entries are stored in individual records 610-1 through 610-z and, optionally, a header 610-0. Header 610-0, in some embodiments, contains a brief description of each field of information (e.g., each field associated with each of the records) stored within the table. For example, Header 610-0 indicates that each record 610-1 through 610-*z* includes an entry ID that uniquely identifies the usage entry. In some embodiments, application 1 usage data table 331-1 includes additional fields in addition to the entry ID field, such as a timestamp field that identifies when the usage entry was created and/or stored in the table 331-1 and a related usage entries field that identifies related usage entries that may be stored in other application usage data tables 331.

In some embodiments, each record within the application 1 usage data table 331-1 contains one or more usage entries containing usage data collected while a user interacts with application 1 (e.g., every time the user launches application 1, a new usage entry is created to store collected usage data) and/or application 1 receives data (e.g., a new usage entry is created to store data received by application 1 that is invoked but not displayed in focus). In some embodiments, each usage entry in the table stores the following information and data structures, or a subset or superset thereof:

- information identifying in-app actions performed (e.g., in-app actions performed 610-1(*a*)) by the user within the application (in some embodiments, these actions are reported to the device by the application), for example the application reports to the usage data collecting module 363-2 that the user opened a particular webpage in the network browser application;
- information identifying other actions performed (e.g., other actions performed 610-1(*b*)) by the user within other applications (e.g., system-level applications), such as providing verbal instructions to a virtual assistant application or conducting a search for an item of information within a search application (e.g., search module 351, FIG. 3A);
- sensor data (e.g., usage data 610-1(*c*)) that includes data collected by the sensors on the device 300 while the user is interacting with the application associated with the usage entry and/or while one or more applications receive data, optionally including:
  - time of day (e.g., time of day 610-1(*d*)) information;
  - location data (e.g., location data 610-1(*e*)) identifying a current location at the time when the user launched the application and other locations visited by the user while executing the application (e.g., as reported by GPS module 336) and/or when the data is received by the application(s);
  - other sensor data (e.g., other sensor data 610-1(*f*)) collected while the user is interacting with the application (such as ambient light data, altitude data, pressure readings, motion data, etc.) and/or while the data is received by the application(s);
- device coupling information (e.g., device coupling info 610-1(*g*)) identifying external devices coupled with the device 300 while the user is interacting with the application (e.g., an exemplary external device could be a pair of headphones connected to the headphone jack or another exemplary device could be a device connected via BLUETOOTH (e.g., speakers in a motor vehicle or a hands-free system associated with a motor vehicle)) and/or while the data is received by the application(s); and
- other information (e.g., other information 610-1(*h*)) collected while the user is interacting with the application and/or while the data is received by the application(s) (e.g., information about transactions completed, such as information about the user's use of APPLE PAY). In addition, information identified by information identifying module 363-1 related to the usage data stored in application usage tables 331-1 (such as a topic associated with the usage data, the amount of time that the user operates the application (e.g., visiting a webpage in the network browser application), the internet link (e.g., URL) contained in a received text message, etc. may also be stored in other information 610-1(*h*)).

In some embodiments, the application usage entry further includes information identifying an action type performed by a user, while in other embodiments, the information identifying the in-app actions performed is used to determine or derive action types.

In some embodiments, the application usage data tables 331 also store information about privacy settings associated with users of the device 300. For example, the users of device 300 are able to configure privacy settings associated with the collection of usage data for each application. In some embodiments, users are able to control data collection settings for all information contained within each usage entry (e.g., in-app actions performed, other actions performed, sensor data, device coupling info, and other information). For example, a user can configure a privacy setting so that the device 300 (or a component thereof, such as usage data collecting module 363-2) does not collect location data, but does collect information about in-app actions performed for the network browser module 347. As another example, the user can configure a privacy setting so that the device 300 does not collect information about in-app actions performed, but does collect location data for the online video module 355. In this way, users are able to control the collection of usage data on the device 300 and configure appropriate privacy settings based on their personal preferences regarding the collection of usage data for each application available on the device 300.

Figures 7A, 7B:
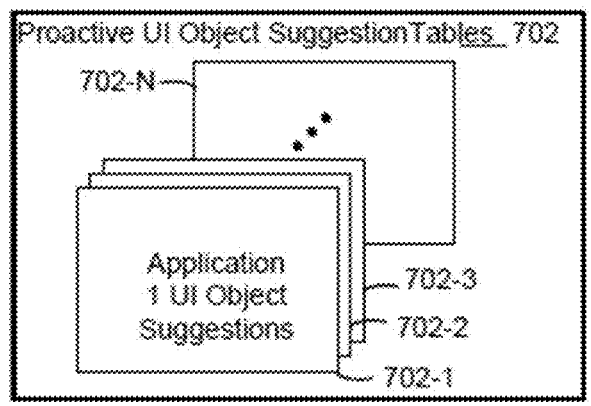
FIGS. 7A-7B are block diagrams illustrating data structures for storing user interface object suggestion tables, in accordance with some embodiments.

FIGS. 7A-7B are block diagrams illustrating data structures for storing UI object suggestion tables 702, in accordance with some embodiments. As shown in FIG. 7A, UI object suggestion tables 702 include a collection of data structures 702, optionally implemented as a collection of tables, each table storing UI object suggestions based on the information (e.g., a topic associated with a user viewed internet link, the amount of time that the user operates the application (e.g., visiting a webpage), an internet link (e.g., URL) contained in a received text message, etc.) of the usage data in each respective application installed on the device 300, For example, application 1 object suggestion table 702-1 stores suggested UI objects (e.g., internet links) that are identified in the usage data in application 1. In some embodiments, each table (e.g., table 731-1, 731-2, 731-3 . . . 731-N) in the collection of application usage data tables stores UI object suggestions associated with more than one application installed on the electronic device (e.g. table 731-1 stores UI object suggestions for related applications that are each provided by a common application developer or application vendor, for efficient storage of potentially related data).

In some embodiments, one or more proactive UI object suggestion tables 702 (e.g., application 1 UI object suggestion table 702-1) are used for storing the UI object suggestions associated with applications installed on the device 300. For example, as illustrated in FIG. 7B, an application 1 UI object suggestion table 702-1 contains information identifying a number of prerequisite conditions associated with application 1 and their corresponding suggested UI objects. As shown in FIG. 7B, the application 1 UI object suggestion table 702-1 contains records 714-1 through 714-*z* and, optionally, includes a header 714-0. Header 714-0, in some embodiments, contains a brief description of each field of information (e.g., each field associated with each of the records) stored within the table. Each record (e.g., record 714-1) includes information that allows the device 300 to determine the prerequisite conditions for providing suggested UI objects. In some embodiments, prereqs 1 of record 714-1 contain or identifies a number of prerequisite conditions (e.g., a common topic between two viewed internet links, a common-ancestor topic between two viewed internet links, etc.) that, when detected, cause the device 300 to display the suggested UI objects (e.g., suggested UI object 4).

As a specific example, prereqs 1 may indicate that if a particular calendar event stored in the calendar application includes an internet link, and the user enters an input in the interface of the network browser application in the electronic device 300 (e.g., invoking the network browser application, requesting display of a new webpage tab in the network browser application or entering an input into a search or internet address field of the user interface of the network browser application) within two hours prior to the time of the particular calendar event, then the device 300 should detect the conditions associated with prereqs 1 and display suggested UI object 4 including the internet link contained in the calendar event in the interface of the network browser application. As another specific example, prereqs 2 may indicate that if a new message received by an application in the electronic device 300 includes an internet link, and the user is performing actions on the network browser application in the electronic device 300 during the new message is received, then the device 300 should detect the conditions associated with prereqs 2 and display suggested UI object 4 including the internet link contained in the new message in the interface of the network browser application. In some embodiments, prerequisite conditions are identified based on information of the usage data identified by the information identifying module 363-1 (FIG. 3A). In some embodiments, the UI object suggestion module 363-3, in conjunction with the application usage data tables 331 (and, in one embodiment, usage data collecting module 363-2), mines data that is stored in the application usage data tables 331 to identify patterns of user behavior. For example, the UI object suggestion module 363-3 may identify a common topic (e.g., Prince William) or a common-ancestor topic (e.g., British royal family) in the user's recently searched, viewed, communicated, and/or posted internet links. Then, one of the prerequisite conditions may indicate that if a particular common topic or common-ancestor topic is identified in the contextual information of one or more applications in the device 300, and the user enters an input in the interface of the network browser application in the electronic device 300 (e.g., invoking the network browser application, requesting display of a new webpage tab in the network browser application or entering an input into a search or internet address field of the user interface of the network browser application), then the device 300 should detect the conditions associated with the prereqs and display a suggested UI object including an internet link directed to the particular common topic or common-ancestor topic. In some embodiments, the UI object suggestion module 363-3 may identify a topic (e.g., a car) associated with a user's message to a friend. Then, one of the prerequisite conditions may indicate that if the same topic (e.g., car) is identified in the contextual information of one or more applications in the device 300, and the user enters an input in the interface of the network browser application in the electronic device 300, then the device 300 should detect the conditions associated with the prereqs and display a suggested UI object including an internet link directed to the topic (e.g., car). This way, the device 300 can proactively provide suggested UI objects that may be of interest to the user in the network browser application without requiring the user to search for a particular UI object.

Alternatively or additionally, the UI object suggestion table 702 may include ranking scores assigned to the UI objects. As further described below, each entry of the usage data may be assigned with one or more ranking scores based on the information (e.g., topic and/or time) associated therewith; the suggested UI objects are determined based on the entry of the usage data that has the highest summed or average ranking scores. Accordingly, application 1 UI object suggestion table 702-1 may contain information identifying a number of high ranking scores assigned to the usage data and their corresponding suggested UI objects in the usage data.

FIG. 8 is a block diagram illustrating an exemplary UI object suggestion system 800, in accordance with some embodiments. As shown in FIG. 8, a UI object suggestion system 800 includes the electronic device 300 and also includes one or more servers 802. The electronic device 300 communicates with the one or more servers 802 over one or more networks. The one or more networks (e.g., network(s) 820) communicably connect each component of the UI object suggestion system 800 with other components of the UI object suggestion system 800. In some embodiments, the one or more networks 820 include public communication networks, private communication networks, or a combination of both public and private communication networks. For example, the one or more networks 820 can be any network (or combination of networks) such as the Internet, other wide area networks (WAN), local area networks (LAN), virtual private networks (VPN), metropolitan area networks (MAN), peer-to-peer networks, and/or ad hoc connections.

In some embodiments, one or more proactive UI object suggestion tables 702 are stored on the electronic device 300 and one or more other proactive UI object suggestion tables 702 are stored on the one or more servers 802. In some embodiments, the electronic device 300 stores the proactive UI object suggestion tables 702, while in other embodiments, the one or more servers 802 store the proactive UI object suggestion tables 702. Similarly, in some embodiments, one or more application usage data tables 331 are stored on the electronic device 300 and one or more other application usage data tables 331 are stored on the one or more servers 802. In some embodiments, the electronic device 300 stores the application usage data tables 331, while in other embodiments, the one or more servers 802 store the application usage data tables 331.

In embodiments in which one or more proactive UI object suggestion tables 702 or one or more application usage data tables 331 are stored on the one or more servers 802, then some of functions performed by the UI object suggesting module 363-3 and the usage data collecting module 163-2, respectively, are performed at the one or more servers 802. In these embodiments, information is exchanged between the one or more servers 802 and the device 300 over the networks 820. For example, if the one or more servers 802 store proactive UI object suggestion tables 702 for the network browser module 347, then, in some embodiments, the device 300 sends one or more usage entries corresponding to the network browser module 347 to the one or more servers 802. In some embodiments, the one or more servers 802 then mine the received usage data to identify usage history, patterns, topics and/or time associated therewith and create suggested UI objects (as discussed above in reference to FIGS. 7A-7B) and sends the created suggested UI objects to the device 300. In some embodiments, while receiving data associated with network browser module 347 (e.g., internet links that the user has clicked), the device 300 and the one or more servers 802 exchange usage data and suggested UI objects. In some embodiments, the one or more servers 802 directly causes the graphics module 332 to display the suggested UI objects on the user interface of the network browser application, such that the suggested UI objects do not need to be sent to and stored in the device 300. In some embodiments, the usage data that is sent to the one or more servers 802 is of limited scope, such that it contains only information pertaining to the user's use of the network browser module 347 (as noted above, the user must also configure privacy settings that cover the collection of usage data and these privacy settings, in some embodiments, also allow the user to configure the exchange of usage data with one or more servers 802 (e.g., configure what type of data should be sent and what should not be sent)).

FIG. 9 illustrates a flowchart representation of method 900 of proactively identifying user interface objects (e.g., internet links) directed to information of interest to the user and displaying the identified links in a user interface (e.g., suggestion in SAFARI) on the electronic device, in accordance with some embodiments. FIGS. 6A-6B, 7A-7B, 8, and 10 are used to illustrate the method and/or processes of FIG. 9. Although some of the examples which follow will be given with reference to inputs on a touch-sensitive display (in which a touch-sensitive surface and a display are combined), in some embodiments, the device detects inputs on a peripherals interface 318 or touch-sensitive surface 475 that is separate from the display 474, as shown in FIG. 4B.

In some embodiments, the method 900 is performed by an electronic device 300 (FIG. 3A) and/or one or more components of the electronic device (e.g., I/O subsystem 306, operating system 326, etc.). In some embodiments, the method 900 is governed by instructions that are stored in a non-transitory computer-readable storage medium and that are executed by one or more processors of a device, such as the one or more processors 322 of device 300 (FIG. 3A). For ease of explanation, the following method 900 is performed by the device 300. In some embodiments, with reference to FIG. 3A, the operations of method 900 is performed by or use, at least in part, a proactive module (e.g., proactive module 363), application usage data tables (e.g., application usage data tables 331), UI object suggestion tables (e.g., UI object suggestion tables 702), a UI object suggesting module (e.g., UI object suggesting module 363-3), a usage data collecting module (e.g., usage data collecting module 363-2), a contact/motion module (e.g., contact/motion module 330), a graphics module (e.g., graphics module 332), one or more contact intensity sensors (e.g., contact intensity sensors 365), and a display system 312 (e.g., touch-sensitive display system 474, FIG. 4B). Some operations in method 900 is, optionally, combined and/or the order of some operations is, optionally, changed.

As described below, the method 900 provides intuitive ways to proactively identifying user interface objects (e.g., internet links) directed to information of interest to the user and displaying the identified links in a user interface (e.g., suggestion in SAFARI) on the electronic device. The method reduces the cognitive burden on a user when accessing the network browser application and/or other applications (e.g., text message application, e-mail application, calendar application, etc.), thereby creating a more efficient human-machine interface. For battery-operated electronic devices, proactively identifying and providing relevant user interface objects faster and more efficiently both conserves power and increases the time between battery charges.

As shown in FIG. 9A, the electronic device 300 receives (902), via a user input device (such as a keyboard, a mouse and/or a touch-sensitive display), a user input associated with a network browser application (e.g., SAFARI) and installed on the electronic device. The user input includes, for example, clicking on an icon associated with the network browser application to invoke the application, or requesting display of a new webpage tab, or tapping in a search or internet address field of the user interface in the network browser application. Alternatively, the input may be a voice command received from the user that instructs a virtual assistant application (e.g., a virtual assistant application managed by operating system 326, FIG. 3A) to invoke or execute the network browser application. Optionally, the device 300 or a component thereof (e.g., the information identifying module 363-1) may analyze (904) the user input to determine information, such as the topic, root topic, time, etc. associated therewith. For example, the user input may be "Prince William" entered in the search field of the network browser application at 9:00 AM; the information identifying module 363-1 may identify the topic and time of this input as "Prince William" and "9:00 AM," respectively. If, however, the user input is merely invoking the network browser application at 9:00 AM, the information identifying module 363-1 identifies the time of this input at "9:00 AM" without including a topic.

In various embodiments, after receiving the user input, the device 300 accesses the application usage data tables 331 to acquire (906) data collected (e.g., by the data collecting module 363-2) from one or more data sources and/or information associated with respective data on the electronic device 300. Optionally, if the data has not been analyzed to identify information associated therewith (e.g., the data is newly collected), the device 300 (or a component thereof, such as information identifying module 363-1) may analyze (908) the data to determine information (e.g., topic, root topic, time, usage history, etc.) associated therewith in step 906. The data sources may include applications that are different from the network browser application (e.g., a calendar application, a reminder application, a communications application, a text-message application, an e-mail application, a news feed, search engine/provider results, and/or a social media application) (907). Additionally or alternatively, the data source may include the network browser application (e.g., bookmarked websites, websites in a reading list, favorite websites, iCloud tabs, etc.) (907). In one embodiment, the data in all data sources is collected a few seconds (e.g., 5 seconds) after it is received or used by the application(s) In addition, as explained above in references to FIGS. 3A, 6A and 6B, after the data collection module 363-2 collects data from the one or more data sources, the information identifying module 363-1 identifies information, such as the topic, root topic, time, usage history (e.g., how long and how often the user reviews a particular webpage), internet link (e.g., URL) contained in a received message associated with each of the collected data. In some embodiments the collected usage data and/or the identified information associated therewith is stored in a usage entry (as described above in reference to FIGS. 6A-6B) in an application usage data table that is associated with the application. Providing the suggested internet links that are obtained from one or more data sources other than the internet browser application ensures that users do not have to waste time recalling or locating links that they may have encountered previously in a number of different applications. Ensuring that users do not have to waste this time by entering numerous inputs and searching aimlessly for various links enhances operability of the device and makes the human-machine interface more efficient (e.g., by providing such links in the browser application directly, and thereby ensuring that users do not have to look for them elsewhere). Because less time is wasted searching aimlessly on the device, these techniques also help to conserve power, increase the time between battery charges, and help to extend the life of the touch-sensitive display by requiring a fewer number of touch inputs.

In some embodiments, the collected usage data includes in-app actions performed by the user, other actions performed by the user (e.g., interactions with a virtual assistant application, interactions with a search interface (e.g., search module 351), and other interactions with applications that are managed by the operating system 326), information associated with calendar events, text messages, posts on a social media application etc., and additional data obtained from sensors on the system 100 (as explained above in reference to FIG. 6B). For example, the data may include all contextual information typed by the user in the reminder application and messages posted by the user on the social-media application. Additionally or alternatively, the usage data may include data that has been received by the application(s) on the electronic device. For example, the usage data may include a text message from the user's friend, an email from an airline company confirming booking of the flight ticket, a calendar event sent by the user's friend and accepted by the user, etc. In various embodiments, the collected usage data includes the information as described above from a second electronic device different from the electronic device. For example, the electronic device 300 and the second electronic device may be logged into a common user account (e.g., "Handoff" provided by APPLE Inc.); the data collection module 363-2 may collect data from the one or more data sources on the second device and the information identifying module 363-1 may identify information associated with the collected data. Again, the collected data and identified information associated therewith may then be sent to and stored in the application usage data table corresponding to the respective application.

In some embodiments, the usage data includes verbal instructions, from the user, provided to a virtual assistant application while continuing to execute the application, and at least one of the suggested UI objects includes an internet link (e.g., URL). In some embodiments, the verbal instructions comprise a request to create a reminder that corresponds to (e.g., references or requires recreation/re-execution of) a current state of the application, the current state corresponding to a state of the application when the verbal instructions were provided (e.g., one or more application views 391, FIG. 3B). In some embodiments, the state of the application when the verbal instructions were provided is selected from the group consisting of: a webpage displayed within the network browser application when the verbal instructions were provided, content playing within the application when the verbal instructions were provided (e.g., an internet link currently displayed in an e-mail), a notification displayed within the application when the verbal instructions were provided (e.g., a notification from instant messaging module 341 that includes an internet link and is displayed while the user is interacting with the network browser module 347), and an active portion of the page displayed within the application when the verbal instructions were provided (e.g., currently playing video content within a webpage). As additional examples, the current state of the application might correspond also to (i) an internet link of the particular page (e.g., a URL for a currently displayed webpage) that the user is currently viewing within the network browser application when the verbal instructions are provided or a history of actions that the user took before navigating to a current page within the application (e.g., URLs visited by the user prior to the currently displayed webpage).

In various embodiments, the device then automatically and without human intervention (e.g., entering a searching request or other inputs), searches for and locates (or identifies) (910), in the acquired data, at least one user interface object (e.g., internet link such as a URL) that may be of interest to the user based on the user input, collected usage data, and/or information (e.g., the topic, URL(s), time, date, and/or usage history) associated with the user input and/or usage data. In some embodiments, this can be achieved by assigning (909) each entry of the usage data with one or more ranking scores based on the information (e.g., topic, time, usage history, etc.) associated therewith; the identified UI object(s) is determined based on the entry of the usage data that has the highest ranking score. For example, each topic may be associated with a unique identifier (e.g., q-identifier assigned for each item of Wikidata entity, see, e.g., https://www.wikidata.org/wiki/Wikidata:Identifiers). Thus, when the topic (e.g., "Prince William") of the user input is identified, topics in the usage data having a direct q-identifier matching to that of the user input are assigned with higher (e.g., by 1.4 times larger) ranking scores compared to topics having no direct q-identified matching to the topic of the user input. In one embodiment, topics in the usage data having a title-matching to the user input may be assigned with a less high ranking score (e.g., by 1.05 times larger only).

In various embodiments, the user inputs include multiple topics (e.g., "Prince William" and "Queen Elizabeth"), the UI object suggesting module 363-3 may then assign a higher ranking score to the common-ancestor topic (e.g., British royal family) of the user inputs than to individual topics (e.g., "Prince William" or "Queen Elizabeth") of the user inputs.

In another embodiment, each topic is associated with a data string (i.e., a sequence of characters). Again, topics in the usage data are assigned with higher ranking scores if the strings associated with the topics in the usage data have higher correlation to the string associated with the topic of the user input.

Additionally or alternatively, the UI object suggesting module 363-3 may assign the ranking scores to the usage data based on the time associated therewith and the time receiving the user input. For example, the usage data collected on the same day as receiving the user input may be assigned with a higher score than the usage data collected one day before receiving the user input. In some embodiments, the usage data received while the user is performing actions on the network browser application is assigned with a high score. For example, a text message including a UI object (internet link) received while the user is surfing on the internet may be assigned with the highest score.

In some embodiments, the ranking scores are assigned using the first-in, first-out approach; namely, compared to the usage data collected at a later time (i.e., "younger"), the usage data collected earlier (i.e., "older") is assigned with a higher score and, therefore, is more likely to be identified as a user interface object suggested to the user. For example, the webpage that the user visited three days ago may be assigned with a higher score compared to the webpage that the user visited one hour ago as the user may be less interested in the webpage that he/she just reviewed recently. In one embodiment, the most recently visited internet link is assigned with the lowest score. In one embodiment, the ranking score may be updated (e.g., increased) only after the predetermined time (e.g., 8 hours) has lapsed. Thus, the device 300 may identify a recently visited internet link as a UI object that may be of interest to the user only after the predetermined time (e.g., 8 hours) has lapsed.

In various embodiments, the content of the usage data includes a UI object and time associated therewith. For example, the usage data may be the first and second e-mails sent from an airline company relating to outbound and inbound flight information, respectively; both e-mails include an internet link for online check-in (e.g., 10 AM on Wednesday for outbound flight and 5 PM on Friday for inbound flight). When the electronic device 300 receives a user input at 9 AM on Wednesday, the UI object suggesting module 363-3 may assign a higher score to the first e-mail relating to the outbound flight compared to the second e-mail relating to the inbound flight as the user may have greater interest to the outbound flight at that time.

In one embodiment, the ranking scores assigned to each entry of the usage data based on the identified different information (e.g., topic, usage history, time, etc.) are summed together. Alternatively, the ranking scores assigned to the usage data based on the different information (e.g., topic, usage history, time, etc.) may be averaged, and the average may be weighted or otherwise adjusted to reflect the degree of importance of the different information. For example, when the user is surfing on the internet 10 minutes before the flight check-in time, the ranking score assigned based on the time of the usage data and user input may have a larger weighting factor compared to the ranking scores assigned based on the topic matching.

In various embodiments, the ranking score assigned to each entry in the usage data is updated every time the device 300 receives a new user input. This way, the UI object(s) that is identified to be of interest to the user may be dynamically updated based on the new information associated with the new user input. In some embodiments, the assigned ranking scores are independent of the user's new input. For example, if the last webpages that the user visited were related to "Prince William" and "Prince Harry" their common-ancestor topic, i.e., British royal family, is assigned with a high ranking score. Then, upon receiving a new user input two hours later that is merely to invoke the network browser application or request display of a new webpage tab, there is no need to update the assigned ranking score. As a result, the internet link related to the British royal family may still be identified as the UI object that may be of interest to the user after receiving the user's new input.

Optionally, while the user is performing actions on the network browser application, the device 300 may continuously detect and acquire (906) new data entries that are received in the data source(s), and analyze (908) (e.g., the information identifying module 363-1) to identify the information associated therewith. In some embodiments, when an internet link is identified in a new data entry, the data entry is assigned with a high score as explained above; the internet link is then identified as a UI object that may be of interest to the user.

In some embodiments, the device may then display (912) the identified UI object(s) within a user interface (e.g., suggestion in SAFARI) of the network browser application on a display system 312 of the electronic device 300. Each UI object may include a suggested internet link (e.g., URL) and, in one embodiment, an image associated with the webpage associated with the suggested internet link. As further described below, the electronic device 300 may display (913) the user interface object(s) obtained from the data sources different from the network browser application in a first predefined region of the display and the user interface object(s) obtained from the network browser application in a second predefined region, different from the first region, of the display. In some embodiments, at least one of the displayed UI object(s) is obtained from the data sources (which may be the same or different from the network browser application) in a second electronic device, different from the electronic device 300. In one embodiment, the second electronic device and the electronic device 300 are logged into a common user account (e.g., "Handoff" provided by APPLE Inc.). In addition, the device 300 may display one or more user interface objects that are previously designated to be favorite links in a third predefined region, different from the first and second regions, of the display. In some embodiments, the device displays one or more user interface objects corresponding to the recently accessed internet link(s) (based on usage history) in a fourth predefined region, different from the first, second and third region, of the display.

In some embodiments, the at least one suggested user interface object is identified by the memory controller 320 and processor 322 implemented in the device, while in other embodiments, the suggested user interface object is obtained from a server (e.g., one or more servers 802, FIG. 8) that identifies the suggested user interface object based on usage data that was sent from the device to the one or more servers 802 (as explained above in reference to FIG. 8). In some embodiments, the at least one user interface object (e.g., URL), when provided, causes the device (or a component thereof, such as proactive module 363) to allow the user to quickly and easily view (e.g., without any substantive input or with only a single touch or verbal input from the user) a webpage that is associated with the suggested internet link and may be of interest to the user.

In some embodiments, the method also includes checking privacy settings associated with the user of the device prior to identifying the suggested UI objects, in order to confirm that the user has permitted the device to collect certain usage data and/or to verify that the user has permitted the device to provide the suggested UI objects (e.g., the user may configure a setting to prohibit the device from collecting the usage data on the device that cause the device to automatically suggest UI objects).

In some embodiments, the one or more suggested user interface objects (or "suggestions") are displayed in a first predefined region of the display system 312. For example, with reference to FIG. 10, the suggested UI objects 1002 obtained from one or more data sources, different from the network browser application, are displayed in a first predefined region 1004 of a user interface (e.g., SAFARI window) 1006 for the network browser application on the primary display 102). In some embodiments, each suggested UI object 1002 includes a first portion 1008-A, 1008-B, 1008-C, 1008-D, 1008-E, and 1008-F herein after referred to as 1008-A-F, displaying an internet link (e.g., URL) and a second portion 1010-A, 1010-B, 1010-C, 1010-D, 1010-E, and 1010-F, herein after referred to as 1010-A-F, different from the first portion, displaying an image extracted from a webpage associated with the corresponding internet link 1008-A-F. In some embodiments, the UI object 1002 also includes the data source from which the suggested UI object 1002 is obtained (e.g., from "text-message," from "calendar," from "e-mail," etc.). Additionally or alternatively, the second portion 1010-A-F may display icons representing the data source from which the suggested UI object 1002 is obtained (e.g., icon 544 for notes module 353, icon 524 for IM module 341, etc., FIG. 4A).

In various embodiments, the suggested UI objects (e.g., UI objects 1012 in FIG. 10) obtained from the network browser application (e.g., favorite websites, websites in a reading list, iCloud tabs, etc.) are displayed in a second predefined region 1014 of the user interface on the display system 312, different from the first predefined region 1004. For example, the suggested UI objects 1012 obtained from the network browser application are displayed in the second predefined region 1014 below the first predefined region 1004 in the user interface (e.g., SAFARI window) 1006 for the network browser application on the primary display 102. Again, the UI objects 1012 may include a first portion 1008-A-F displaying an internet link (e.g., URL) and a second portion 1010-A-F, different from the first portion, displaying an image extracted from a webpage associated with the corresponding internet link 1008-A-F. In addition, the UI object 1012 may include the data source (i.e., network browser application in this case) from which the suggested UI object 1012 is obtained in the first portion 1008-A-F or second portion 1010-A-F. In some embodiments, at least one of the displayed UI object(s) 1002, 1012 is from a second electronic device, different from the electronic device 300. In one embodiment, the second electronic device and the electronic device 300 are logged into a common user account (e.g., "Handoff" provided by APPLE Inc.).

In some embodiments, upon receiving the user input (e.g., invoking the network browser application, requesting display of a new webpage tab in the network browser application or entering an input into a search or internet address field of the user interface of the network browser application), the device 300 may also cause the user interface (e.g., SAFARI window) 1006 for the network browser application to display a set of one or more user interface objects, distinct from the suggested UI objects 1002, 1012 in a third predefined region 1024 of the user interface on the display system 312, different from the first and second predefined regions 1004, 1014. For example, UI objects 1022-A, 1022-B, and 1022-C, herein referred to as 1022-A-C, include internet links that were previously designated by the user to be favorited internet links may be displayed in the third predefined region 1024 (e.g., the top region) in the user interface (e.g., SAFARI window) 1006 for the network browser application; the third predefined region 1024 is different from and does not overlap with the first predefined region 1004 and second predefined region 1014. In one embodiment, the UI objects 1022-A, 1022-B, and 1022-C also include an image extracted from a webpage associated with the corresponding internet link.

Further, the device 300 may cause the user interface (e.g., SAFARI window) 1006 for the network browser application to display, upon receiving the user input within the user interface of the network browser application, an additional set of one or more user interface objects 1032-A, 1032-B, and 1032-C, herein referred to as 1032-A-C, distinct from the suggested UI objects 1002, 1012 and internet links 1022-A, 1022-B, and 1022-C described above. For example, the additional set of user interface objects 1032-A-C may correspond to one or more recently accessed internet links based on usage history (and, in some embodiments, images extracted from the webpages associated with the corresponding internet links). Referring to FIG. 10, the additional set of user interface objects 1032-A-C is displayed in a fourth predefined region 1034 of the user interface on the display system 312; the fourth predefined region 1034 is different from and does not overlap with the first, second and third predefined regions 1004, 1014, 1024.

Although FIG. 10 depicts that the UI objects 1002, 1012, 1022-A-C, 1032-A-C are arranged in one row displayed in the respective regions, it should be noted that the UI objects 1002, 1012, 1022-A-C, 1032-A-C in each respective region may be arranged in more than one row; different regions may have different number of rows of the UI objects. For example, the third region 1024 may include two rows of the user's favorite internet links, the fourth region 1034 may include one row of the most recently accessed internet links, and the first and second regions 1004, 1034 may each include one row of the suggested UI objects.

Figure 11A:
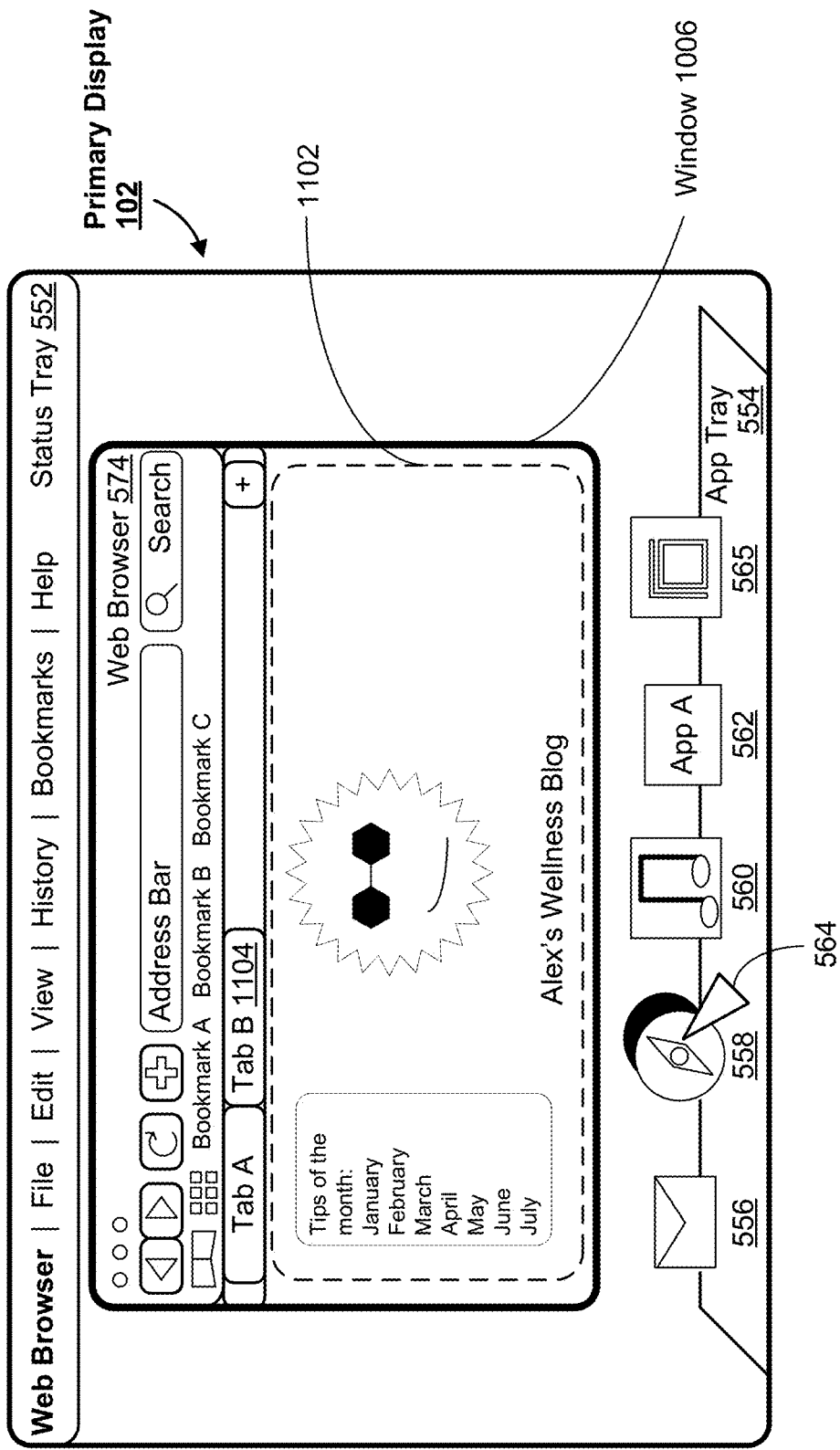
FIGS. 11A-11D depict a webpage or an application displayed on a user interface in response to a user input on a suggested user interface, in accordance with some embodiments.
Figure 11B:
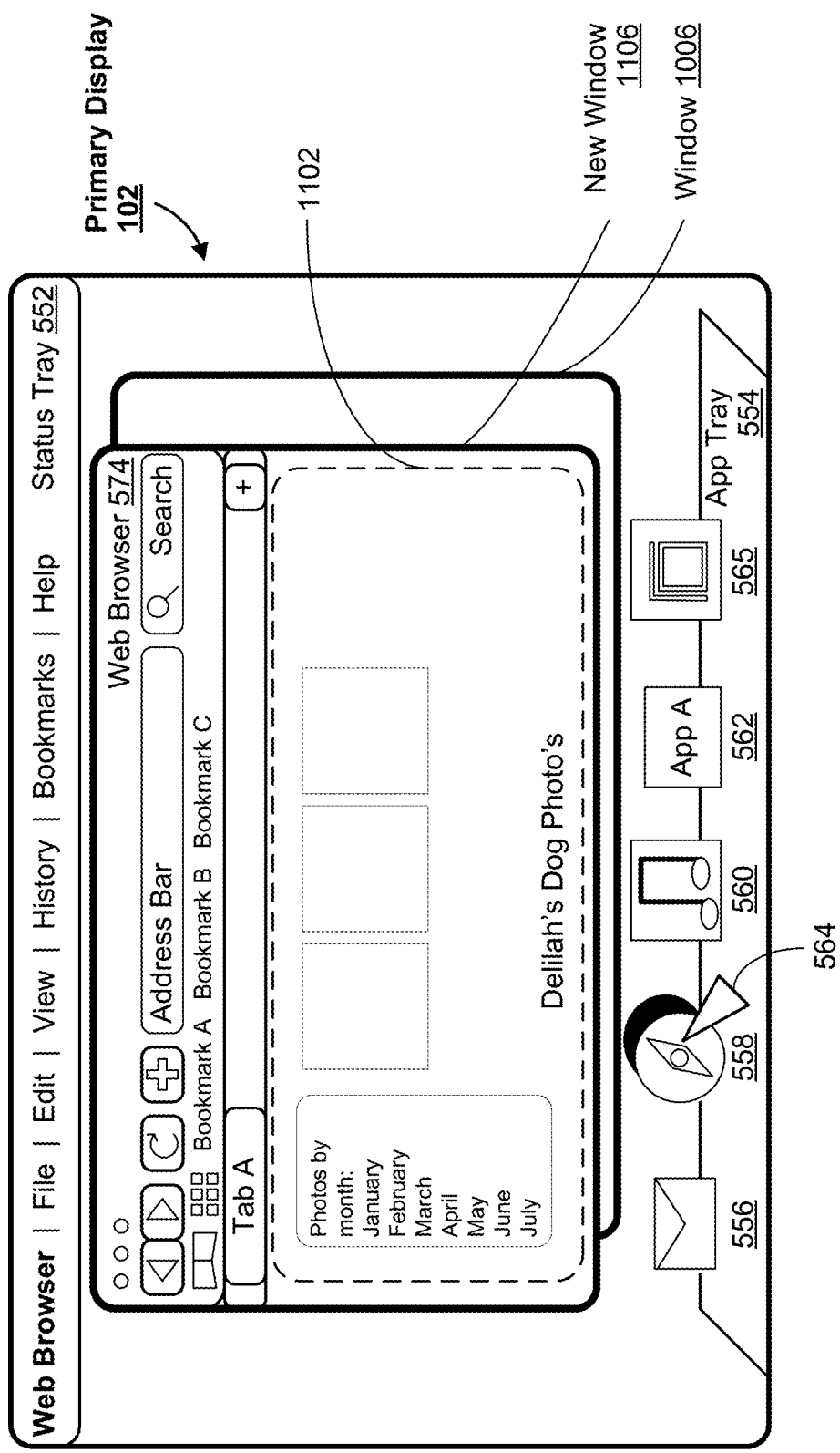
Figure 11C:
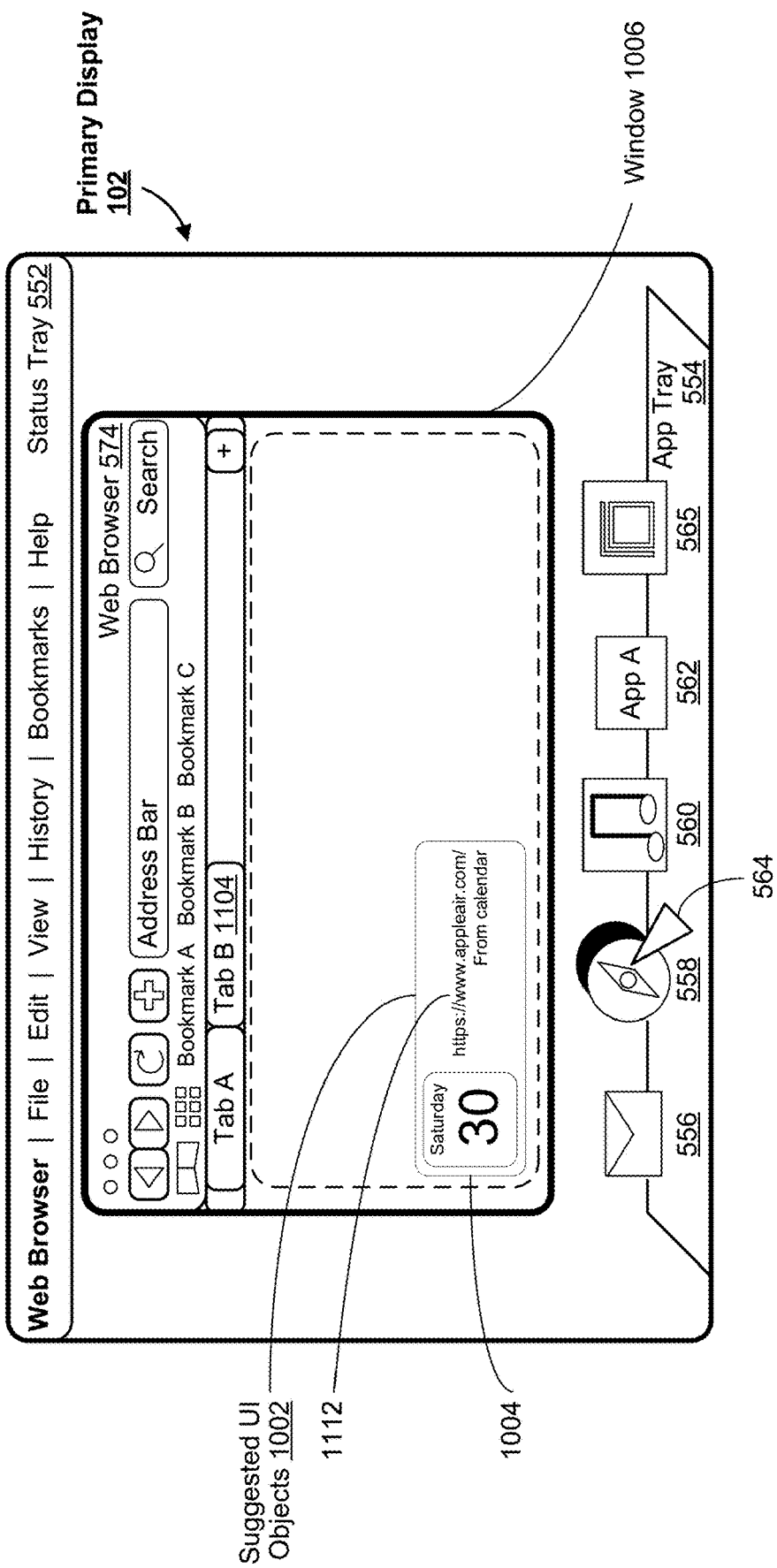
Figure 12:
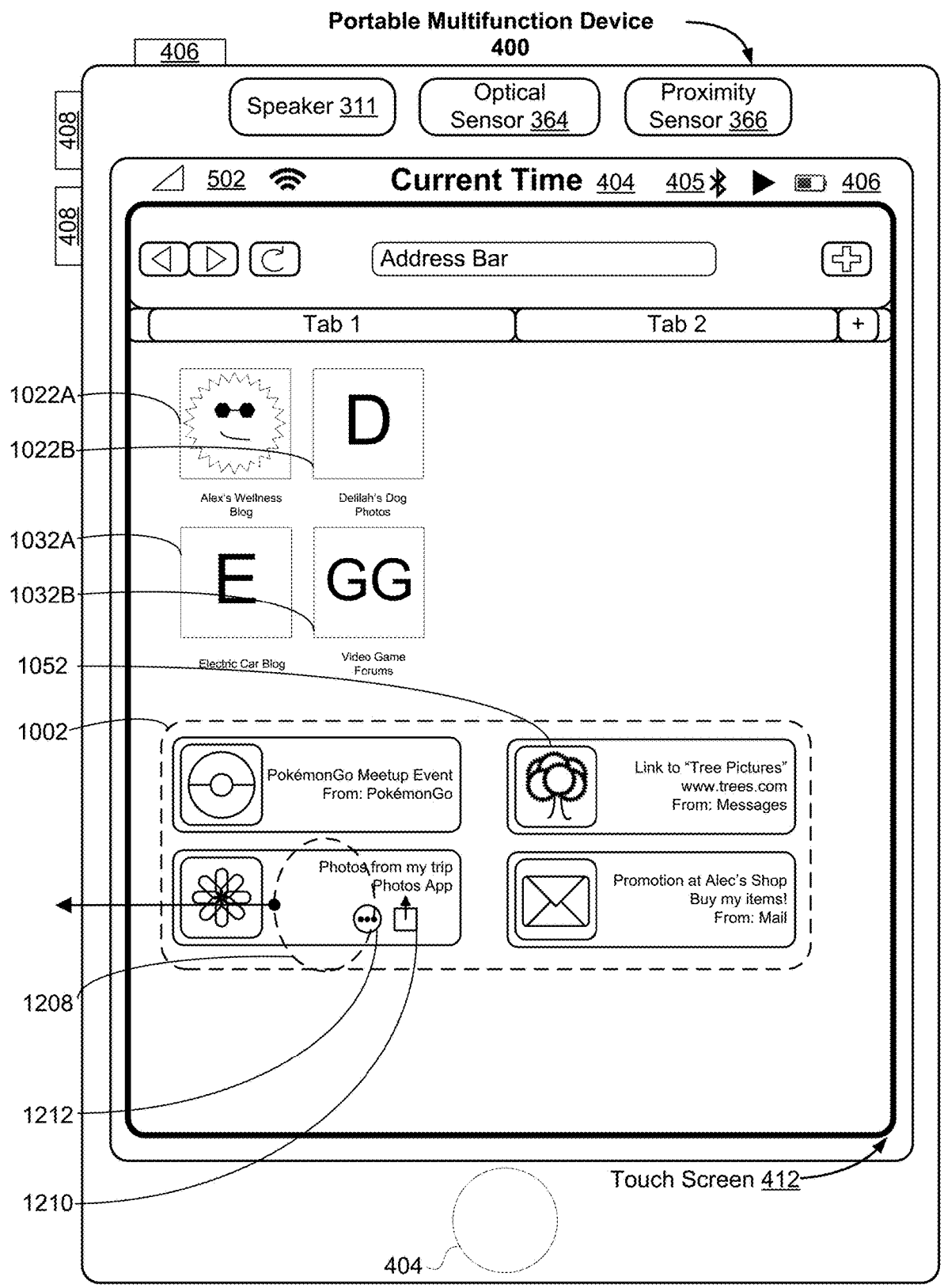
FIG. 12 depicts display of a set of affordances on a user interface in response to a user gesture over a suggested user interface, in accordance with some embodiments.

Referring to FIG. 11A, in various embodiments, upon detecting selection of an internet link in the suggested UI objects 1002, 1012, favorite links 1022-A-C, or recently accessed links 1032-A-C, the electronic device may cause the user interface to cease displaying of the UI objects 1002, 1012, 1022-A-C, 1032-A-C and display a webpage 1102 associated with the user selected internet link. Alternatively, the device may cause the user interface to open a new webpage tab 1104 in the same window 1006 and display the webpage 1102 associated with the user selected internet link in the new webpage tab 1104. Referring to FIG. 11B, in some embodiments, the device may cause the user interface to open a new window 1106, different from the window 1006, and display the webpage 1102 associated with the user selected internet link in the new window 1106. Note that the new webpage tab 1104 and/or new window 1106 may be opened in focus or in background in the user interface for the network browser application. If in focus, the user may directly review the content and/or perform actions thereon. If in background, the user may have to select the new webpage tab 1104 and/or new window 1106 prior to being able to review the content and/or perform actions thereon.

Figure 11D:
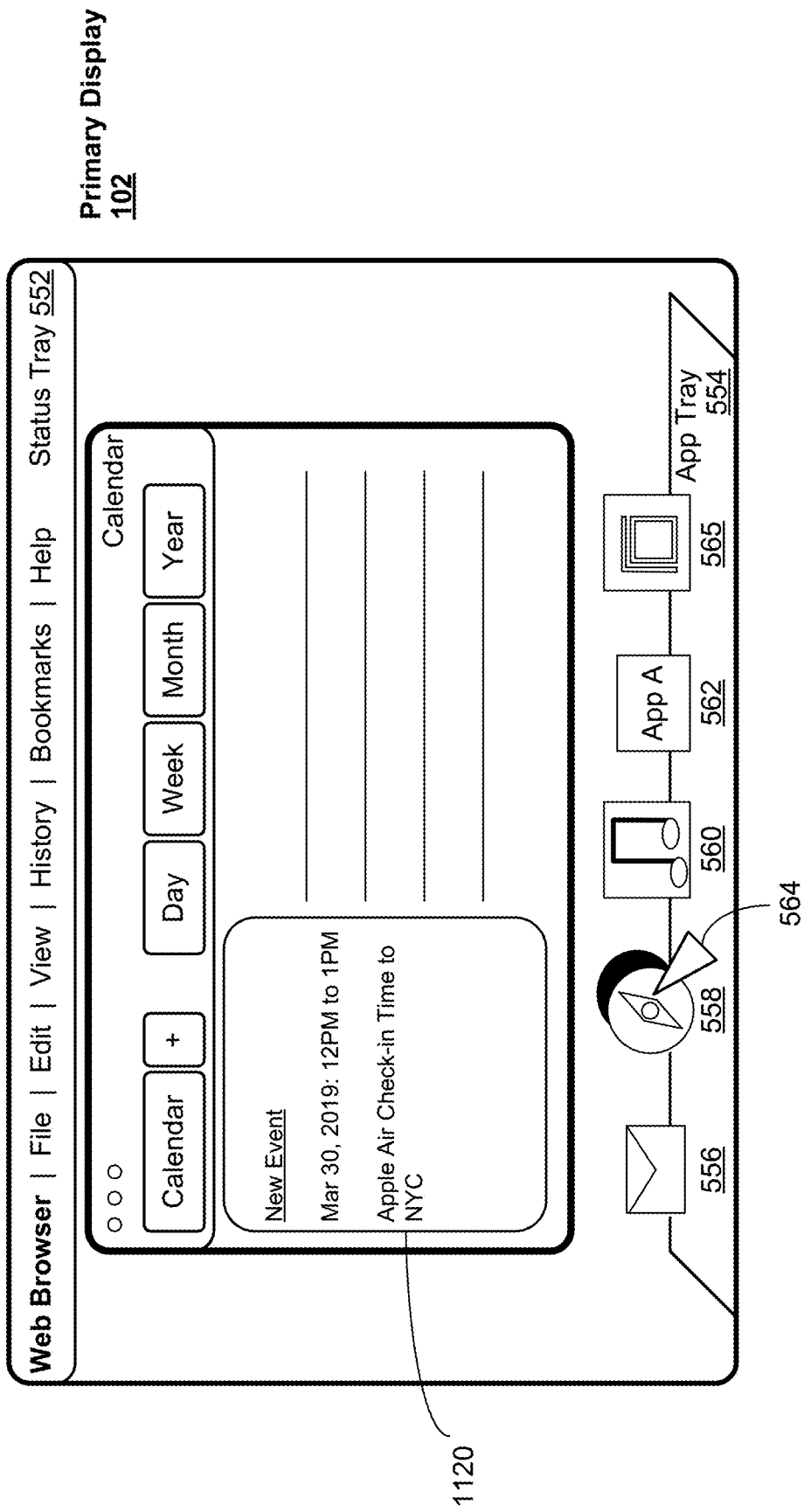

In addition, referring again to FIG. 10, at least one of the suggested UI objects 1002 may optionally include an icon 1052 at a corner of the portion 1010-A-F; selection of the icon 1052 allows the user to review the application and/or communication or user interface within that application) from which the corresponding suggested UI object is obtained. For example, referring to FIG. 11C, the suggested UI object may display an internet link 1112 obtained from the calendar module 348 in the portion 1008-A-F, and a calendar icon 526 and an icon 1052 in the portion 1010-A-F. Upon detecting selection of the icon 1052, the electronic device may cause the calendar application to be displayed by the display system (FIG. 11D). In some embodiments, the device 300 displays the specific calendar entry 1120 from which the internet link 1112 is obtained. Again, the calendar application may be displayed in focus or in the background.

In some embodiments, the user input on the suggested UI object may activate additionally functions. For example, referring to FIG. 12, the device detects a first user input (e.g., a gesture) 1208 over one of the suggested user interface objects (e.g., UI object 1202). In response to detecting the first user input, the device displays, within the region of the selected UI object, a set of affordances 1210, 1212. In some embodiments, the first user input 1208 is a swipe gesture over the UI object. For example, the user makes contact with a touch-sensitive screen 412 on top of the UI object 1202 and, without breaking contact with the touch-sensitive screen, the user moves the contact in a substantially horizontal direction across the UI object 1202. It should be noted that FIG. 12 depicts an exemplary user input for activating various functions associated with the suggested UI object. Other suitable user inputs using any suitable user input devices may be implemented to activate the functions associated with the suggested UI object and are thus within the scope of the present invention. For example, the user input may be a gesture on a touch pad 108, one or more clicks using a mouse 208, one or more key entries using a keyboard 206, etc. In addition, the device providing such functions may include desktop computers, laptop computers, tablet computers, handheld mobile devices, etc.

In one embodiment, at least one of the set of affordances (e.g., affordance 1210, FIG. 12) allows the user to share the corresponding UI object (e.g., UI object 1202 in this case) with another user. Thus, in response to detecting selection of the affordance 1210, the device may provide the user's contact list (e.g., by accessing the contact module 337) to the user, and upon the user selecting a particular user (e.g., by tapping or clicking on the particular user), the device may transmit the UI object 1202 to the selected user. In some embodiments, one of the set of affordances (e.g., affordance 1212, FIG. 12) may provide additional functions. For example, in response to detecting selection of the affordance 1212, the device may display one or more options to the user. The options may include opening a new webpage or window associated with the particular UI object in focus or in background, remove the particular UI object from the suggestions on the user interface, add the particular UI object to a reading list and/or a favorite list, etc. After receiving the user input (e.g., a tap, a click, a key entry, etc.) on the displayed option, the device may perform the selected function accordingly.

In some embodiments, the icon 1052 will correspond to an application that will be displayed/opened in response to receiving a selection of one of the suggested UI objects 1002. For example, a suggested UI object obtained from a photos application would include a photo application icon indicating that it will proceed to open a photos application. In some embodiments, when the UI object is not associated with an application installed on the mobile device (e.g., link from a message to a website) the icon displayed will be an icon associated with the website (e.g., a tree icon selected by the website to represent the website).

FIGS. 13A-13D illustrate a flowchart representation of method 1300 of proactively providing and displaying user interface objects (e.g., internet links) on a user interface (e.g., suggestion in SAFARI) of the electronic device, in accordance with some embodiments. FIGS. 11A-11D and 12 are used to illustrate the method and/or processes of FIGS. 13A-13D. Although some of the examples which follow will be given with reference to inputs on a touch-sensitive display (in which a touch-sensitive surface and a display are combined), in some embodiments, the device detects inputs on a peripherals interface 318 or touch-sensitive surface 475 that is separate from the display 474 (as shown in FIG. 4B) or any inputs received from any user interface devices (e.g., a touch pad 108, a mouse 208, a keyboard 206, etc.) associated with laptop computers or desktop computers.

In some embodiments, the method 1300 is performed by an electronic device 300, FIG. 3A and/or one or more components of the electronic device (e.g., I/O subsystem 306, operating system 326, etc.). In some embodiments, the method 1300 is governed by instructions that are stored in a non-transitory computer-readable storage medium and that are executed by one or more processors of a device, such as the one or more processors 322 of device 300 (FIG. 3A). For ease of explanation, the following describes method 1300 as performed by the device 300. In some embodiments, with reference to FIG. 3A, the operations of method 1300 are performed by or use, at least in part, a proactive module (e.g., proactive module 363), one or more application modules (e.g., e-mail client module 340, calendar module 348, reminder module 349, notes module 353, IM module 341, social media module 369, and network browser module 347), a communication module 328, a contact/motion module (e.g., contact/motion module 330), a graphics module (e.g., graphics module 332), one or more contact intensity sensors (e.g., contact intensity sensors 365), and a display system 312 (e.g., touch-sensitive display system 474, FIG. 4B). Some operations in method 1300 are, optionally, combined and/or the order of some operations is, optionally, changed.

As described below, the method 1300 provides efficient ways to proactively provide and display user interface objects (e.g., internet links) in a user interface (e.g., suggestion in SAFARI) of the electronic device. The method reduces the cognitive burden on a user to access the network browser application and/or other applications (e.g., text message application, e-mail application, calendar application, etc.), thereby creating a more efficient human-machine interface. For battery-operated electronic devices, proactively providing and displaying relevant user interface objects faster and more efficiently both conserves power and increases the time between battery charges.

Figure 13A:
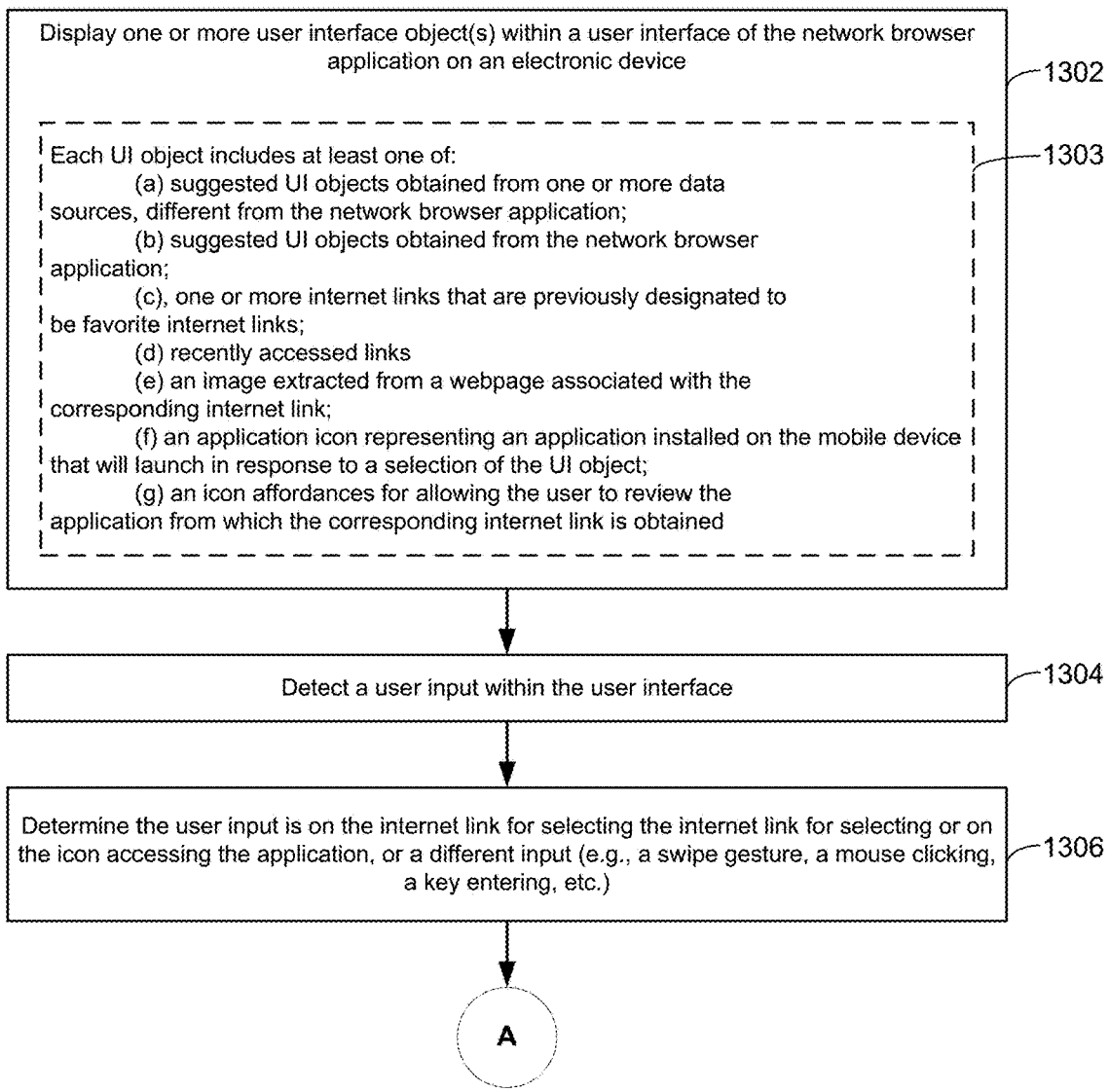
FIGS. 13A-13D are a flowchart representation of a method of proactively providing and displaying user interface objects (e.g., internet links) on a user interface (e.g., suggestion in SAFARI) of an electronic device, in accordance with some embodiments.
Figure 13B:
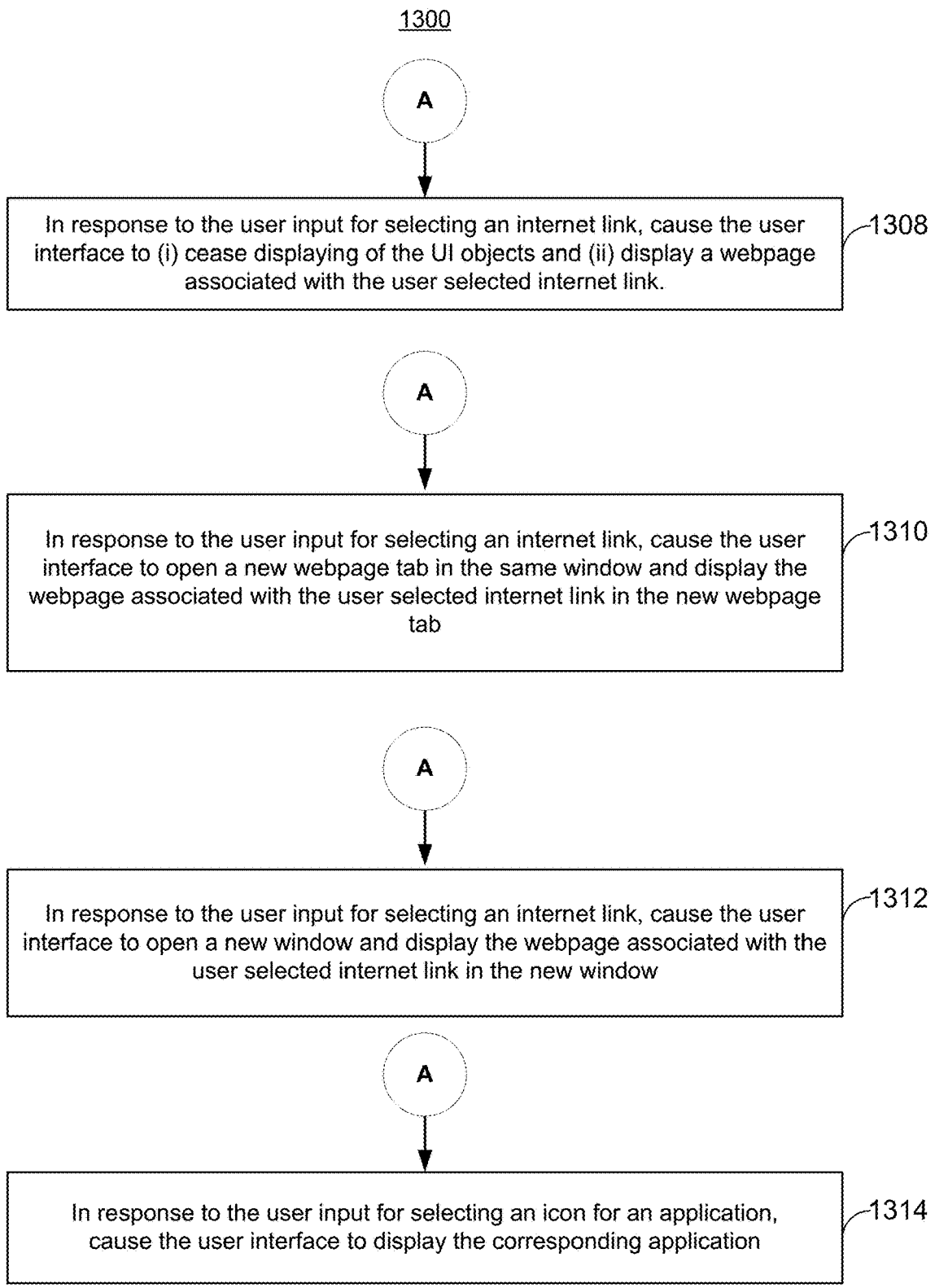
Figure 13C:
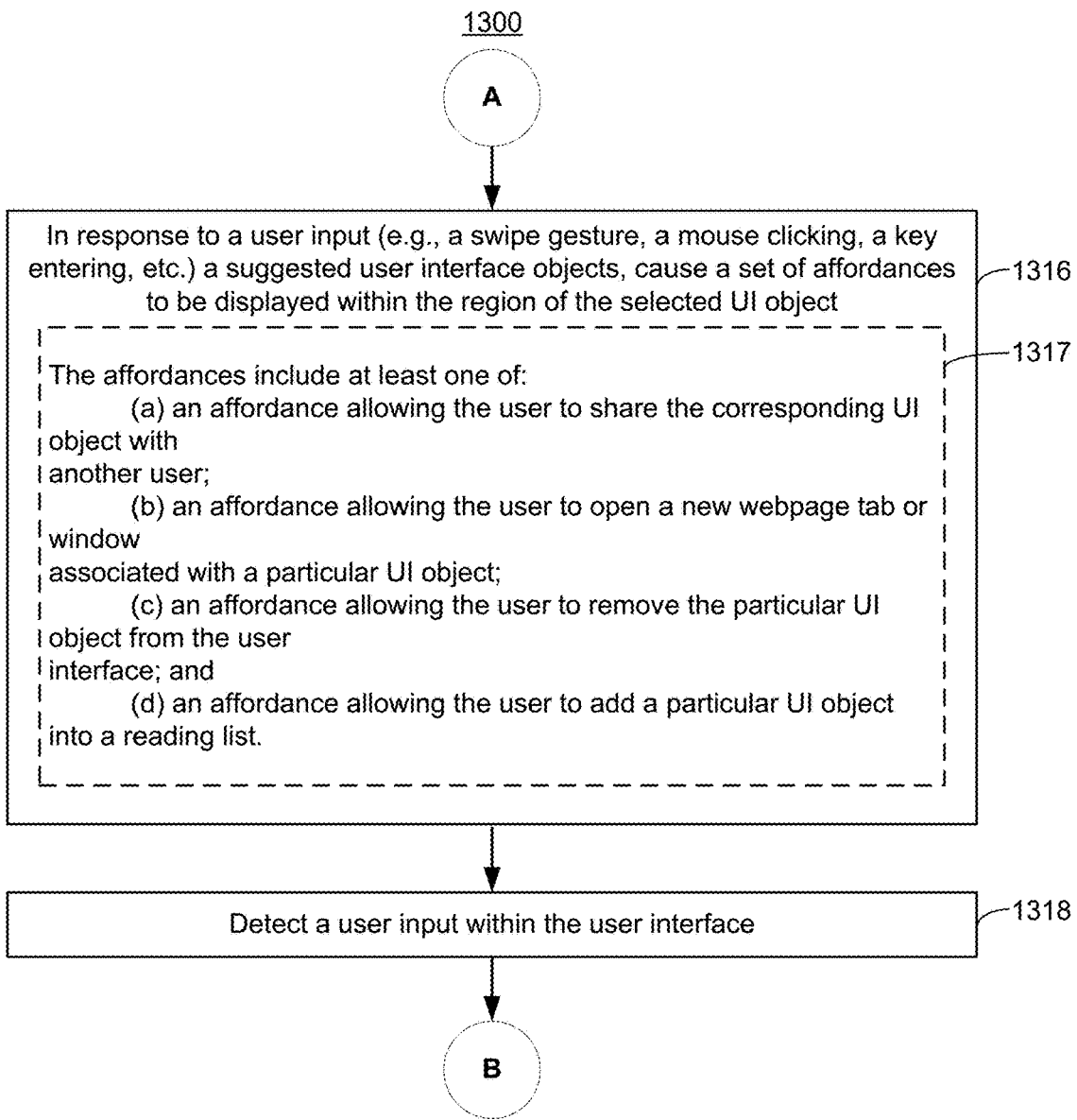
Figure 13D:
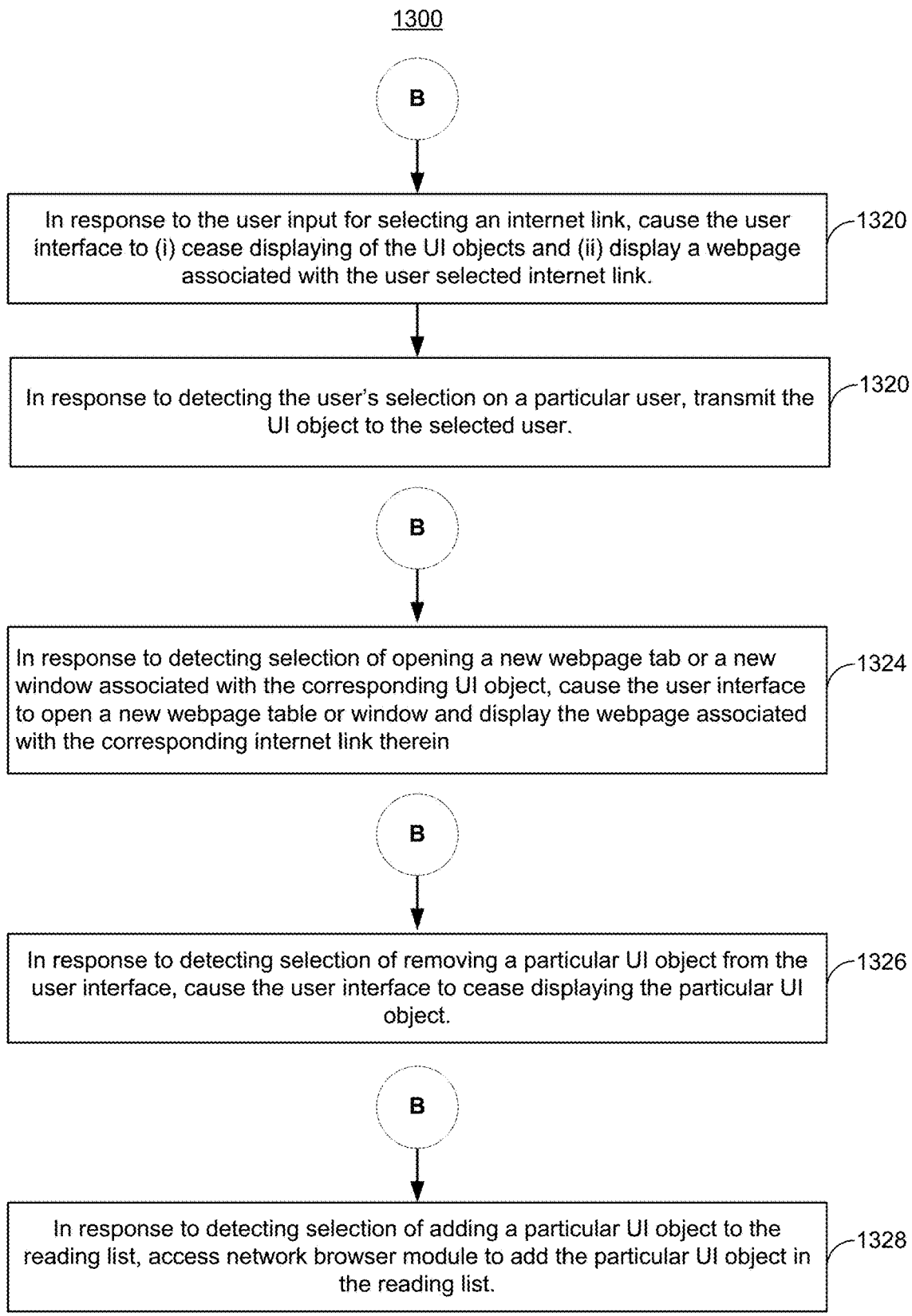

As shown in FIG. 13A, in some embodiments, the electronic device displays (1302) one or more UI objects on the user interface (e.g., SAFARI) for the network application (see also FIG. 9). The UI objects may include, for example, the suggested UI objects 1002, 1012, favorite links 1022A-C, and/or recently accessed links 1032A-C (1303). In addition, each of the suggested UI objects 1002, 1012 may include a first portion 1008A-F displaying an internet link (URL) and a second portion 1010A-F displaying an image extracted from a webpage associated with the corresponding internet link and/or an application icon (e.g., a calendar icon, an e-mail icon) representing an application installed on the mobile device that will launch in response to a selection of the UI object. In some embodiments, the suggested UI objects 1002, 1012 also include an icon at a corner of the second portion 1010A-F; selection of the icon allows the user to review the application from which the corresponding suggested UI object is obtained.

In various embodiments, the device detects (1304) a user input (e.g., tapping, swiping or clicking (e.g., via the use of a mouse) within the user interface. The device then determines (1306) the type of the user input—i.e., whether the user input is on the internet link for selecting the internet link or on the icon for accessing the application, or a different user input (e.g., a swipe gesture, a mouse clicking, a key entering etc.). In response to the user input for selecting an internet link, the device may cause (1308) the user interface to (i) cease displaying of the UI objects 1002, 1012, 1022A-C, 1032A-C and (ii) display a webpage 1102 associated with the user selected internet link. Alternatively, the device may cause (1310) the user interface to open a new webpage tab 1104 in the same window 1006 and display the webpage 1102 associated with the user selected internet link in the new webpage tab 1104. In one embodiment, the device causes (1312) the user interface to open a new window 1106, different from the window 1006, and display the webpage 1102 associated with the user selected internet link in the new window 1106. The displayed new webpage tab 1104 and/or new window 1106 may be in focus or in background. Optionally, in response to detecting selection of an internet link in the UI object, the electronic device or components thereof (e.g., UI Object Suggestion Module 363-3) may cause the selected internet link to be displayed again only after a predetermined time (e.g., 8 hours) has lapsed.

In various embodiments, in response to the user input for selecting the icon 1052, the device may cause (1314) the user interface to access the corresponding application module and display the corresponding application on the display system. Again, the corresponding application may be displayed in focus or in background. In some embodiments, in response to the user input (e.g., a gesture, a mouse clicking, a key entering, etc.) 1208 on one of the suggested user interface objects (e.g., UI object 1202, FIG. 12), the device displays (1316), within the region of the selected UI object on the touch-sensitive display, a set of affordances 1210, 1212. In one embodiment, at least one of the set of affordances allows the user to share the corresponding UI object with another user. In addition, the affordances may allow the user to open a new webpage tab or window associated with the particular UI object in focus or in background, remove the particular UI object from the suggestions on the user interface, add the particular UI object into a reading list or a favorite list, etc. Again, the device then detects (1318) the user input on the displayed affordances. In some embodiments, in response to detecting selection of the "sharing" affordance 1210, the device provides (1320) a user's contact list (e.g., by accessing the contact module 337) to the user, and upon detecting the user's selection on a particular user (e.g., by tapping on the particular user), the device may transmit (1322) the affordance 1212 to the selected user. In some embodiments, in response to detecting selection of opening a new webpage tab or a new window associated with the corresponding UI object, the device causes (1324) the user interface to open a new webpage table or window and display the webpage associated with the corresponding internet link therein. In addition, in response to detecting selection of removing a particular UI object from the user interface, the device causes (1326) the user interface to cease displaying the particular UI object. In one embodiment, in response to detecting selection of adding a particular UI object to the reading list or favorite list, the device accesses (1328) the network browser module (347) to add the particular UI object in the reading list.

It should be understood that the particular order in which the operations in FIGS. 9 and 13A-13D have been described is merely exemplary and is not intended to indicate that the described order is the only order in which the operations could be performed. One of ordinary skill in the art would recognize various ways to reorder the operations described herein.

In accordance with some embodiments, FIG. 14 shows a functional block diagram of an electronic device 1400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein. For ease of discussion, the electronic device 1400 is implemented as a portable multifunction device 400 (FIGS. 4A-4B).

As shown in FIG. 14, the electronic device 1400, includes a display unit 1401 configured to display information (e.g., touch-sensitive display system 412 (also referred to as a touch screen and touch screen display), FIG. 4A), a touch-sensitive surface unit 1403 (e.g., display controller 356 and touch-sensitive display system 412, FIGS. 3A and 4A) configured to receive contacts, gestures, and other user inputs on the touch screen display, and a processing unit 1405 coupled with the display unit 1401 and the touch-sensitive surface unit 1403. In some embodiments, the processing unit includes an executing unit (e.g., executing unit 1407, FIG. 14), a collecting unit (e.g., collecting unit 1409, FIG. 14), an obtaining unit (e.g., obtaining unit 1411, FIG. 14), an identifying unit (e.g., identifying unit 1413, FIG. 14), a providing unit (e.g., providing unit 1415, FIG. 14), a sending unit (e.g., sending unit 1417, FIG. 14), a receiving unit (e.g., receiving unit 1419, FIG. 14), a displaying unit (e.g., displaying unit 1421, FIG. 14), a detecting unit (e.g., detecting unit 1423, FIG. 14), a performing unit (e.g., performing unit 1425, FIG. 14), a determining unit (e.g., determining unit 1427, FIG. 14), and a monitoring unit (e.g., monitoring unit 1429, FIG. 14).

Processing unit 1405 (or one or more components thereof, such as the units 1407-1429) is configured to: execute (e.g., with the executing unit 1407), on the electronic device, an application in response to an input from a user of the electronic device; while executing the application, collect usage data (e.g., with the collecting unit 1409), the usage data at least including one or more actions performed by the user within the application and/or data received by one or more applications of the electronic device; automatically, without human intervention, obtain (e.g., with the obtaining unit 1411) data from one or more data sources based on the collected usage data; identify (e.g., with the identifying unit 1413) the information associated with the collected usage data and/or user input; identify (e.g., with the identifying unit 1413) one or more suggested user interface objects based on the identified information associated with the collected usage data and/or user input; and provide (e.g., with the providing unit 1415) one or more user interface objects to an user interface for the network browser application. In some embodiments of the electronic device 1400, the processing unit (or one or more components thereof, such as the units 1407-1429) is further configured to perform the method described in any one of A1-A31 as described above in the "Summary" section.

As shown in FIG. 15, the electronic device 1500, includes a display unit 1501 configured to display information (e.g., touch-sensitive display system 412 (also referred to as a touch screen and touch screen display), FIG. 4A), a touch-sensitive surface unit 1503 (e.g., display controller 356 and touch-sensitive display system 412, FIGS. 3A and 4A) configured to receive contacts, gestures, and other user inputs on the touch screen display, and a processing unit 1505 coupled with the display unit 1501 and the touch-sensitive surface unit 1503. In some embodiments, the processing unit includes a displaying unit (e.g., displaying unit 1509, FIG. 15), a detecting unit (e.g., detecting unit 1507, FIG. 15), a retrieving unit (e.g., retrieving unit 1511, FIG. 15), a scrolling unit (e.g., scrolling unit 1515, FIG. 15), a revealing unit (e.g., revealing unit 1517, FIG. 15), a contacting unit (e.g., contacting unit 1521, FIG. 15), a receiving unit (e.g., receiving unit 1523, FIG. 15), and an executing unit (e.g., executing unit 1525, FIG. 15).

Processing unit 1505 (or one or more components thereof, such as the units 1407-1429) is configured to: detect (e.g., with the detecting unit 1507 and/or the touch-sensitive surface unit 1503) an input on the touch-sensitive display from a user of the electronic device; and in response to detecting the search activation gesture, display (e.g., with the displaying unit 1509 and/or the display unit 1501) a user interface on the touch-sensitive display that includes: (i) one or more suggested UI objects obtained from one or more data sources different from the network browser application in a first region of the user interface, (ii) one or more suggested UI objects obtained from the network browser application in a second region, different from the first region, of the user interface, (iii) UI objects including one or more internet links that are previously designated by the user to be favorite internet links in a third region, different from the first and second regions, of the user interface, and (iv) UI objects corresponding to one or more recently accessed internet links in a fourth region, different from the first, second and third regions, of the user interface. In some embodiments of the electronic device 1500, the processing unit (or one or more components thereof, such as the units 1507-1523) is further configured to perform the method described in any one of A1-A31 as described above in the "Summary" section.

The operations in any of the information processing methods described above are, optionally implemented by running one or more functional modules in information processing apparatus such as general purpose processors (e.g., as described above with respect to FIG. 3A) or application specific chips. In addition, the operations described above with reference to FIGS. 9 and 13A-13D may be, optionally, implemented by components depicted in FIGS. 3A-3B or FIG. 14-15.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, data related to suggested internet links from different data sources may be provided in accordance with the user's preferences to receive suggested internet links.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A non-transitory computer-readable storage medium storing executable instructions that, when executed by an electronic device comprising a processor, memory, a display and a user input device, cause the electronic device to:
   receive one or more internet links at one or more data sources on the electronic device that are different than an internet browser application;
   receive, via the user input device, a first user input (i) to launch an internet browser application installed on the electronic device, (ii) request to display a new webpage tab in addition to simultaneously displaying one or more already displayed webpage tabs in a user interface of the internet browser application, or (iii) into a search or internet address field within an already displayed user interface of the internet browser application, where the user input is independent of the data source and the internet link;
   in response to the first user input, and without any further user input, display, within the user interface of the internet browser application, (i) a first set of one or more user interface objects, each providing a suggested internet link from the one or more internet links obtained from the one or more data sources on the electronic device, and (ii) for each of the first set of one or more user interface objects, an associated data source user interface object corresponding to one of the one or more data sources that indicates where that respective suggested internet link was obtained;
   receive, via the user input device, a second user input at a data source user interface object of the one of the associated data source user interface objects, where the data source user interface object is associated with a suggested internet link from a data source; and
   in response to receiving the second user input, display within an additional application associated with the data source, the internet link.

2. The non-transitory computer-readable storage medium of claim 1, wherein the executable instructions further cause the electronic device to:
   in response to the first user input, also display, within the user interface, a second set of one or more user interface objects, each providing a suggested internet link obtained from the internet browser application.

3. The non-transitory computer-readable storage medium of claim 2, wherein the executable instructions further cause the electronic device to:
   in response to the first user input, also display, within the user interface, a third set of one or more user interface objects, distinct from the first set of one or more user interface objects and the second set of one or more user interface objects, comprising one or more internet links previously designated to one or more favorite internet links of a user.

4. The non-transitory computer-readable storage medium of claim 3, wherein the first set of one or more user interface objects and the second set of one or more user interface objects are displayed in a first portion of the user interface and the third set of one or more user interface objects is displayed in a second portion of the user interface distinct and different from the first portion of the user interface.

5. The non-transitory computer-readable storage medium of claim 4, wherein the executable instructions further cause the electronic device to:
   in response to the first user input, also display, within the user interface, a fourth set of one or more user interface objects, distinct from the first set of one or more user interface objects, the second set of one or more user interface objects, and the third set of one or more user interface objects, comprising one or more recently accessed internet links.

6. The non-transitory computer-readable storage medium of claim 5, wherein the fourth set of one or more user interface objects is displayed in a fourth portion of the user interface distinct and different from the first portion of the user interface and the second portion of the user interface.

7. The non-transitory computer-readable storage medium of claim 1, wherein the one or more data sources are selected from a group consisting of: a calendar application, a reminder application, a communications application, a text-message application, an e-mail application, and a social media application.

8. The non-transitory computer-readable storage medium of claim 1, wherein the executable instructions further cause the electronic device to:
   determine, prior to displaying the one or more user interface objects, a topic associated with the user input;
   search, using the topic, for internet links obtained from the one or more data sources; and
   in response to the search, locate at least one internet link related to the topic for display as a respective suggested internet link.

9. The non-transitory computer-readable storage medium of claim 8, wherein the executable instructions further cause the electronic device to:
   acquire, for each of at least some of the one or more internet links, at least one of a usage history, a second topic or a time associated therewith; and
   display the one or more user interface objects based at least in part on said at least one of the acquired usage history, second topic or time.

10. The non-transitory computer-readable storage medium of claim 9, wherein the executable instructions further cause the electronic device to determine, prior to receiving the first user input, a common-ancestor topic for each of the entries and the user input, where at least one of the displayed one or more user interface objects are relevant to the determined common-ancestor topic.

11. The non-transitory computer-readable storage medium of claim 8, wherein the executable instructions further cause the electronic device to:
assign, for each of the one or more internet links, a ranking score based at least in part on a time associated therewith, the internet link having the time closer to a time of receiving the user input being assigned a higher ranking score, wherein the one or more user interface objects are displayed in an order based at least in part on the ranking scores assigned to the one or more internet links.

12. The non-transitory computer-readable storage medium of claim 11, wherein the entries comprise at least one of a webpage that a user has previously visited or a calendar event stored in a calendar application.

13. The non-transitory computer-readable storage medium of claim 8, wherein the executable instructions further cause the electronic device to:
identify a first topic associated with the user input or device context;
determine a first q-identifier for the first topic;
for each internet link of the one or more internet links,
identify a second topic associated with the respective internet link;
determine a second q-identifier for the second topic; and
assign a ranking score for each internet link based at least in part on a correlation of the first q-identifier with each of the second q-identifiers, wherein the one or more user interface objects are displayed in an order based at least in part on the ranking scores assigned to the one or more internet links.

14. The non-transitory computer-readable storage medium of claim 8, wherein the executable instructions further cause the electronic device to:
identify a first topic associated with the user input;
determine a first string for the first topic;
for each internet link of the one or more internet links,
identify a second topic associated with the respective internet link;
determine a second string for the second topic; and
assign a ranking score for each internet link based at least in part on a correlation of the first string with each of the second strings, wherein the one or more user interface objects are displayed in an order based at least in part on the ranking scores assigned to the one or more internet links.

15. The non-transitory computer-readable storage medium of claim 1, wherein the executable instructions further cause the electronic device to:
detect a user swipe gesture on a particular user interface object of the user interface objects; and
in response to detecting the user swipe gesture, display a set of one or more affordances selected from a group consisting of: an affordance configured to allow the user to share the particular user interface object with another user; and an affordance configured to allow the user to (i) open a webpage associated with the particular user interface object in focus or in background or (ii) remove the particular user interface object from the user interface.

16. The non-transitory computer-readable storage medium of claim 1, wherein the executable instructions further cause the electronic device to:
in response to the first user input, display, within the user interface, an additional user interface object, distinct from the one or more user interface objects, for providing an additional suggested internet link obtained from the one or more data sources, different than the internet browser application, on a second electronic device distinct from the electronic device.

17. The non-transitory computer-readable storage medium of claim 16, wherein the electronic device and the second electronic device are logged into a common user account.

18. The non-transitory computer-readable storage medium of claim 1, wherein each user interface object includes a respective icon that indicates that the internet link is from the additional application.

19. The non-transitory computer-readable storage medium of claim 1, wherein the user input is a first user input, and the user interface of the internet browser application includes a menu bar in a first area of the user interface and a window in a second area of the user interface that contains the first set of one or more user interface objects, and wherein the executable instructions further cause the electronic device to:
receive, via the input device, a second user input selecting a selected user interface object of the one or more user interface objects; and
in response to receiving the additional user input:
ceasing to display the first set of one or more user interface objects in the window; and
displaying a webpage associated with the selected user interface object in the window.

20. The non-transitory computer-readable storage medium of claim 19, wherein the first set of one or more user interface objects also is displayed in a first predefined region of the window, and wherein the executable instructions further cause the electronic device to:
in response to the first user input, concurrently display:
in a first predefined region of the user interface, a first set of one or more user interface objects, each providing a suggested internet link from the one or more internet links obtained from the one or more data sources on the electronic device; and
in a second predefined region of the user interface, different from the first predefined region, a second set of one or more user interface objects, distinct from the first set of one or more user interface objects, comprising one or more internet links previously designated to one or more favorite internet links of a user;
receive, via the input device, a second user input selecting a selected user interface object of the one or more user interface objects; and
in response to receiving the additional user input:
ceasing to display the first set of one or more user interface objects and the second set of one or more user interface objects in the internet content window; and
displaying a webpage associated with the selected user interface object in the window.

21. A method, comprising:
at one or more electronic devices:
receiving one or more internet links at one or more data sources on the electronic device that are different than an internet browser application;
receiving, via a user input device, a first user input (i) to launch an internet browser application installed on the electronic device, (ii) request to display a new webpage tab in addition to simultaneously displaying one or more already displayed webpage tabs in the user interface of the internet browser application, or (iii) into a search or internet address field within an already displayed user interface of the internet browser application, where the user input is independent of the data source and the internet link;

in response to the first user input, and without any further user input, displaying, within the user interface of the internet browser application, (i) a first set of one or more user interface objects, each providing a suggested internet link from the one or more internet links obtained from the one or more data sources on the electronic device, and (ii) for each of the first set of one or more user interface objects, an associated data source user interface object corresponding to one of the one or more data sources that indicates where that respective suggested internet link was obtained;

receiving, via the user input device, a second user input at a data source user interface object of the one of the associated data source user interface objects, where the data source user interface object is associated with a suggested internet link from a data source; and in response to receiving the second user input, displaying within an additional application associated with the data source, the internet link.

22. The method of claim 21, including:
in response to the first user input, also displaying, within the user interface, a second set of one or more user interface objects, each providing a suggested internet link obtained from the internet browser application.

23. The method of claim 22, including:
in response to the first user input, also displaying, within the user interface, a third set of one or more user interface objects, distinct from the first set of one or more user interface objects and the second set of one or more user interface objects, comprising one or more internet links previously designated to one or more favorite internet links of a user.

24. The method of claim 23, wherein the first set of one or more user interface objects and the second set of one or more user interface objects are displayed in a first portion of the user interface and the third set of one or more user interface objects is displayed in a second portion of the user interface distinct and different from the first portion of the user interface.

25. The method of claim 24, including:
in response to the first user input, also displaying, within the user interface, a fourth set of one or more user interface objects, distinct from the first set of one or more user interface objects, the second set of one or more user interface objects, and the third set of one or more user interface objects, comprising one or more recently accessed internet links.

26. The method of claim 25, wherein the fourth set of one or more user interface objects is displayed in a fourth portion of the user interface distinct and different from the first portion of the user interface and the second portion of the user interface.

27. The method of claim 21, wherein the one or more data sources are selected from a group consisting of: a calendar application, a reminder application, a communications application, a text-message application, an e-mail application, and a social media application.

28. The method of claim 21, including:
determining, prior to displaying the one or more user interface objects, a topic associated with the user input;
searching, using the topic, for internet links obtained from the one or more data sources; and
in response to the searching, locating at least one internet link related to the topic for display as a respective suggested internet link.

29. The method of claim 28, including:
acquiring, for each of at least some of the one or more internet links, at least one of a usage history, a second topic or a time associated therewith; and
displaying the one or more user interface objects based at least in part on said at least one of the acquired usage history, second topic or time.

30. The method of claim 29, including, determining, prior to receiving the first user input, a common-ancestor topic for each of the entries and the user input, where at least one of the displayed one or more user interface objects are relevant to the determined common-ancestor topic.

31. The method of claim 28, including:
assigning, for each of the one or more internet links, a ranking score based at least in part on a time associated therewith, the internet link having the time closer to a time of receiving the user input being assigned a higher ranking score, wherein the one or more user interface objects are displayed in an order based at least in part on the ranking scores assigned to the one or more internet links.

32. The method of claim 31, wherein the entries comprise at least one of a webpage that a user has previously visited or a calendar event stored in a calendar application.

33. The method of claim 28, including:
identifying a first topic associated with the user input or device context;
determining a first q-identifier for the first topic;
for each internet link of the one or more internet links, identifying a second topic associated with the respective internet link;
determining a second q-identifier for the second topic; and
assigning a ranking score for each internet link based at least in part on a correlation of the first q-identifier with each of the second q-identifiers, wherein the one or more user interface objects are displayed in an order based at least in part on the ranking scores assigned to the one or more internet links.

34. The method of claim 28, including:
identifying a first topic associated with the user input;
determining a first string for the first topic;
for each internet link of the one or more internet links, identifying a second topic associated with the respective internet link;
determining a second string for the second topic; and
assigning a ranking score for each internet link based at least in part on a correlation of the first string with each of the second strings, wherein the one or more user interface objects are displayed in an order based at least in part on the ranking scores assigned to the one or more internet links.

35. The method of claim 21, wherein the executable instructions further cause the electronic device to:
detecting a user swipe gesture on a particular user interface object of the user interface objects; and
in response to detecting the user swipe gesture, display a set of one or more affordances selected from a group consisting of: an affordance configured to allow the user to share the particular user interface object with another user; and an affordance configured to allow the user to (i) open a webpage associated with the particular user interface object in focus or in background or (ii) remove the particular user interface object from the user interface.

36. The method of claim 21, wherein the executable instructions further cause the electronic device to:
in response to the first user input, display, within the user interface, an additional user interface object, distinct from the one or more user interface objects, for providing an additional suggested internet link obtained from the one or more data sources, different than the internet browser application, on a second electronic device distinct from the electronic device.

37. The method of claim 36, wherein the electronic device and the second electronic device are logged into a common user account.

38. The method of claim 21, wherein each user interface object includes a respective icon that indicates that the internet link is from the additional application.

39. The method of claim 21, wherein the user input is a first user input, and the user interface of the internet browser application includes a menu bar in a first area of the user interface and a window in a second area of the user interface that contains the first set of one or more user interface objects, and the method includes:
receiving, via the input device, a second user input selecting a selected user interface object of the one or more user interface objects; and
in response to receiving the additional user input:
ceasing to display the first set of one or more user interface objects in the window; and
displaying a webpage associated with the selected user interface object in the window.

40. The method of claim 39, wherein the first set of one or more user interface objects also is displayed in a first predefined region of the window, and the method includes:
in response to the first user input, concurrently display:
in a first predefined region of the user interface, a first set of one or more user interface objects, each providing a suggested internet link from the one or more internet links obtained from the one or more data sources on the electronic device; and
in a second predefined region of the user interface, different from the first predefined region, a second set of one or more user interface objects, distinct from the first set of one or more user interface objects, comprising one or more internet links previously designated to one or more favorite internet links of a user;
receiving, via the input device, a second user input selecting a selected user interface object of the one or more user interface objects; and
in response to receiving the additional user input:
ceasing to display the first set of one or more user interface objects and the second set of one or more user interface objects in the internet content window; and
displaying a webpage associated with the selected user interface object in the window.

41. An electronic device, comprising:
a user input device;
a display;
one or more processors; and
memory storing one or more programs which, when executed by the one or more processors, cause the electronic device to:
receive one or more internet links at one or more data sources on the electronic device that are different than an internet browser application;
receive, via the user input device, a first user input (i) to launch an internet browser application installed on the electronic device, (ii) request to display a new webpage tab in addition to simultaneously displaying one or more already displayed webpage tabs in the user interface of the internet browser application, or (iii) into a search or internet address field within an already displayed user interface of the internet browser application, where the user input is independent of the data source and the internet link;
in response to the user input, and without any further user input, display, within the user interface of the internet browser application, (i) a first set of one or more user interface objects, each providing a suggested internet link from the one or more internet links obtained from the one or more data sources on the electronic device, and (ii) for each of the first set of one or more user interface objects, an associated data source user interface object corresponding to one of the one or more data sources that indicates where that respective suggested internet link was obtained: receive, via the user input device, a second user input at a data source user interface object of the one of the associated data source user interface objects, where the data source user interface object is associated with a suggested internet link from a data source; and
in response to receiving the second user input, displaying within an additional application associated with the data source, the internet link.

42. The electronic device of claim 41, wherein the one or more programs cause the electronic device to:
in response to the first user input, also display, within the user interface, a second set of one or more user interface objects, each providing a suggested internet link obtained from the internet browser application.

43. The electronic device of claim 42, wherein the one or more programs cause the electronic device to:
in response to the first user input, also display, within the user interface, a third set of one or more user interface objects, distinct from the first set of one or more user interface objects and the second set of one or more user interface objects, comprising one or more internet links previously designated to one or more favorite internet links of a user.

44. The electronic device of claim 43, wherein the first set of one or more user interface objects and the second set of one or more user interface objects are displayed in a first portion of the user interface and the third set of one or more user interface objects is displayed in a second portion of the user interface distinct and different from the first portion of the user interface.

45. The electronic device of claim 44, wherein the one or more programs cause the electronic device to:
in response to the first user input, also display, within the user interface, a fourth set of one or more user interface objects, distinct from the first set of one or more user interface objects, the second set of one or more user interface objects, and the third set of one or more user interface objects, comprising one or more recently accessed internet links.

46. The electronic device of claim 45, wherein the fourth set of one or more user interface objects is displayed in a fourth portion of the user interface distinct and different from the first portion of the user interface and the second portion of the user interface.

47. The electronic device of claim 41, wherein the one or more data sources are selected from a group consisting of: a calendar application, a reminder application, a communications application, a text-message application, an e-mail application, and a social media application.

48. The electronic device of claim 41, wherein the one or more programs cause the electronic device to:
determine, prior to displaying the one or more user interface objects, a topic associated with the user input;
search, using the topic, for internet links obtained from the one or more data sources; and
in response to the searching, locate at least one internet link related to the topic for display as a respective suggested internet link.

49. The electronic device of claim 48, wherein the one or more programs cause the electronic device to:
acquire, for each of at least some of the one or more internet links, at least one of a usage history, a second topic or a time associated therewith; and
display the one or more user interface objects based at least in part on said at least one of the acquired usage history, second topic or time.

50. The electronic device of claim 49, wherein the one or more programs cause the electronic device to, determine, prior to receiving the first user input, a common-ancestor topic for each of the entries and the user input, where at least one of the displayed one or more user interface objects are relevant to the determined common-ancestor topic.

51. The electronic device of claim 48, wherein the one or more programs cause the electronic device to:
assign, for each of the one or more internet links, a ranking score based at least in part on a time associated therewith, the internet link having the time closer to a time of receiving the user input being assigned a higher ranking score, wherein the one or more user interface objects are displayed in an order based at least in part on the ranking scores assigned to the one or more internet links.

52. The electronic device of claim 51, wherein the entries comprise at least one of a webpage that a user has previously visited or a calendar event stored in a calendar application.

53. The electronic device of claim 48, wherein the one or more programs cause the electronic device to:
identify a first topic associated with the user input or device context;
determine a first q-identifier for the first topic;
for each internet link of the one or more internet links, identify a second topic associated with the respective internet link;
determine a second q-identifier for the second topic; and
assign a ranking score for each internet link based at least in part on a correlation of the first q-identifier with each of the second q-identifiers, wherein the one or more user interface objects are displayed in an order based at least in part on the ranking scores assigned to the one or more internet links.

54. The electronic device of claim 48, wherein the one or more programs cause the electronic device to:
identify a first topic associated with the user input;
determine a first string for the first topic;
for each internet link of the one or more internet links, identify a second topic associated with the respective internet link;
determine a second string for the second topic; and
assign a ranking score for each internet link based at least in part on a correlation of the first string with each of the second strings, wherein the one or more user interface objects are displayed in an order based at least in part on the ranking scores assigned to the one or more internet links.

55. The electronic device of claim 41, wherein the one or more programs cause the electronic device to:
detect a user swipe gesture on a particular user interface object of the user interface objects; and
in response to detecting the user swipe gesture, display a set of one or more affordances selected from a group consisting of: an affordance configured to allow the user to share the particular user interface object with another user; and an affordance configured to allow the user to (i) open a webpage associated with the particular user interface object in focus or in background or (ii) remove the particular user interface object from the user interface.

56. The electronic device of claim 41, wherein the one or more programs cause the electronic device to:
in response to the first user input, display, within the user interface, an additional user interface object, distinct from the one or more user interface objects, for providing an additional suggested internet link obtained from the one or more data sources, different than the internet browser application, on a second electronic device distinct from the electronic device.

57. The electronic device of claim 56, wherein the electronic device and the second electronic device are logged into a common user account.

58. The electronic device of claim 41, wherein each user interface object includes a respective icon that indicates that the internet link is from the additional application.

59. The electronic device of claim 41, wherein the user input is a first user input, and the user interface of the internet browser application includes a menu bar in a first area of the user interface and a window in a second area of the user interface that contains the first set of one or more user interface objects, and the one or more programs cause the electronic device to:
receive, via the input device, a second user input selecting a selected user interface object of the one or more user interface objects; and
in response to receiving the additional user input:
cease to display the first set of one or more user interface objects in the window; and
display a webpage associated with the selected user interface object in the window.

60. The electronic device of claim 59, wherein the first set of one or more user interface objects also is displayed in a first predefined region of the window, and the one or more programs cause the electronic device to:
in response to the first user input, concurrently display:
in a first predefined region of the user interface, a first set of one or more user interface objects, each providing a suggested internet link from the one or more internet links obtained from the one or more data sources on the electronic device; and
in a second predefined region of the user interface, different from the first predefined region, a second set of one or more user interface objects, distinct from the first set of one or more user interface objects, comprising one or more internet links previously designated to one or more favorite internet links of a user;

receive, via the input device, a second user input selecting a selected user interface object of the one or more user interface objects; and in response to receiving the additional user input:
- cease to display the first set of one or more user interface objects and the second set of one or more user interface objects in the internet content window; and
- display a webpage associated with the selected user interface object in the window.

* * * * *